(12) United States Patent
Tahara et al.

(10) Patent No.: US 7,942,743 B2
(45) Date of Patent: May 17, 2011

(54) GAME APPARATUS AND STORAGE MEDIUM STORING GAME PROGRAM

(75) Inventors: Akira Tahara, Kyoto (JP); Kentaro Nishimura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 309 days.

(21) Appl. No.: 11/038,788

(22) Filed: Jan. 21, 2005

(65) Prior Publication Data

US 2005/0227762 A1    Oct. 13, 2005

(30) Foreign Application Priority Data

Jan. 20, 2004 (JP) ................... 2004-011768
Feb. 26, 2004 (JP) ................... 2004-051890

(51) Int. Cl.
*A63F 9/24* (2006.01)
*A63F 13/00* (2006.01)
*G06F 17/00* (2006.01)
*G06F 19/00* (2006.01)

(52) U.S. Cl. ................................. 463/36; 463/37
(58) Field of Classification Search .............. 463/36, 463/37, 30, 47
See application file for complete search history.

(56) References Cited

U.S. PATENT DOCUMENTS

| | | | | |
|---|---|---|---|---|
| 5,025,411 A * | 6/1991 | Tallman et al. | ................ | 345/175 |
| 5,334,805 A * | 8/1994 | Knowles et al. | ........... | 178/18.04 |
| 5,818,428 A | 10/1998 | Eisenbrandt et al. | | |
| 5,844,561 A * | 12/1998 | Tanimoto et al. | .............. | 715/703 |
| 5,861,874 A * | 1/1999 | Joto | ............... | 345/173 |
| 6,049,328 A | 4/2000 | Vanderheiden | | |
| 6,433,801 B1 | 8/2002 | Moon et al. | | |
| 6,676,514 B1 * | 1/2004 | Kusuda et al. | .................. | 463/24 |
| 6,724,370 B2 | 4/2004 | Dutta et al. | | |
| 6,738,049 B2 | 5/2004 | Kiser et al. | | |
| 2002/0101406 A1 | 8/2002 | Tseng | | |
| 2003/0078102 A1 * | 4/2003 | Okita et al. | ..................... | 463/42 |
| 2003/0214458 A1 * | 11/2003 | Giemborek et al. | ........... | 345/1.1 |
| 2004/0100479 A1 * | 5/2004 | Nakano et al. | ................ | 345/700 |
| 2004/0196265 A1 * | 10/2004 | Nohr | ............................ | 345/169 |
| 2005/0024341 A1 | 2/2005 | Gillespie et al. | | |

FOREIGN PATENT DOCUMENTS

| | | |
|---|---|---|
| JP | 6-285257 | 10/1994 |
| JP | 6-285259 | 10/1994 |
| JP | 09-016304 | 1/1997 |
| JP | 10-254624 | 9/1998 |

(Continued)

OTHER PUBLICATIONS

Office Action issued on Apr. 20, 2008 in corresponding JP application No. 2004-011768 (and partial translation).

(Continued)

*Primary Examiner* — David L Lewis
*Assistant Examiner* — Kevin Y Kim
(74) *Attorney, Agent, or Firm* — Nixon & Vanderhye P.C.

(57) ABSTRACT

A game apparatus includes two LCDs, a touch panel is provided in association with the one LCD. On the touch panel, an operation button corresponding to each player character is set. A setting of the operation button is changed according to an operation state (frequency of usage, operation coordinates position) by a player during playing the game. For example, a size of an operation effective area and a display position of the operation button are changed according to the frequency of usage. Furthermore, at least any one of the operation effective areas and the display position of the operation button is changed according to the operation coordinates position.

51 Claims, 44 Drawing Sheets

FOREIGN PATENT DOCUMENTS

| | | |
|---|---|---|
| JP | 2000-066817 | 3/2000 |
| JP | 2000-163205 | 6/2000 |
| JP | 2001-350568 | 12/2001 |

OTHER PUBLICATIONS

Office Action issued on Apr. 20, 2008 in corresponding JP application No. 2004-051890.

"Kihon sousa kanzen zukai de Windows 98 no kiso ga wakaru! Registory sousa kara trouble kaihi made 500 no Tips de kanzen support: Windows 98 no Tips 500, Oh! PC", vol. 17, No. 5, Japan, Softbank Co. Ltd., Sep. 1, 1998, p. 68-73.

"Korekara hazimeru hito no Windows 95 kouza dai 17 kai", Yomiuri PC, vol. 3, No. 4, Japan, Yomiuri Shinbun-sha, Apr. 1, 1998, p. 82-86.

Nobuyuki Abe, "Sin Konfigu doujou dai 81 kai DOS/V magazine", vol. 8, No. 5, Japan, Softbank Co. Ltd., Mar. 1, 1999, p. 318-321.

"Final Fantasy VI bouken guide book", first Ed., Japan, NTT Syuppan Co., Ltd., Apr. 8, 1994, p. 8-11, 14-15, 19.

\* cited by examiner

FIG. 32
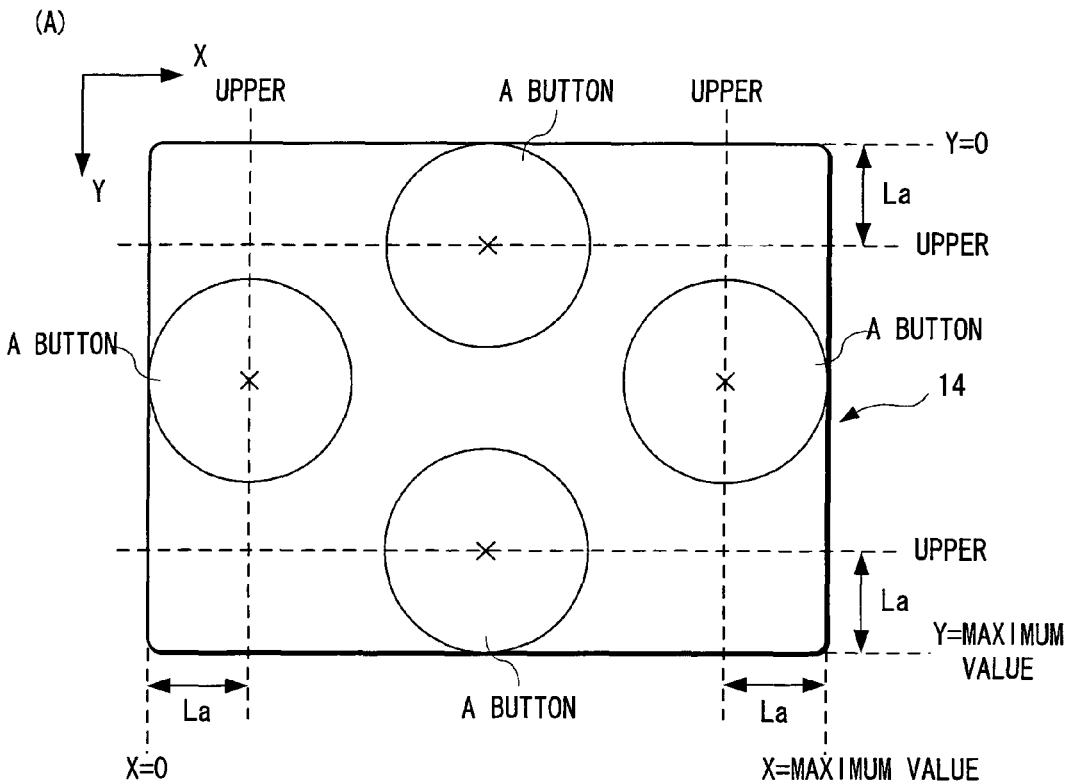
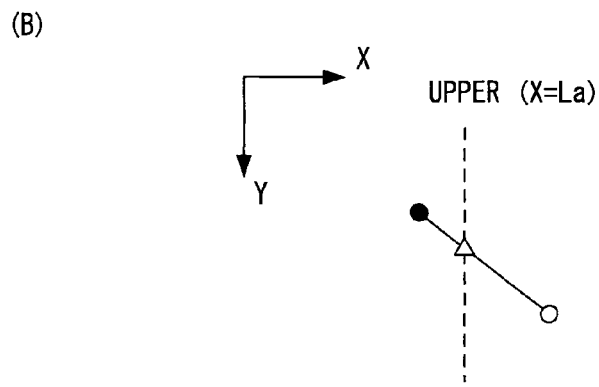
○ ⋯ CENTRAL POSITION COORDINATES OF CURRENT
    OPERATION BUTTON (TO BE MOVED)
● ⋯ CENTRAL POSITION COORDINATES OF OPERATION
    BUTTON MOVED ON THE BASIS OF AVERAGE VALUE
△ ⋯ CENTRAL POSITION COORDINATES OF OPERATION BUTTON
    MOVED ON THE BASIS OF UPPER

------- OPERATION BUTTON TO BE MOVED
(OPERATION EFFECTIVE AREA, BUTTON FIGURE)

———— OPERATION BUTTON MOVED
(OPERATION EFFECTIVE AREA, BUTTON FIGURE)

FIG. 38
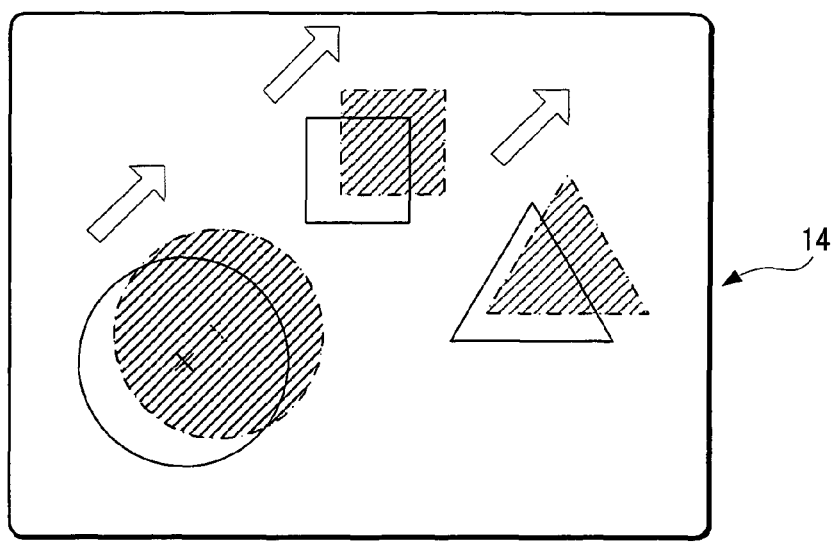
 ⋯ BUTTON FIGURE
(OPERATION EFFECTIVE AREA AND BUTTON FIGURE TO BE MOVED)
 ⋯ MOVED OPERATION EFFECTIVE AREA

- - - - - - OPERATION BUTTON TO BE MOVED
(OPERATION EFFECTIVE AREA, BUTTON FIGURE)

———— OPERATION BUTTON MOVED
(OPERATION EFFECTIVE AREA, BUTTON FIGURE)

GAME APPARATUS AND STORAGE MEDIUM STORING GAME PROGRAM

This application claims priority to Japanese Application No. 2004-011768 filed Jan. 20, 2004 and Japanese Application No. 2004-051890 filed Feb. 26, 2004, the entire contents of which are hereby incorporated by reference.

BACKGROUND OF THE INVENTION

1. Field of the Invention

The present invention relates to a game apparatus and a storage medium storing a game program. More specifically, the present invention relates to a game apparatus executing a game process by operating a pointing device provided in association with a display portion, and a storage medium storing a game program.

2. Description of the Prior Art

An example of this kind of a conventional game apparatus is disclosed in a Japanese Patent Laying-open No. 1994-285257 [A63F 9/22, A63F 5/04] laid-open on Oct. 11, 1994. An electronic composite game apparatus of this prior art can be executed by selecting any one of a plurality of kinds of games, and according to the kind of the selected game, a switch displayed on a display operation plate provided with a touch panel is changed. Furthermore, only a switch required to be displayed in correspondence with progress of the selected game is sequentially generated on the display operation plate.

Another example of this kind of a conventional game apparatus is disclosed in a Japanese Patent Laying-open No. 1994-285259 [A63F 9/22] laid-open on Oct. 11, 1994. The liquid crystal controller of the other prior art is provided with a touch panel and a liquid crystal monitor on the controller main body, and is connected to a game machine main body to display operation information to be transmitted from the game machine main body on the liquid crystal monitor. The operation information is stored in a game cartridge loaded into the game machine main body, and therefore, it is possible to change the operation information according to a kind of the game similarly to the above-described prior art.

However, in the above-described both prior arts, the switch (operation information) to be displayed on liquid crystal screen depending on the kind or in correspondence with the game is merely changed in number and function, and an operation effective area and a display area of the switch are not changed on the basis of an operation state of the displayed switch. For example, the game controller is generally made for a right-handed player, and therefore, it is difficult to operate for a left-handed player. Furthermore, a position, a size, etc. of the switch that is operable for the player is different between respective players. Furthermore, it is impossible to set and modify the switch according to a way (habit) of operation, frequency of operation by the player.

SUMMARY OF THE INVENTION

Therefore, it is a primary object of the present invention to provide a novel game apparatus and storage medium storing a game program.

Another object of the present invention is to provide a game apparatus and a storage medium storing a game program that allows a player to freely display and set an operation figure at an arbitrary position of a display portion.

The other object of the present invention is to provide a game apparatus and a storage medium storing a game program capable of changing an operation effective area according to an operation manner of the operation figure by the player.

A further object of the present invention is to provide a game apparatus and a storage medium storing a game program capable of changing a display area of the operation figure according to an operation manner of the operation figure by the player.

A game apparatus utilizing a pointing device according to this invention comprises a display portion, a figure position setting means, an operation effective area setting means, an operation coordinates position detecting means, an operation coordinates position determining means, and a game processing means. The display portion displays one or more figures to be operated by a player. The figure position setting means sets a figure at an arbitrary position of the display portion on the basis of an instruction from the player. The operation effective area setting means sets an area on the touch panel in correspondence to the display area of the figure set by the figure position setting means as an operation effective area. The operation coordinates position detecting means detects an operation coordinates position on the basis of operation information detected by an operation of the pointing device. The operation coordinates position determining means determines whether or not the operation coordinates position detected by the operation coordinates position detecting means is within the operation effective area. Then, the game processing means executes a game process corresponding to the operation of the figure when it is determined to be within the operation effective area by the operation coordinates position determining means.

More specifically, the game apparatus (10: a reference numeral corresponding in the "preferred embodiment" described later and so forth) is provided with the display portion (14). The display portion (14) displays one or more figures to be operated by the player. For example, the pointing device (22) is provided in association with the display portion (14). The figure position setting means (42, S37, S329) sets the figure at an arbitrary position of the display portion (14) on the basis of the instruction from the player. The operation effective area setting means (42, S41, S331) sets the display area of the figure set by the figure position setting means (42, S37, S329) as the operation effective area. The operation coordinates position detecting means (42, S153) detects the operation coordinates position the on the basis of the operation information detected by the operation of the pointing device (22). The operation coordinates position determining means (42, S155) determines whether or not the operation coordinates position detected by the operation coordinates position detecting means (42, S153) is within the operation effective area. That is, it is determined whether or not the set figure is operated. The game processing means (42, S157) executes the game process corresponding to the operation of the figure to which the operation effective area is set when it is determined to be within the operation effective area by the operation coordinates position determining means (42, S155).

According to the present invention, it is possible to freely set the figure at an arbitrary position of the screen, and it is possible to set the figure at a position suitable for operation for each player, capable of improving operability.

In one aspect of this invention, a figure selecting means for selecting a figure to be displayed on the display portion out of a plurality of kinds of figures is further provided, and the figure position setting means sets the figure selected by the figure selecting means at an arbitrary position of the display portion. More specifically, the game apparatus (10) is further provided with the figure selecting means (42, S21, S23). The figure selecting means (42) selects the figure to be displayed on the display portion (14) out of the plurality of kinds of figures. The figure position setting means (42, S37, S329) sets the figure selected by the figure selecting means (42, S21, S23) at the arbitrary position of the display portion. Accordingly, a figure to suit the needs or preferences of the player out of the various kinds of figures can be selected.

In one embodiment of this invention, the figure position setting means sets the display area of the figure rendered on the display portion according to the operation of the pointing device by the player as a figure position. More specifically, the figure position setting means (42, S37, S329) sets the display area of the figure rendered on the display portion (14) according to the operation of the pointing device (22) by the player as the figure position. For example, the player can freely render the figure. At this time, a position of the figure is set, and a shape and a size thereof are also set. Thus, the player can freely render the figure, capable of improving a savor of the game.

In one aspect of this invention, an operation state detecting means for detecting an operation state of the figure, and a display position changing means for changing the display position of the figure on the basis of the operation state detected by the operation state detecting means are further provided. More specifically, the game apparatus further comprises the operation state detecting means (42, S159, S185, S191, S221, S221', S229, S229') and the display position changing means (42, S235, S235', S235", S235a, S239). The operation state detecting means (42, S159, S185, S191, S221, S221', S229, S229') detects the operation state of the figure, and the display position changing means (42, S235, S235', S235", S235a, S239) changes the display position of the figure on the basis of the operation state detected by the operation state detecting means. Accordingly, by changing the display position of the figure according to a habit of operation, etc. of the player, it is possible to guide an operation position of the player so as to be coincident with the center of the operation effective area.

In one embodiment of this invention, the operation effective area setting means sets the display area of the figure changed by the display position changing means as an operation effective area. More specifically, the operation effective area setting means (42, S41, S331) sets the changed display area of the figure as an operation effective area. That is, the position of the operation effective area is also changed. Thus, it is possible to easily inform the player that the position of the operation effective area is changed.

In another aspect of this invention, an operation state detecting means for detecting an operation state of the figure, and an operation effective area changing means for changing the operation effective area of the figure on the basis of the operation state are further provided. More specifically, the game apparatus comprises the operation state detecting means (42, S159, S185, S191, S221, S221', S229, S229') and the operation effective area changing means (42, S233, S233', S233", S237). The operation state detecting means (42, S159, S185, S191, S221, S221', S229, S229') detects the operation state of the figure, the operation effective area changing means (42, S233, S233', S233", S237) changes the operation effective area of the figure according to the detected operation state. That is, the display state by the player is reflected on the operation effective area. Accordingly, the position of the operation effective area can be changed according to an operation pattern, habit, etc. by the player, capable of improving operability.

In the other aspect of this invention, a figure size changing means for changing a size of the figure displayed on the display portion is further provided, and the operation effective area setting means sets a display area of the figure changed by the figure size changing means as an operation effective area. More specifically, the figure size changing means (42, S39, S73, S95) changes the size of the figure displayed on the display portion (14). The operation effective area setting means (42, S41, S331) sets the display area of the figure changed by the figure size changing means (42, S39, S73, S95) as the operation effective area. Thus, it is freely change the size of the displayed figure. For example, the figure being high frequency of usage is displayed in an enlarged manner, and the figure being low frequency of usage is displayed in a reduced manner, and this makes it easy to operate.

In one embodiment of this invention, the figure size changing means changes the size of the figure according to an operation time of the pointing device by the player. More specifically, the figure size changing means (42, S39, S95) changes the size of the figure according to the operation time of the pointing device (22) by the player. For example, the longer the operation time is, the larger the figure is rendered, or the figure is gradually rendered large for each unit of time. Thus, the size of the displayed figure is changed according to the operation time, and therefore, it is easy to operate.

In another aspect of this invention, an operation state detecting means for detecting an operation state of the figure, and a figure display area changing means for changing the display area of the figure on the basis of the operation state detected by the operation state detecting means are further provided, and the operation effective area setting means sets the display area of the figure changed by the figure display area changing means as an operation effective area. More specifically, the game apparatus (10) further comprises the operation state detecting means (42, S159, S185, S191) and the display area changing means (42, S187, S193). The operation state detecting means (42, S159, S185, S191) detects the operation state of the figure, and the display area changing means (42, S187, S193) changes the display area of the figure on the basis of the detected operation state. Here, the operation effective area setting means (42, S89, S195) sets the changed display area as the operation effective area. Thus, the display area of the figure (size) is modified according to the operation state of the displayed figure, capable of changing the display of the figure depending on the frequency of usage of the figure.

In the other aspect of this invention, a game proceeding detecting means for detecting a game proceeding and a figure display state changing means for changing a display state of the figure displayed on the display portion when it is detected that the game proceeding is shifted to a predetermined state by the game proceeding detecting means are further provided, and the operation effective area setting means sets the display area of the figure changed by the figure display state changing means as an operation effective area. More specifically, the game proceeding detecting means (42, S161, S167, S197) detects the game proceeding. The figure display state changing means (42, S145, S147, S163, S165, S169) changes the display state of the figure displayed on the display portion when it is detected that the game proceeding is shifted to the predetermined state ("YES" in the steps S161, S167, S197). Accordingly, the operation effective area setting means (42, S171) sets the display area of the figure changed by the figure display state changing means as the operation effective area. Thus, it is possible to change the display state of the figure according to the game proceeding.

In another aspect of this invention, a figure function setting means for setting a function of the figure, a figure function displaying means for displaying the function set by the figure function setting means in association with the figure, and a figure function changing means for changing the function set by the figure function setting means when it is detected that the game proceeding is shifted to a predetermined state by the game proceeding detecting means are further provided, and the figure display state changing means changes in a displaying manner from the function displayed by the figure function displaying means to the function changed by the figure function changing means. More specifically, the figure function setting means (42, S43, S45, S47) sets the function of the figure. The figure function displaying means (42, S147) displays in association with the figure the function set by the figure function setting means. The figure function changing means (42, S163) changes the function set to the figure when it is detected that the game proceeding is shifted to a predetermined state by the game proceeding detecting means ("YES" in the step S161). The figure display state changing means (42, S163, S165) changes in a displaying manner from the function of the figure to the modified function. Thus, it is possible to change the function of the figure according to the game proceeding, capable of displaying the figure with the function required for the game state at that time.

In one embodiment of this invention, the figure display state changing means displays a new figure on the display portion when the game proceeding is shifted to a predetermined state by the game proceeding detecting means, and the operation effective area setting means sets a display area of the figure newly displayed as an operation effective area. More specifically, when it is detected that the game proceeding is shifted to the predetermined state ("YES" in the S167), the figure display state changing means (42, S169) displays a new figure on the display portion (14). Accordingly, the operation effective area setting means (42, S171) sets the display area of the figure newly displayed as the operation effective area. Thus, it is possible to display a new figure in correspondence with the game proceeding, capable of increasing figures in correspondence with the game proceeding.

In another aspect of this invention, a character selecting means for selecting an arbitrary character out of a plurality of kinds of characters is further provided, and the figure position setting means sets the figure at an arbitrary position of the display portion for each character selected by the character selecting means, and the game proceeding detecting means detects whether or not the character selected by the character selecting means is changed, the figure display state detecting means, when the character is changed by the game proceeding detecting means, changes the position of the figure to the figure position set to the changed character, and the operation effective area setting means sets the display area of the figure changed by the figure display state changing means as an operation effective area. More specifically, the character selecting means (42, S143) selects the arbitrary character out of the plurality of kinds of characters. The figure setting means (42, S145, S147) sets the figure at an arbitrary position of the display portion (14) for each character, the game proceeding detecting means (42, S197) detects whether or not the character selected by the character selecting means (42, S143) is changed. The figure display state detecting means (42, S145, S147), when the character is changed, changes the position of the figure to the figure position set to the changed character. Then, the operation effective area setting means (42, S145) sets the changed display area of the figure as an operation effective area. Accordingly, it is possible to set the display position of the figure for each plurality of kinds of characters, and when the character is modified, the figure can be changed to the display position set to the changed character, capable of setting the figure to an operable position for each character.

In one embodiment of this invention, a pointing device is a touch panel provided in association with the display portion, and the operation effective area setting means sets an area of the touch panel corresponding to the display area of the figure as an operation effective area. More specifically, the pointing device is the touch panel (22) provided in association with the display portion (14). The operation effective area setting means (42, S41, S331) sets the area of the touch panel (22) corresponding to the display area of the figure as the operation effective area. Thus, the touch panel is utilized as a pointing device, capable of performing an intuitive operation.

A game apparatus utilizing another pointing device according to this invention comprises a first display portion, a second display portion, a figure position setting means, an operation effective area setting means, an operation coordinates position detecting means, an operation coordinates position determining means, and a game processing means. The first display portion displays a game image. The second display portion is arranged in proximity to the first display portion, and displays one or more figures to be operated by the player. The figure position setting means sets the figure at an arbitrary position of the display portion on the basis of an instruction from the player. The operation effective area setting means sets a display area of the figure set by the figure position setting means as an operation effective area. The operation coordinates position detecting means detects an operation coordinates position on the basis of operation information detected by an operation of the pointing device. The operation coordinates position determining means determines whether or not the operation coordinates position detected by the operation coordinates position detecting means is within the operation effective area. The game processing means changes a game image displayed on at least the first display portion in response to the operation of the figure when it is determined to be within the operation effective area by the operation coordinates position determining means.

The another game apparatus is approximately the same as the above-described game apparatus of this invention, and the game image is displayed on the first display portion (12), and in proximity thereto, the image to be operated by the player is displayed on the second display portion (14).

In the other invention also, similarly to the above-described invention, it is possible to freely set the figure at an arbitrary position on the screen, capable of setting the figure at an operable position for each player. That is, it is possible to improve operability.

A game apparatus utilizing the other pointing device according to this invention comprises a display portion, a figure position setting means, an operation effective area setting means, an operation coordinates position detecting means, an operation coordinates position determining means, a game processing means, an operation state detecting means, and an operation effective area changing means. The display portion displays at least one or more figures. The figure position setting means sets the figure at a predetermined position of the display portion. The operation effective area setting means sets a display area of the figure set by the figure position setting means as an operation effective area. The operation coordinates position detecting means detects an operation coordinates position on the basis of operation information detected by an operation of the pointing device. The operation coordinates position determining means determines whether or not the operation coordinates position detected by the operation coordinates position detecting means is within the operation effective area. The game processing means executes a game process corresponding to the figure when it is determined to be within the operation effective area by the operation coordinates position determining means. The operation state detecting means detects an operation state of the figure by the player. The operation effective area changing means changes at least the operation effective area of the figure on the basis of the operation state detected by the operation state detecting means.

More specifically, the game apparatus (10) is provided with the display portion (14) for displaying one or more figures to be operated by the player. For example, the pointing device (22) is provided in association with the display portion (14). The figure position setting means (42, S37) sets the figure at the predetermined position of the display portion. The operation effective area setting means (42, S41) sets the display area of the figure set by the figure position setting means as the operation effective area. The operation coordinates position detecting means (42, S153) detects the operation coordinates position on the basis of the operation information detected by the operation of the pointing device (22). The operation coordinates position determining means (42, S155) determines whether or not the operation coordinates position detected by the operation coordinates position detecting means (42, S153) is within the operation effective area. The game processing means (42, S157) executes the game process corresponding to the figure when it is determined to be within the operation effective area by the operation coordinates position determining means (42, S155). That is, the game process according to the function (command) set to the button is executed. The operation state detecting means (42, S159, S185, S191, S221, S221', S229, S229') detects the operation state of the figure by the player. Then, the operation effective area changing means (42, S189, S195, S233, S233', S233", S237, S237') changes at least the operation effective area of the figure on the basis of the operation state detected by the operation state detecting means (42, S159, S185, S191, S221, S221', S229, S229').

According to the present invention, the operation effective area of the figure can be modified according to the operation state of the displayed figure, and therefore, the position of the operation effective area can be changed according to an operation pattern, habit, frequency, etc. of the figure by the player. Thus, it is possible to improve operability.

In one aspect of this invention, a figure display area changing means for changing the display area of the figure on the basis of the operation state detected by the operation state detecting means is further provided. More specifically, the figure display area changing means (42, S187, S193, S235, S235', S235", S239, S239') changes the display area of the figure on the basis of the operation state detected by the operation state detecting means (42, S159, S185, S191, S221, S221', S229, S229'). That is, the display area of the figure is also changed according to the operation state by the payer, and thus, it is possible to easily inform the player that the position of the operation effective area is changed.

In another aspect of this invention, a representative coordinates position extracting means for extracting a representative coordinates position out of a plurality of operation coordinates positions detected by the operation coordinates position detecting means is further provided. The operation effective area changing means changes a position of the operation effective area of the figure on the basis of the representative coordinates position extracted by the representative coordinates position extracting means. More specifically, the representative coordinates position extracting means (42, S229') extracts the representative coordinates position out of the plurality of operation coordinates positions detected by the operation coordinates position detecting means (42, S221'). The operation effective area changing means (42, S233", S237) changes the position of the operation effective area of the figure on the basis of the representative coordinates position extracted by the representative coordinates position extracting means (42, S229'). Thus, the position of the operation effective area of the figure is changed to the representative coordinates position according to the operation state of the player, and therefore, the operation effective area can be corrected to an adequate position according to an operation pattern, habit, etc. by the player, capable of improving operability.

In one embodiment of this invention, the representative coordinates position extracting means extracts an operation coordinates position being the greatest in number out of the plurality of operation coordinates positions as the representative coordinates position. More specifically, the representative coordinates position extracting means (42, S229') extracts the operation coordinates position being the greatest in number out of the plurality of operation coordinates positions, that is, the operation coordinates position being the highest in frequency of operation as the representative coordinates position. It is noted that an average value of a plurality of operation coordinates positions is calculated, and the operation coordinates position indicated by the calculated average value may be extracted as the representative coordinates position. Thus, the operation effective area is changed to the operation coordinates position being the highest in frequency of usage, and therefore, it is possible to correct the operation effective area to an adequate position according to an operation pattern, habit, etc. by the player.

In another aspect of this invention, the operation state detecting means detects the difference between a central coordinates position of the figure and the operation coordinates position detected by the operation coordinates position detecting means, and the operation effective area changing means changes a position of the operation effective area of the figure on the basis of the difference. More specifically, the operation state detecting means (42, S159, S185, S191, S221, S229) detects the difference between the central coordinates position of the figure and the operation coordinates position detected by the operation coordinates position detecting means (42, S153), and the operation effective area changing means (42, S189, S195, S233, S233', S237, S237') changes the position of the operation effective area of the figure on the basis of the difference. That is, the position of the operation effective area of the figure is changed on the basis of the difference between the central position of the figure and the operation coordinates position detected by the operation of the player, and therefore, it is possible to correct the operation effective area to an adequate position according to an operation pattern, habit, etc. by the player, capable of improving operability.

In one embodiment of this invention, the operation effective area changing means changes the positions of the operation effective areas as to all figures displayed on the display portion on the basis of the difference. More specifically, the operation effective area changing means (42, S189, S195, S233, S237) changes the positions of the operation effective areas as to all the figures displayed on the display portion on the basis of the difference. Thus, the positions of the operation effective areas of all the figures are changed on the basis of the difference between the central position of the figure and the operation coordinates position detected by the operation of the player, and therefore, it is possible to reduce a processing load for changing the position of the operation effective area.

In another embodiment of this invention, an average value calculating means for calculating an average value of differences detected by the operation state detecting means every operation of the figure is further provided, and the operation effective area changing means changes the position of the operation effective area of the figure on the basis of the average value calculated by the average value calculating means. More specifically, the average value calculating means (42, S229) calculates the average value of the differences detected by the operation state detecting means (42, S221) every operation of the figure. The operation effective area changing means (42, S189, S195, S233, S237) changes the position of the operation effective area of the figure on the basis of the average value calculated by the average value calculating means (42, S229). That is, the position of the operation effective area of the figure can be changed on the basis of the average value of the differences detected by the central position of the figure and a plurality of number of times of operations by the player, it is possible to correct the operation effective area to an adequate position according to an operation pattern, habit, etc. by the player, capable of improving operability.

In the other aspect of this invention, the operation state detecting means detects the number of times of operations of the figure, and the operation effective area changing means changes a size of the operation effective area of the figure on the basis of the number of times of operations. More specifically, the operation state detecting means (42, S159) detects the number of times of operations of the figure. The operation effective area changing means (42, S189, S195) changes the size of the operation effective area of the figure on the basis of the number of times of operations. Thus, the operation effective area of the figure can be changed to an adequate size according to the number of times of operations, capable of improving operability.

The game apparatus utilizing another pointing device according to this invention comprises a display portion, a figure position setting means, an operation effective area setting means, an operation coordinates position detecting means, an operation coordinates position determining means, a game processing means, an operation state detecting means, and a figure display area changing means. The display portion displays one or more figures to be operated by the player. The figure position setting means sets the figure at a predetermined position of the display portion. The operation effective area setting means sets a display area of the figure set by the figure position setting means as an operation effective area. The operation coordinates position detecting means detects an operation coordinates position on the basis of operation information detected by an operation of the pointing device. The operation coordinates position determining means determines whether or not the operation coordinates position detected by the operation coordinates position detecting means is within the operation effective area. The game processing means executes a game process corresponding to the figure when it is determined to be within the operation effective area by the operation coordinates position determining means. The operation state detecting means detects an operation state of the figure by the player. Then, the figure display area changing means changes the display area of the figure on the basis of the operation state detected by the operation state detecting means.

In the other game apparatus, the display area of the figure is modified accord to the display state of the figure dissimilar to the above-described invention.

According to this invention, the display area of the figure is modified according to an operation pattern, habit, frequency etc. of the figure by the player, and this leads the player to surely operate the position within the operation effective area, capable of improving operability.

In one aspect of this invention, the figure display area changing means for changing the operation effective area of the figure in correspondence to the display area of the figure changed by the figure display area changing means is further provided. More specifically, the operation effective area changing means (42, S189, S195, S233, S237) modifies the operation effective area of the figure changed by the figure display area changing means (42, S187, S193, S235, S235', S235", S239', S239"). That is, the operation effective area of the figure is modified according to an operation pattern, habit, frequency etc. of the figure by the player, capable of improving operability. Also, it is possible to inform the player that the operation effective area of the figure is modified.

In one embodiment of this invention, the operation state detecting means detects a difference between a central coordinates position of the figure and the operation coordinates position detected by the operation coordinates position detecting means, and the figure display area changing means changes a position of the display area of the figure on the basis of the difference.

In this invention also, similarly to the above-described invention, it is possible to correct the operation effective area to an adequate position according to an operation pattern, habit, etc. by the player, capable of improving operability.

In another embodiment of this invention, the operation state detecting means detects the number of times of operations of the figure, and the figure display area changing means changes a size of the display area of the figure on the basis of the number of times of operations.

In this invention also, similarly to the above-described invention, the operation effective area of the figure can be changed to an adequate size according to the number of times of operations, capable of improving operability.

In the other embodiment of this invention, the figure display area changing means reduces the display area of the figure when the number of times of operations is equal to or less than a first setting number of times, and enlarges the display area of the figure when the number of times of operations is equal to or more than a second setting number of times. More specifically, the figure display area changing means (42, S187, S193) reduces the display area of the figure when the number of times of operations is equal to or less than the first setting number of times ("YES" in the S185), and enlarges the display area of the figure when the number of times of operations is equal to or more than the second setting number of times ("YES" in the S191). That is, the figure being a low frequency of usage is displayed in a reduced manner, and the figure being a high frequency of usage is displayed in an enlarged manner, and therefore, the figure not frequently utilized is displayed so as to makes it difficult to operate, and the figure frequently operated is displayed so as to make it easy to operate.

In a further embodiment of this invention, the figure display area changing means enlarges the display area of the figure when the number of times of operations is equal to or less than a first setting number of times, and reduces the display area of the figure when the number of times of operations is equal to or more than a second setting number of times. More specifically, contrary to the above-described other embodiment, when the number of times of operations of the figure is equal to or less than the first setting number of times, the figure is displayed in an enlarged manner, and when the number of times of operations is equal to or more than the second setting number of times, the display area of the figure is reduced. That is, the figure being a low frequency of usage is displayed in an enlarged manner, and the figure being a high frequency of usage is displayed in a reduced manner, and therefore, a difficulty level of the game operation can be increased, capable of preventing reduction in an interest to the game play.

In another embodiment of this invention, the figure display area changing means erases the display area of the figure when the number of times of operations is equal to or less than a third setting number of times. More specifically, the display area of the figure being a low frequency of usage, that is, having the number of times of operations being equal to or less than the third setting number of times is erased. That is, the figure being a low frequency of usage is erased, and therefore, it is possible to make it impossible to use the figure not frequently utilized.

In a storage medium storing a game program according to this invention, the game program is executed by a game apparatus utilizing a pointing device. The game apparatus comprises a display portion for displaying one or more figures to be operated by the player. The game program causes the processor of the game apparatus to execute a figure position setting step, an operation effective area setting step, an operation coordinates position detecting step, an operation coordinates position determining step, and a game processing step. The figure position setting step sets the figure at an arbitrary position of the display portion on the basis of an instruction from the player. The operation effective area setting step sets a display area of the figure set by the figure position setting step as an operation effective area. The operation coordinates position detecting step detects an operation coordinates position on the basis of operation information detected by an operation of the pointing device. The operation coordinates position determining step determines whether or not the operation coordinates position detected by the operation coordinates position detecting step is within the operation effective area. Then, the game processing step executes a game process corresponding to the operation of the figure when it is determined to be within the operation effective area by the operation coordinates position determining step.

In the storage medium storing the game program of this invention, similalry to the above-described invention of the game apparatus, it is possible to freely set the figure at an arbitrary position of the screen, and therefore it is possible to set the figure at an operable position for each player.

In a storage medium storing another game program according to this invention, the game program is executed by a game apparatus utilizing a pointing device. The game apparatus is provided with a first display portion for displaying a game image and a second display portion arranged in proximity to the first display portion for displaying at least one or more figures to be operated by a player. The game program causes the processor of the game apparatus to execute a figure position setting step, an operation effective area setting step, an operation coordinates position detecting step, an operation coordinates position determining step, and a game processing step. The figure position setting step sets the figure at an arbitrary position of the display portion on the basis of an instruction from the player. The operation effective area setting step sets a display area of the figure set by the figure position setting step as an operation effective area. The operation coordinates position detecting step detects an operation coordinates position on the basis of operation information detected by an operation of the pointing device. The operation coordinates position determining step determines whether or not the operation coordinates position detected by the operation coordinates position detecting step is within the operation effective area. Then, the game processing step changes a game image displayed on at least the first display portion in response to an operation of the figure when it is determined to be within the operation effective area by the operation coordinates position determining step.

In the storage medium of this invention also, similarly to the above-described invention of the game apparatus, it is possible to freely set the figure at an arbitrary position of the screen, and therefore it is possible to set the figure at an operable position for each player. That is, operability is improved.

In a storage medium storing the other game program according to this invention, the game program is executed by a game apparatus utilizing a pointing device. The game apparatus is provided with a display portion for displaying at least one or more figures. The game program causes the processor of the game apparatus to execute a figure position setting step, an operation effective area setting step, an operation coordinates position detecting step, an operation coordinates position determining step, a game processing step, an operation state detecting step, and an operation effective area changing step. The figure position setting step sets the figure at a predetermined position of the display portion. The operation effective area setting step sets a display area of the figure set by the figure position setting step as an operation effective area. The operation coordinates position detecting step detects an operation coordinates position on the basis of operation information detected by an operation of the pointing device. The operation coordinates position determining step determines whether or not the operation coordinates position detected by the operation coordinates position detecting step is within the operation effective area. The game processing step executes a game process corresponding to the figure when it is determined to be within the operation effective area by the operation coordinates position determining step. The operation state detecting step detects an operation state of the figure by the player. Then, the operation effective area changing step changes at least the operation effective area of the figure on the basis of the operation state detected by the operation state detecting step.

In the storage medium of this invention also, similalry to the above-described invention of the game apparatus, the operation effective area can be changed according to an operation pattern, habit, frequency, etc. of the figure by the player, capable of improving operability.

In a storage medium storing another game program according to this invention, the game program is executed by a game apparatus utilizing a pointing device. The game apparatus is provided with a display portion for displaying one or more figures to be operated by the player. The game program causes the processor of the game apparatus to execute a figure position setting step, an operation effective area setting step, an operation coordinates position detecting step, an operation coordinates position determining step, a game processing step, an operation state detecting step, and a figure display area changing step. The figure position setting step sets the figure at a predetermined position of the display portion. The operation effective area setting step sets a display area of the figure set by the figure position setting step as an operation effective area. The operation coordinates position detecting step detects an operation coordinates position on the basis of operation information detected by an operation of the pointing device. The operation coordinates position determining step determines whether or not the operation coordinates position detected by the operation coordinates position detecting step is within the operation effective area. The game processing step executes a game process corresponding to the figure when it is determined to be within the operation effective area by the operation coordinates position determining step. The operation state detecting step detects an operation state of the figure by the player. The figure display area changing step changes the display area of the figure on the basis of the operation state detected by the operation state detecting step.

In the storage medium according to this invention, similarly to the above-described invention of the game apparatus, the position of the display area and the operation effective area can be changed according to an operation pattern, habit, frequency, etc. of the figure by the player, capable of improving operability. Also, it is possible to easily inform the player that the operation effective area of the figure is modified.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 32 is an illustrative view for describing an upper set in the operation button position correcting process in the second embodiment and a method of changing an operation effective area and a display position of the operation button on the basis of the upper;

FIG. 38 is an illustrative view showing one example of a state in which the operation effective area is corrected by the operation button position correcting process in the fourth embodiment;

DETAILED DESCRIPTION OF THE PREFERRED EMBODIMENTS

First Embodiment

Figure 1:
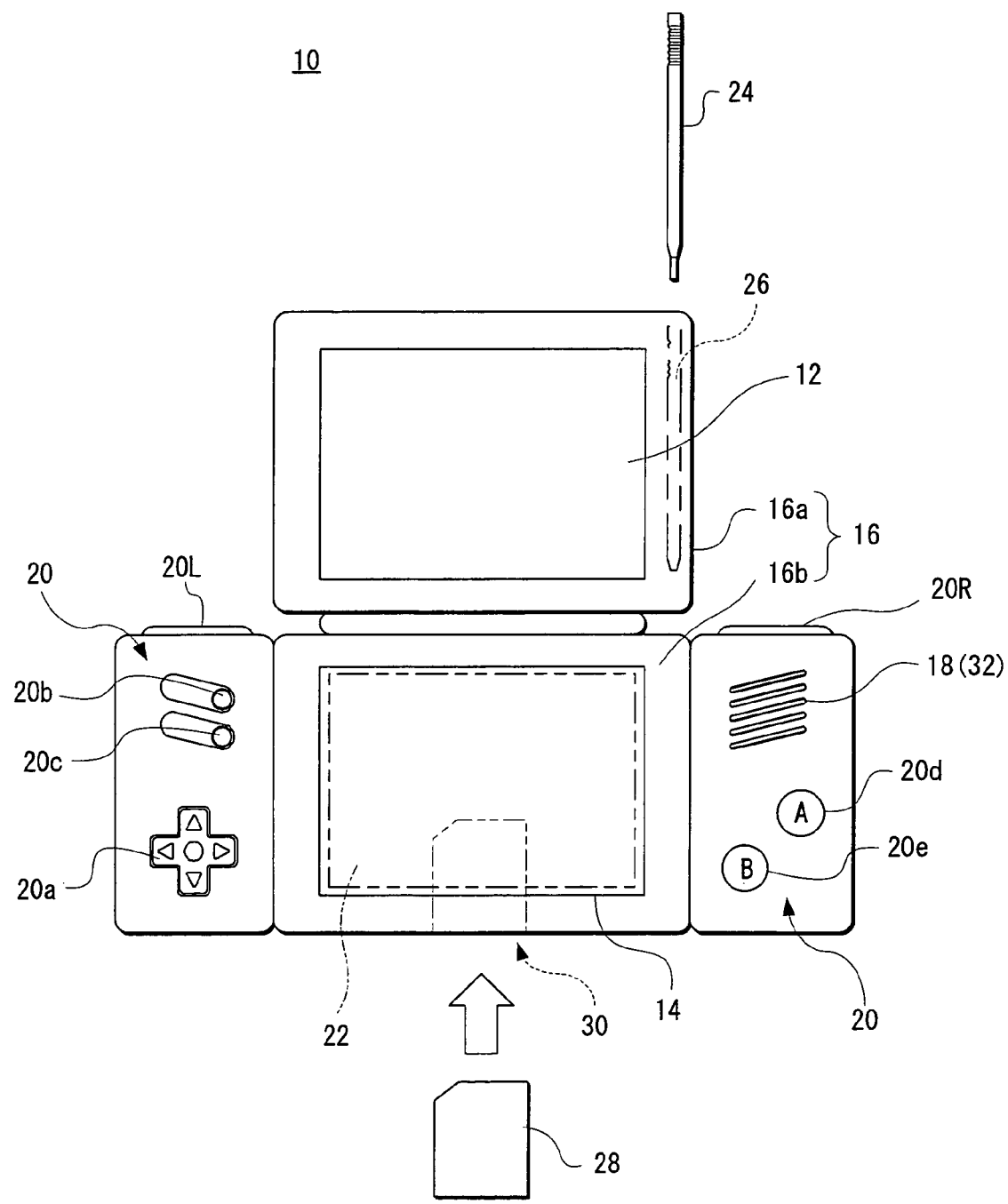
FIG. 1 is an illustrative view showing one example of a game apparatus in a first embodiment of this invention.

Referring to FIG. 1, a game apparatus 10 (hereinafter simply referred to as "game apparatus") of one embodiment of this invention includes a first liquid crystal display (LCD) 12 and a second LCD 14. The LCD 12 and the LCD 14 are provided on a housing 16 so as to be arranged in a predetermined position. In this embodiment, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although an LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed at a part of an upper edge (top surface) of the lower housing 16b at a place except for a connected portion, and lie of each side of the connected portion with the upper housing 16a.

The direction instructing switch 20a functions as a digital joystick, and is utilized for instructing a moving direction of a player character (or player object) to be operated by a player, instructing a moving direction of a cursor, and so forth by operating any one of four depression portions. The start switch 20b is formed by a push button, and is utilized for starting (restarting), suspending (pausing) a game, and so forth. The select switch 20c is formed by the push button, and utilized for a game mode selection, etc.

The action switch 20d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or commands, etc. The action switch 20e, that is, the B button is formed by the push button, and is utilized for changing a game mode selected by the select switch 20c, canceling an action determined by the A button 20d, and so forth.

The action switch (left depression button) 20L and the action switch (right depression button) 20R are formed by the push button, and the left depression button (L button) 20L and the right depression button (R button) 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one kind of a resistance film system, an optical system (infrared rays system) and an electrostatic capacitive coupling system, for example, can be utilized. In response to an operation by depressing, stroking (touching), and so forth with a stick 24, a pen (stylus pen), or a finger (hereinafter, referred to as "stick 24, etc.") on a top surface of the touch panel 22, the touch panel 22 detects a coordinates position of the stick 24, etc. to output coordinates position data.

It is noted that in this embodiment, a resolution of the display surface of the LCD 14 is 256 dots×192 dots, and a detection accuracy of a detection surface of the touch panel 22 is also rendered 256 dots×192 dots in correspondence to the resolution of the display surface (this is true for the LCD 12). However, detection accuracy of the detection surface of the touch panel 22 may be lower than the resolution of the display surface of the LCD 14, or higher than it.

In this embodiment, a game screen is displayed on the LCD 12, and text information, an icon, etc. are displayed on the LCD 14. Accordingly, the player is able to, for example, select a command indicated by the texture information, the icon, etc. displayed on the display screen of the LCD 14, instruct a scrolling (gradual moving display) direction of the game screen (map) displayed on the LCD 12, and so forth by operating the touch panel 22 with the use of the stick 24, etc. Furthermore, depending on the kind of the game, the player is able to use the LCD 14 for another various input instructions, such as selecting or operating the icon displayed on the LCD 14, instructing a coordinates input, and so forth.

Thus, the game apparatus 10 has the LCD 12 and the LCD 14 as a display portion of two screens, and the touch panel 22 is provided on an upper surface of any one of them (LCD 14 in this embodiment), and whereby, the game apparatus 10 has two screens (LCD 12, 14) and the operating portions (20, 22) of two systems.

Furthermore, in this embodiment, the stick 24 can be inserted into a housing portion (housing slot) 26 provided in proximity to a side surface (right side surface) of the upper housing 16a, for example, and taken out therefrom as necessary. It is noted that in a case of preparing no stick 24, it is not necessary to provide the housing portion 26.

Also, the game apparatus 10 includes a memory card (or game cartridge) 28, and the memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It is noted that although not illustrated in FIG. 1, a speaker 32 (see FIG. 2) is provided at a position corresponding to the sound hole 18 inside the lower housing 16b.

Furthermore although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
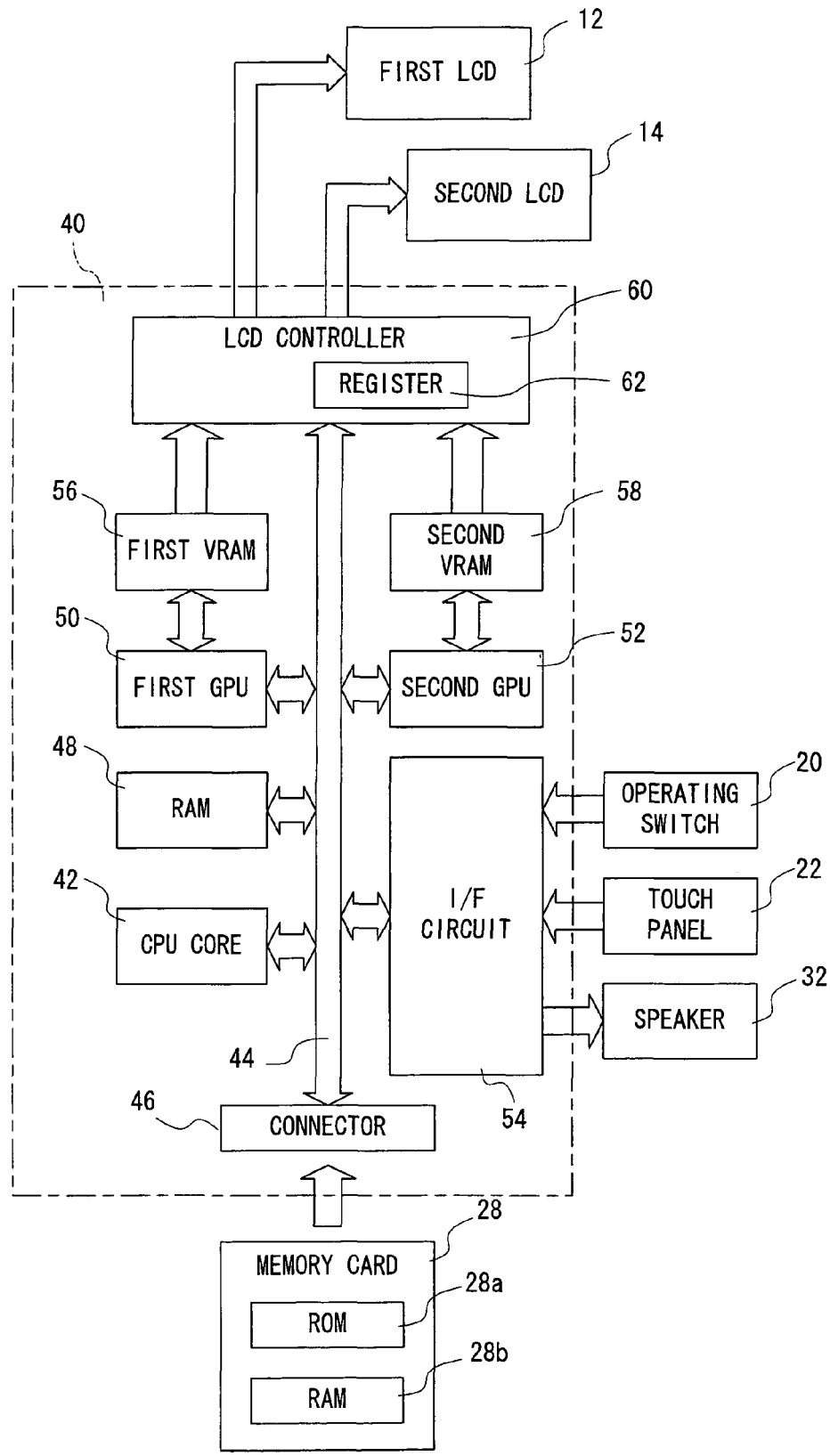
FIG. 2 is a block diagram showing an electric configuration of the game apparatus shown in FIG. 1.

FIG. 2 is a block diagram showing an electric configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b.

The ROM 28a stores in advance a game program for a game (virtual game) to be executed by the game apparatus 10, image data (character image, background image, item image, icon (button) image, message image, etc.), data of the sound (sound data) necessary for the game (music), etc. The RAM (backup RAM) 28b stores (saves) proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 executes a game process while storing in the RAM 48 data (game data and flag data) temporarily generated in correspondence with a progress of the game.

It is noted that such the game program, the image data, the sound data, etc. are loaded from the ROM 28a entirely at a time, or partially and sequentially so as to be stored (loaded) into the RAM 48.

Each of the GPU 50 and the GPU 52 forms a part of a rendering means, is constructed by, for example, a single chip ASIC, and receives a graphics command (construction command) from the CPU core 42 to generate game image data according to the graphics command. It is noted that the CPU core 42 applies to each of the GPU 50 and the GPU 52 an image generating program (included in the game program) necessary to generate game image data in addition to the graphics command.

It is noted that each of the GPU 50 and the GPU 52 gains access to the RAM 48 to fetch data (image data) required for executing the construction command by the GPU 50 and the GPU 52.

Furthermore, the GPU 50 is connected with a first video RAM (hereinafter, referred to as "VRAM") 56, and the GPU 52 is connected with a second VRAM 58. The GPU 50 renders the created game image data in the VRAM 56, and the GPU 52 renders the created game image data in the VRAM 58.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the game image data rendered in the VRAM 56 to the LCD 12, and outputs the game image data rendered in the VRAM 58 to the LCD 14 in a case that the data value of the register 62 is "0". Furthermore, the LCD controller 60 outputs the game image data rendered in the VRAM 56 to the LCD 14, and outputs the game image data rendered in the VRAM 58 to the LCD 12 in a case that the data value of the register 62 is "1".

The I/F circuit 54 is connected with the operating switch 20, the touch panel 22 and the speaker 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, the coordinates position data from the touch panel 22 is input to the CPU core 42 via the I/F circuit 54. In addition, the CPU core 42 reads-out the sound data necessary for the game such as a game music (BGM), a sound effect or voices of a game character (onomatopoeic sound), etc. from the RAM 48, and outputs it from the speaker 32 via the I/F circuit 54.

For example, in the game apparatus 10, it is possible to play the game by use of the operating switch 20 provided on the housing 16 (housing 16b), and it is also possible to play the game by use of the operation button (operation panel) displayed on the LCD 14. In this embodiment, the operation button set on the operation panel 22, that is, the operation button displayed on the LCD 14 (touch panel screen) can arbitrarily be set by the player. That is, it is possible to arbitrarily set a figure, a position, a size, and a function (command) of the button as to the operation button displayed on the LCD 14.

This is because that although in the game apparatus 10 (it is true for a general game apparatus), an arrangement of the operation button 20 is determined taking operability of a right-handed player, there is a problem of making it difficult to operate for a left-handed player. Furthermore, not all right-handed players feel ease of operation, and not all players feel ease of operation.

Such the setting of the operation button can be performed for each character to be operated by the player (operation character), that is, the player character. The content of the setting is stored in the RAM 48, and during the game, a content of the setting corresponding to the player character is reads-out from the RAM 48 to display the operation button on the LCD 14. In addition, a display of the operation button is modified according to the change of the player character. Furthermore, in correspondence with the proceeding of the game, the size of the operation button is changed, the function of the operation button is changed, or a special operation button is displayed/non-displayed, and so forth.

It is noted that although the operation button is arbitrarily set on the touch panel 22 in this embodiment, in a case of starting the game from the top, the operation button set in advance is displayed in the form of a predetermined figure in a predetermined size at a predetermined position. Thereafter, in correspondence with the progress of the game, the size of the operation button may be changed, the function of the operation button may be changed, or a special operation button may be displayed/non-displayed. Alternatively, the operation button set in advance is displayed in a predetermined figure in a predetermined size at a predetermined position, and before starting a main story of the game, the setting may be changed.

Figure 3:
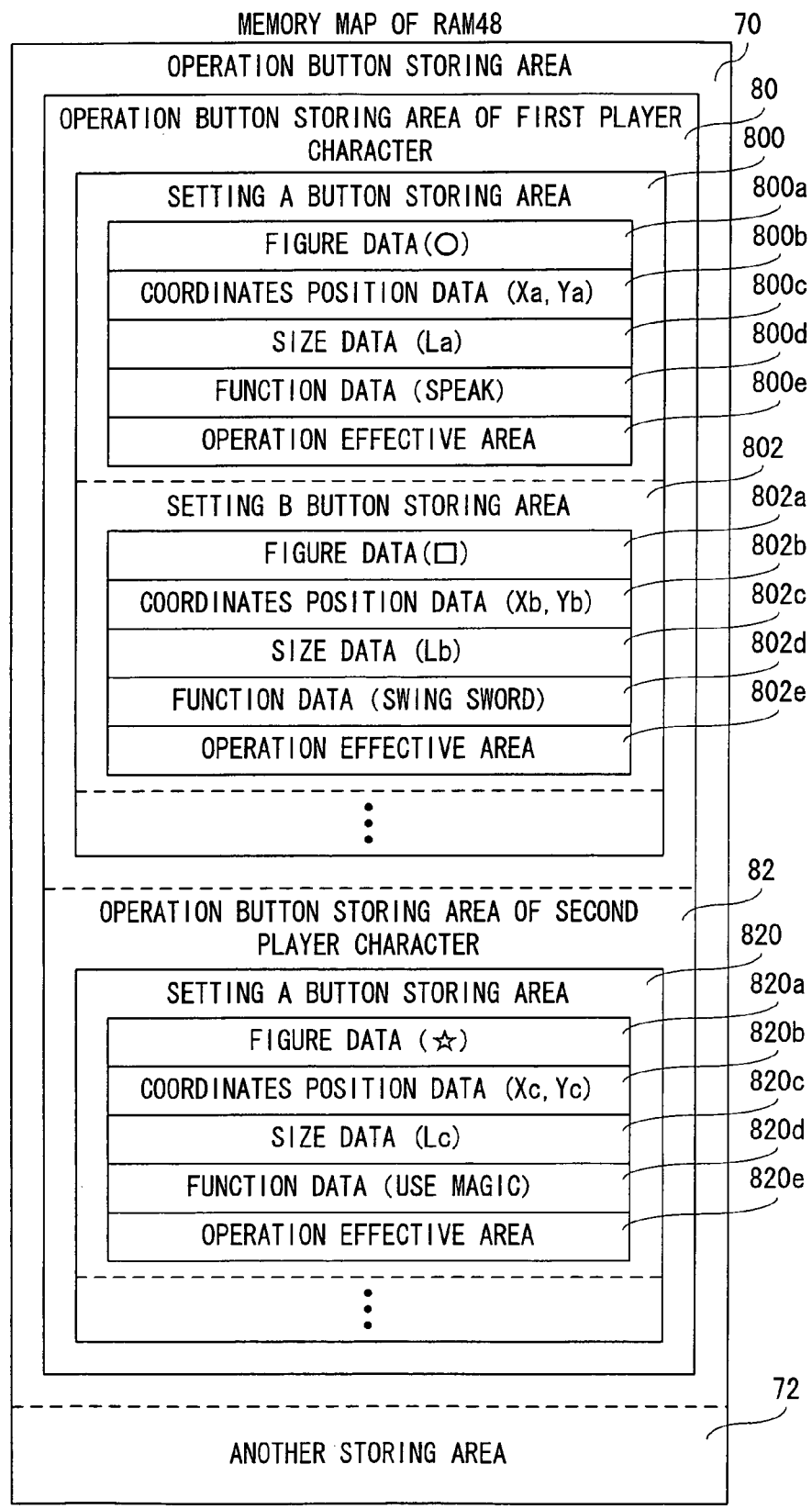
FIG. 3 is an illustrative view showing a memory map of a RAM (working memory) of the game apparatus shown in FIG. 2.

FIG. 3 shows a memory map of the RAM 48. As shown in FIG. 3, the RAM 48 includes an operation button storing area 70 and another storing area 72. Although illustration is omitted for the sake of drawings, the game program, the image data, the sound data, etc. loaded from the ROM 28a and the game data (including a flag and a counter) generated inc correspondence with progress of the game are stored in the other storing area 72.

The operation button storing area 70 includes an operation button storing area 80 of a first player character, an operation button storing area 82 of a second player character, etc. Here, the first player character and the second player character are player characters selected by the player, and not fixedly determined.

In the operation button storing area 80 of the first player character, a setting A button storing area 800, a setting B button storing area 802, etc. are provided. Here, the "A button", the "B button", etc. are names applied as a matter of convenience in order to distinguish the operation button set by the player, and do not mean that they have functions the same as the above-described A button 20d, and B button 20e. It is noted that they may have the same function depending on the setting of the player.

The setting A button storing area 800 stores attribute information as to the A button set by the player in correspondence to the first player character. More specifically, the setting A button storing area 800 stores as attribute information as to the A button figure data 800a, coordinates position data 800b, size data 800c, function data 800d, and operation effective area data 800e.

For example, the figure data 800a is image (figure) data in the form of a circle prepared in advance as a default or a label indicative of a figure of the circle. The coordinates position data 800b is data of central coordinates (Xa, Ya) of the figure (circle). The size data 800c is data of a length from a center of the circle to an apex, that is, a radius (La). The function data 800d is data indicative of a command input of "talk (speak)" or a label indicative of the command. Here, although one function is set for simplicity, two or more functions may be set. This is because that in the action RPG, an input command (function) of the same operation button is different between when a player character moves on a map and when the player character fights with the enemy character in a fighting scene. Hereinafter, this is the same.

Then, the operation effective area data 800e is a coordinates position data collection for determining whether or not an operation of the operation button (A button, here) is effective. These are the coordinates position data indicative of a position on the touch panel 22 in correspondence to the display area in a case of displaying operation button on the LCD 14, and correspond to respective dots within the display area. Accordingly, when the coordinates position data is fetched from the touch panel 22 during the game process based on the operation of the touch panel 22, it is determined whether or not the coordinates position data is coincident with the operation effective area data, and whereby, it is possible to easily determine whether or not the operation button is operated. Hereinafter, this is the same.

It is noted that the operation effective area (of data) is not necessarily set, by determining whether or not the operation button is displayed at the coordinates position indicated by the coordinates position data fetched from the touch panel 22, whether or not the operation button is operated can also be determined.

The setting B button storing area 802 stores the attribute information as to the B button set in correspondence with the first player character by the player. More specifically, the setting B button storing area 802, similarly to the setting A button storing area 800, stores figure data 802a, coordinates position data 802b, size data 802c, function data 802d and operation effective area data 802e. For example, the figure data 802a is image (figure) data in the form of a square prepared in advance as a default, or a flag indicative of the square figure. The coordinates position data 802b is central coordinates (Xb, Yb) data of the figure (square). The size data 802c is data of a length (Lb) from the center of the square to an apex. The function data 802d is data indicative of a command input of the "swing a sword", or a label indicative of the command. Then, the operation effective area data 802e is a coordinates position data collection for determining whether or not an operation of the operation button (B button, here) is effective.

In the operation button storing area 82 of the second player character, the setting A button storing area 820, etc. is provided. The setting A button storing area 820 stores the attribute information as to the A button set in correspondence to the second player character by the player. Here, the "A button" is a name applied by the player in order to distinguish the operation button set in correspondence to the second player character by the player as a matter of convenience, and this does not mean that they have functions the same as the above-described A button 20d, and B button 20e. Furthermore, this does not mean having the same figure, position, size, function and operation effective area as the A button, etc. set in correspondence to the first player character. It is noted that this may be settable so as to have a function the same as the A button 20d and the B button 20e, and can be set with a figure, etc. the same as the A button, etc. in correspondence to the first player character.

The setting A button storing area 820 stores figure data 820a, coordinates position data 820b, function data 820c, and operation effective area data 820d. For example, the figure data 820a is image (figure) data in the form of a star prepared in advance as a default and a flag indicative of the figure of the star. The coordinates position data 820b is data of the central coordinates (Xc, Yc) of the figure (star). The size data 820c is data of a length (Lc) from the center of the star to an apex. The function data 820d is data indicative of a command input of "use a magic", or a label indicative of the command. Then, the operation effective area data 820e is a coordinates position data collection indicative of whether or not an operation of the operation button (A button, here) is effective.

Such the setting of the operation button and the attribute information can be performed before starting the main story of the game. During the game, the operating switch 20 or the operation button set on the touch panel 22 can be used. In addition, in the game process based on the operation of the touch panel 22, as described above, the attribute information of the set operation button is modified in correspondence to the progress of the game, or a special operation button is displayed (usable)/non-displayed (unusable).

Figure 4:
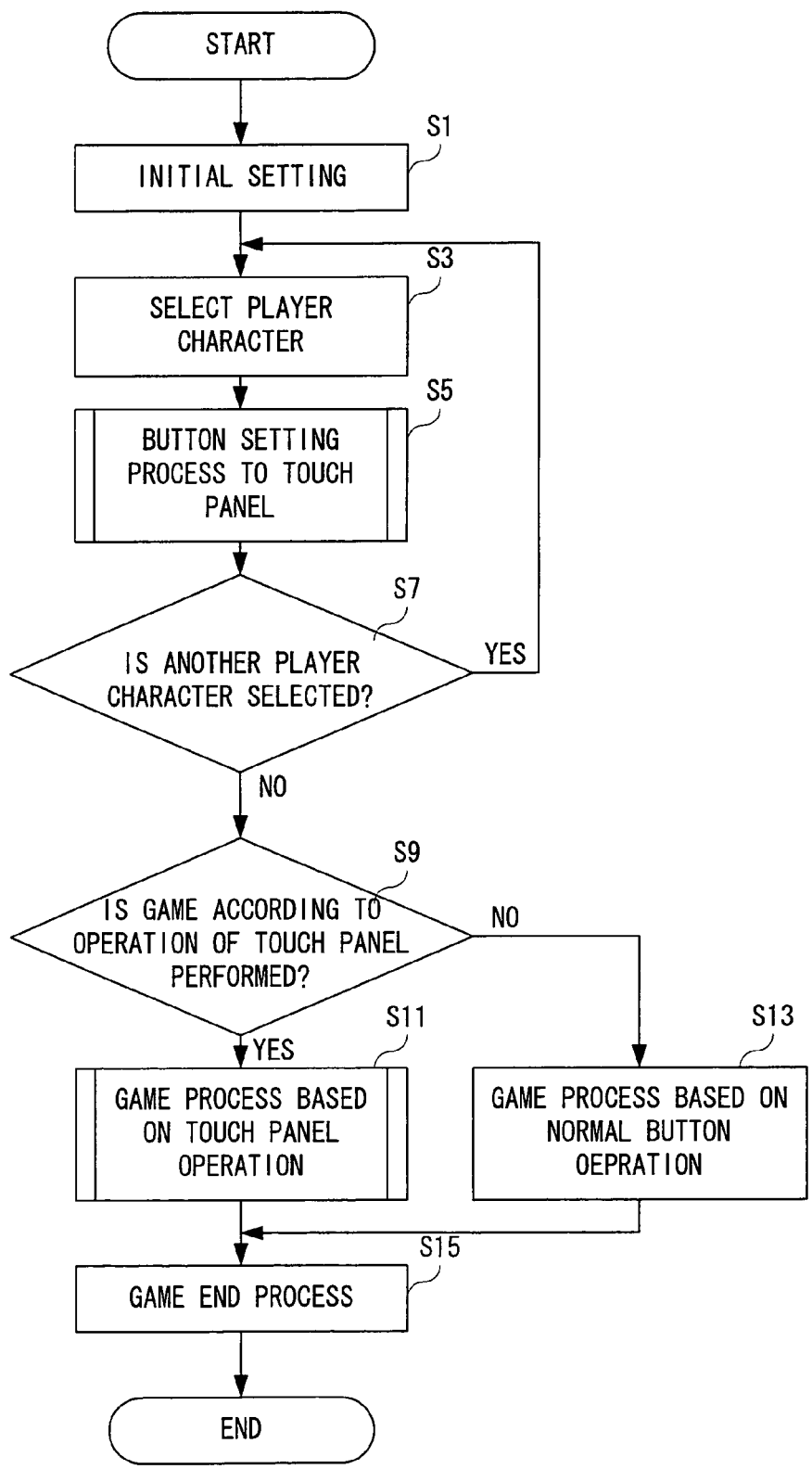
FIG. 4 is a flowchart showing an entire process of a CPU core shown in FIG. 2.

A detailed content is described by use of flowcharts shown in FIG. 4 and the succeeding, and display examples of the LCD 12 and the LCD 14. It is noted that the CPU core 42 shown in FIG. 2 processes according to the flowchart shown in FIG. 4 and the succeeding.

FIG. 4 is the flowchart showing an entire process of the CPU core 42. When a main power supply of the game apparatus 10 is turned on, the CPU core 42 starts a process, and executes an initial setting in a step S1. For example, here, various flags are initialized (turned off), the VRAMs 56, 58 are initialized, and so forth. In a succeeding step S3, a player character is selected, and in a step S5, a button setting process (see FIG. 5 and FIG. 6) to the touch panel to be described later in detail is executed.

It is noted that in the step S3, strictly speaking, the CPU core 42 displays a selection screen (not illustrated) of the player character to allow the player to select arbitrary (desired) player character.

Then, in a step S7, it is determined whether or not another player character is selected. That is, a screen (not illustrated) for determining whether or not to select another player character is displayed to allow the player to select any one of them. If "YES" in the step S7, that is, if another player character is selected, the process returns to the step S3. On the other hand, if "NO" in the step S7, that is, if another player character is not selected, the process proceeds to a step S9.

Thus, by executing such the processes in the steps S3 to S7, the player can select one or more player characters, and can execute a setting (S5) of the operation button with respect to the selected player character.

In the step S9, it is determined whether or not the game according to an operation of the touch panel is executed.

Here, a screen (not illustrated) for determining whether or not to execute the game according to the operation of the touch panel is displayed to allow the player to determine any one of them. If "YES" in the step S9, that is, if the game according to the operation of the touch panel is executed, a game process according to the operation of the touch panel (see FIG. 17 to FIG. 19) to be described later in detail is executed in a step S11, and then, the process proceeds to a step S15. On the other hand, if "NO" in the step S9, that is, if the game according to the operation of the touch panel is not executed, a normal game process based on a button operation (operating switch 20) is executed, and then, the process proceeds to the step S15.

In the step S15, a game end process is executed to end the entire process. For example, in the step S15, in a case that a game over flag is turned on during the game process in the step S11 or S13, the game end process is executed.

Figure 5:
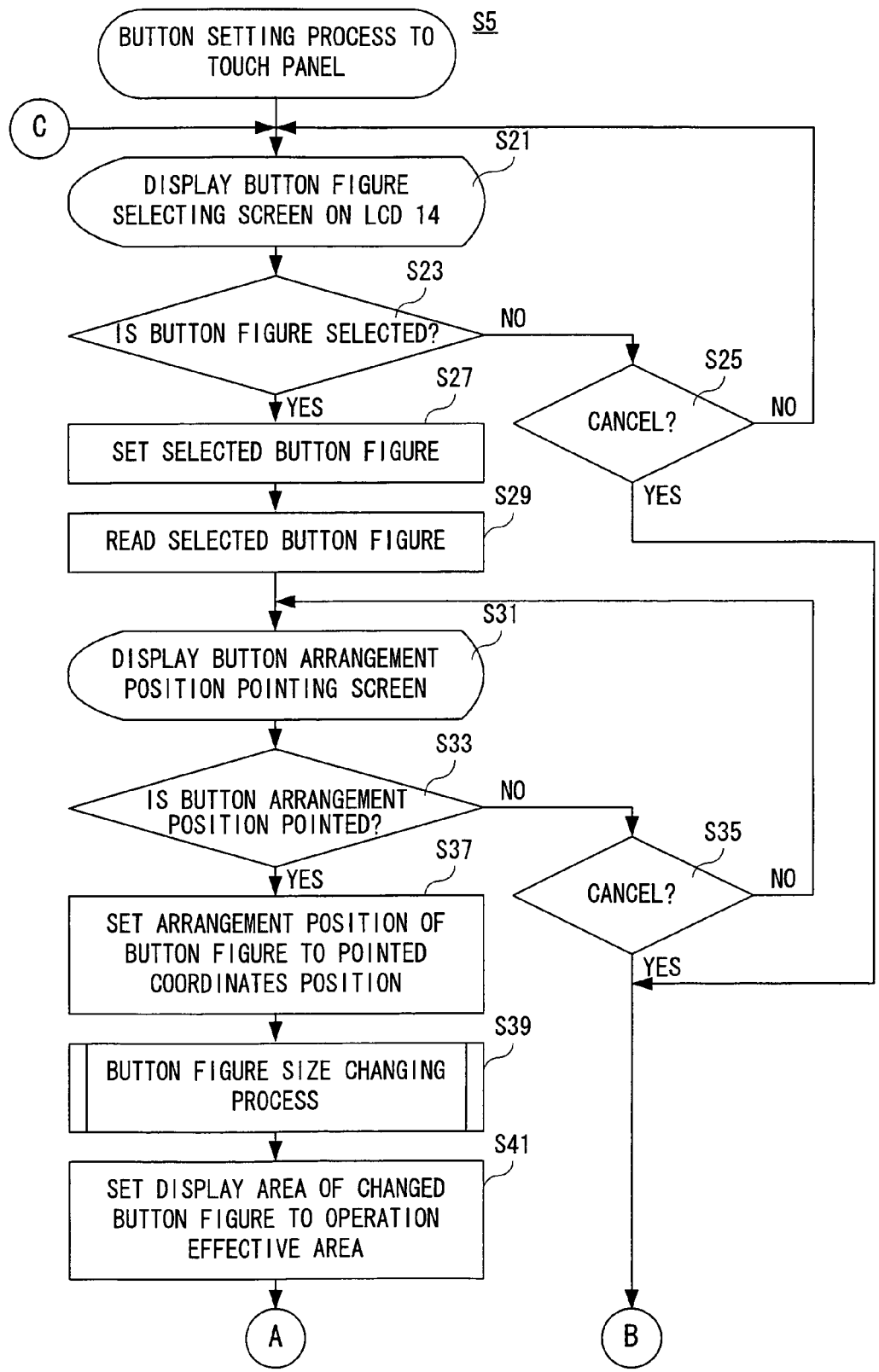
FIG. 5 is a flowchart showing one part of a button setting process to a touch panel by the CPU core shown in FIG. 2.
Figure 6:
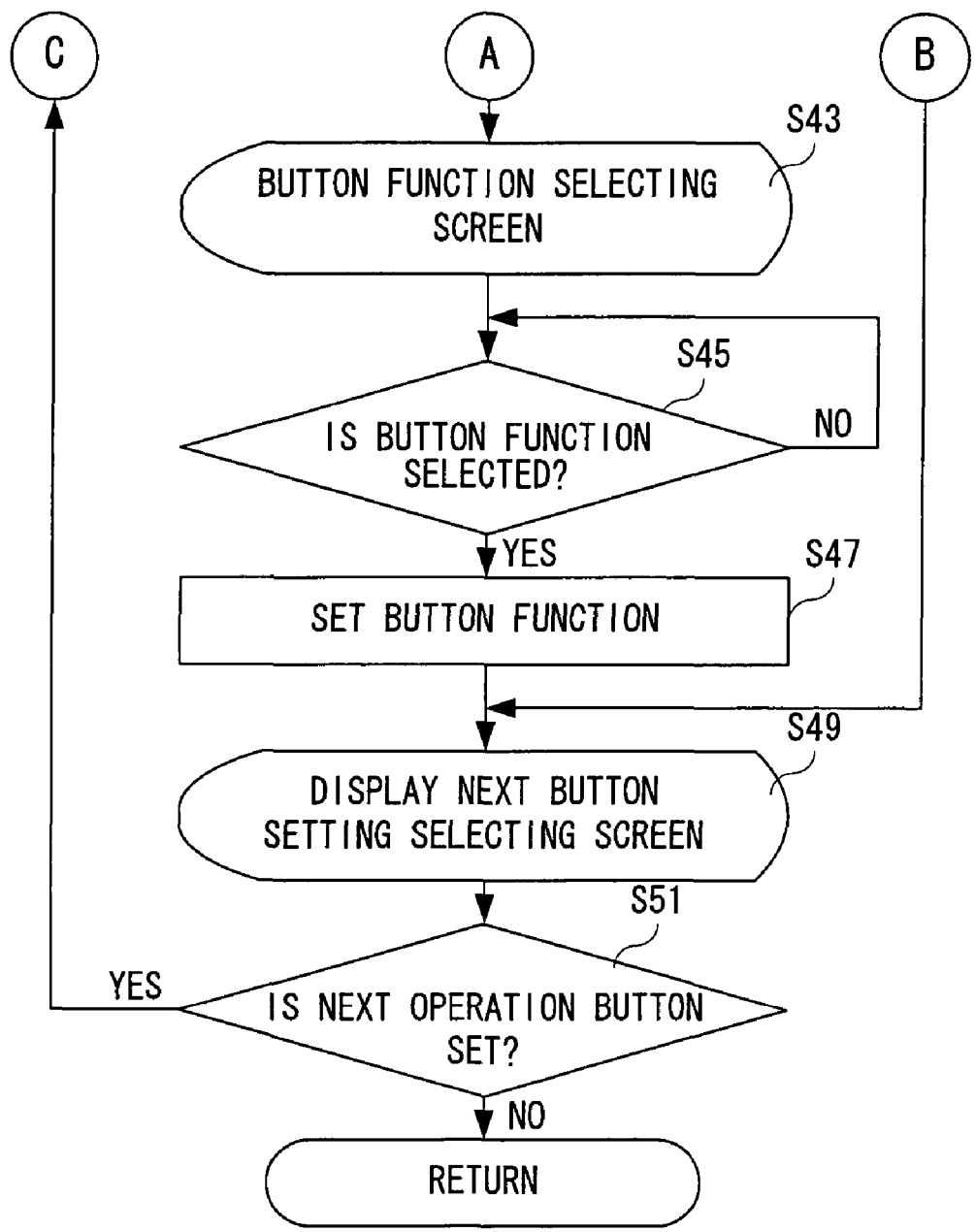
FIG. 6 is a flowchart showing another part of the button setting process to the touch panel by the CPU core shown in FIG. 2.
Figure 9:
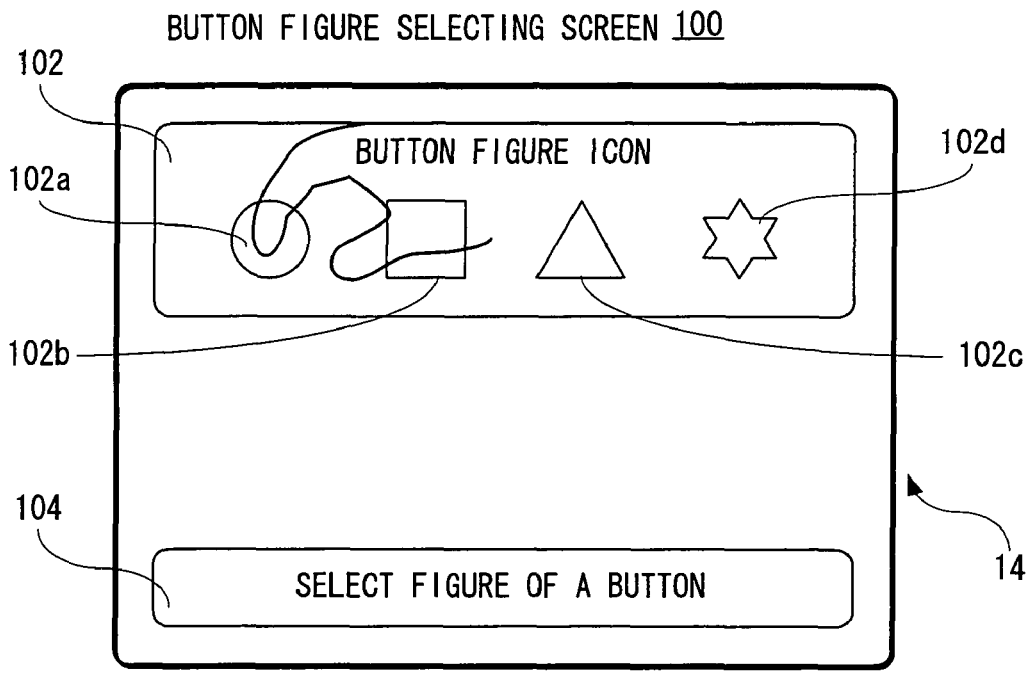
FIG. 9 is an illustrative view showing one example of a button figure selecting screen displayed on a second LCD of the game apparatus shown in FIG. 1.

FIG. 5 and FIG. 6 show a flowchart showing the button setting process to the touch panel in the step S5 shown in FIG. 4. As shown in FIG. 5, when the button setting process is started, a button figure selecting screen 100 shown in FIG. 9 is displayed on the LCD 14 in a step S21. Referring to FIG. 9, the button figure selecting screen 100 is provided with a button figure icon displaying area 102 at an upper part of the screen, and message displaying area 104 at a lower part of the screen. In the button figure icon displaying area 102, button figures (designs) 102a, 102b, 102c and 102d prepared as a default are displayed. It is noted that these button figures are a simple example, or may be another figure. Alternatively, a multiplicity of button figures may be displayed. In the message displaying area 104, a message instructing a selection of the button figure as to the button (A button, here) first set is displayed. Accordingly, on the button figure selecting screen 100, a button figure as to the A button to be set can be selected, and at a time of selection, a touch (depression) on the LCD 14 (touch panel 22) with the stick 24, etc. is appropriate.

Returning to FIG. 5, in a succeeding step S23, it is determined whether or not the button figure is selected. Here, a position (coordinates position) on the LCD 14 corresponding to the coordinates position indicated by the coordinates position data from the touch panel 22 is specified, and it is determined whether or not a button figure 102a, 102b, 102c or 102d displayed on the specified position is present. Furthermore, in a case that the button figure 102a, 102b, 102c or 102d displayed at the specified position is present, the button figure 102a, 102b, 102c or 102d is specified.

It is noted that similalry to the operation button set by the player, an operation effective area corresponding to each of the button figures 102a to 102d is set on the touch panel 22, it is possible to determine whether or not the button figure is selected on the basis of the coordinates position data from the touch panel 22, and, if the button figure is selected, easily determine which is the selected button figure.

If "NO" in the step S23, that is, if the button figure is not selected, it is determined to be canceled or not in a step S25. That is, it is determined whether or not a setting as to the A button is stopped. More specifically, it is determined whether or not the cancel button (B button 20e in this embodiment) is turned on. It is noted that the cancel button (icon) is displayed on the LCD 14 to be operable with the stick 24, etc. The same is true for the later description. If "NO" in the step S25, that is, if it is not canceled, it is determined that no button figure is selected, and then, the process returns to the step S21. However, if "YES" in the step S25, that is, if it is canceled, the process proceeds to a step S49 shown in FIG. 6.

Alternatively, if "YES" in the step S23, that is, if the button figure is selected, the selected button figure is set in a step S27.

Figure 10:
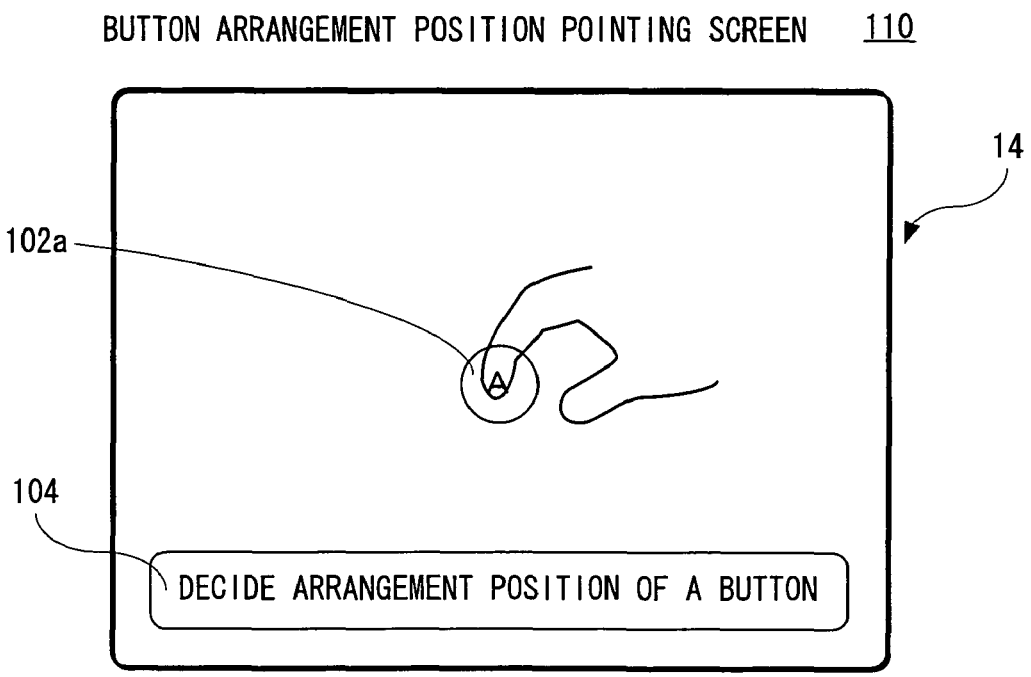
FIG. 10 is an illustrative view showing one example of a button arrangement position pointing screen displayed on the second LCD of the game apparatus shown in FIG. 1.

Here, as shown in FIG. 3, the button figure data is written to the RAM 48 in correspondence to the player character selected in the step S3 shown in FIG. 4. In a succeeding step S29, the image data of the selected button figure is read from the RAM 48, and in a step S31, a button arrangement position pointing screen 110 shown in FIG. 10 is displayed on the LCD 14. Referring to FIG. 10, on the button arrangement position pointing screen 110, a message displaying area 104 is provided at the lower part of the screen. Furthermore, on the button arrangement position pointing screen 110, the selected button figure (button figure 102a, here) is displayed at the center of the screen. In the message displaying area 104, a message indicative of pointing the arrangement position as to the button (A button, here) to be set is displayed. Accordingly, the player can arbitrarily designate the arrangement position of the A button by the stick 24, etc. In a case that the arrangement position of the A button designated, it becomes possible to touch (depress) the LCD 14 (touch panel 22) in order to designate (click) a desired (arbitrary) arrangement position, and to stroke the LCD 14 (touch panel 22) in order to move (drag) the button figure 102a to a desired arrangement position. It is noted that the designated arrangement position is the central position of the button figure.

Returning to FIG. 5, in a succeeding step S33, it is determined whether or not the button arrangement position is pointed. Here, it is determined whether or not the above-described designating operation of the arrangement position is present on the basis of the coordinates position data from the touch panel 22. If "NO" in the step S33, that is, if the button arrangement position is not pointed, it is determined whether or not to be canceled in a step S35. Here, if it is not canceled, "NO" is determined, and the process directly returns to the step S31 while if it is canceled, "YES" is determined, and the process directly proceeds to the step S49.

On the other hand, if "YES" in the step S33, that is, if the button arrangement position is pointed, the button figure arrangement position is set to a pointed coordinates position in a step S37. That is, the coordinates position data is written to the RAM 48 in correspondence to the player character. In a following step S39, a size changing process of the button figure (see FIG. 7 and FIG. 8) is executed. In this embodiment, two ways of the size changing process of the button figure is present, and FIG. 7 shows a flowchart of a size changing process of the button figure (1), and FIG. 8 shows a flowchart of a size changing process of the button figure (2).

It is noted that it is appropriate that any one of these processes is executed, and can be set in advance by a programmer or a developer of the game, or selected by the player on the menu screen.

Figure 7:
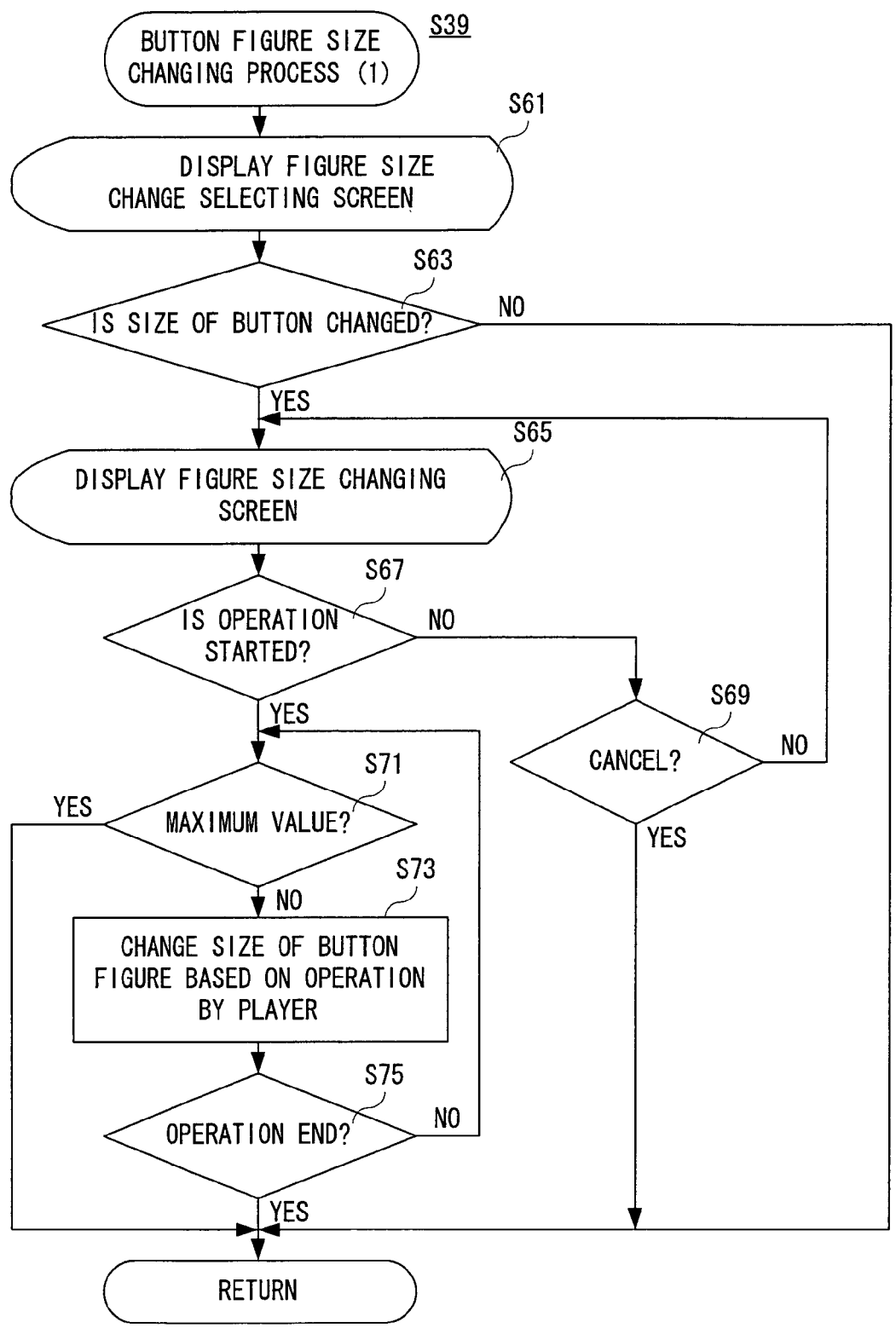
FIG. 7 is a flowchart showing a button figure size changing process (1) by the CPU core shown in FIG. 2.
Figure 8:
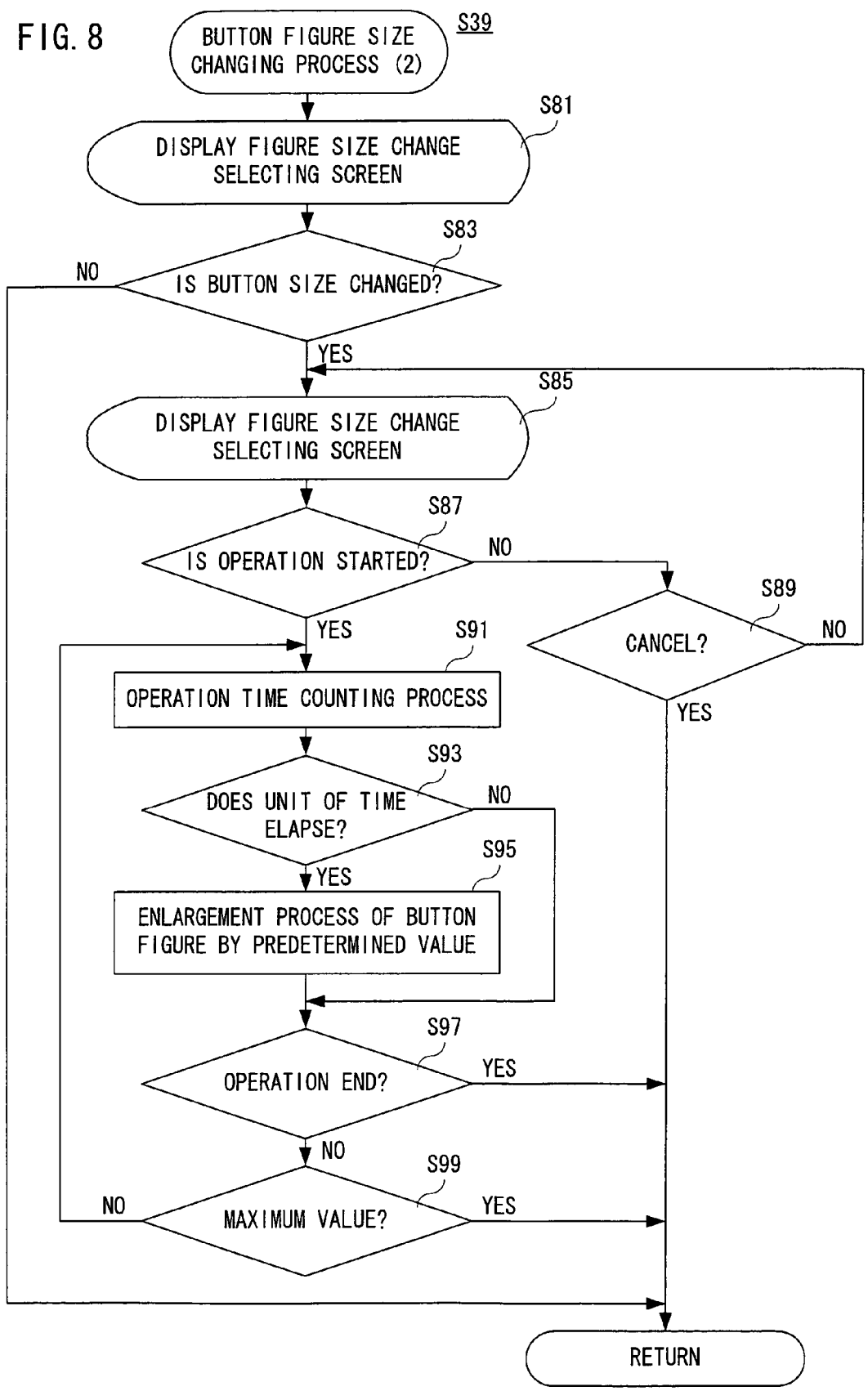
FIG. 8 is a flowchart showing a button figure size changing process (2) by the CPU core shown in FIG. 2.
Figure 11:
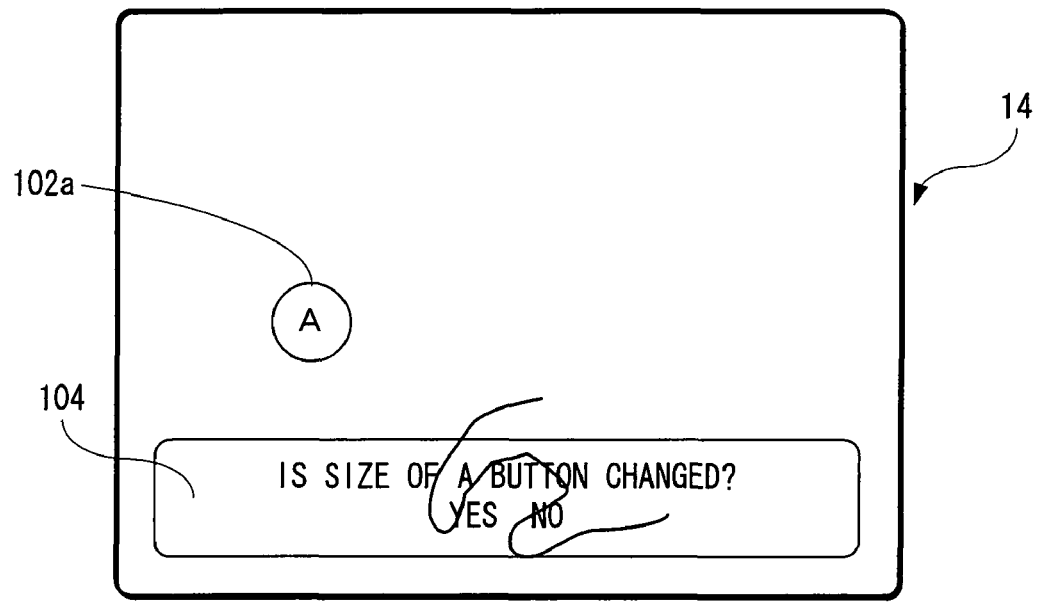
FIG. 11 is an illustrative view showing one example of a button figure size change selecting screen displayed on the second LCD of the game apparatus shown in FIG. 1.

Referring to FIG. 7, when the button figure size changing process (1) is started, a button figure size change selecting screen 120 as shown in FIG. 11 is displayed on the LCD 14 in a step S61. The screen 120 is a screen for selecting whether or not the figure size of the button is changed. Referring to FIG. 11, on the button figure size change selecting screen 120, a message displaying area 104 is provided at the lower part of the screen. Furthermore, a button figure 102a of the A button is displayed at the left from the center of the screen. That is, the button figure 102a is displayed at the arrangement position pointed on the button arrangement position pointing screen 110 shown in FIG. 10.

Furthermore, in the message displaying area 104, a message allowing the player to select whether or not to change the button size is displayed. As can be understood from FIG. 11, in this embodiment, "YES" and "NO" are displayed as the message so as to be selected by the stick 24, etc., but this may be selected by use of the operating switch 20. For example, when the A button 20d is turned on (operated), it is determined the size of the button figure is changed while when the B button 20e is turned on, it is determined the size of the button figure is not changed.

Returning to FIG. 7, in a succeeding step S63, it is determined whether or not the button size is to be changed. That is, it is determined whether or not "YES" is selected. If "NO" in the step S63, that is, if "NO" is selected, it is determined the size of the button figure is not changed, and then, the button figure size changing process (1) is directly returned. On the other hand, if "YES" in the step S63, that is, if "YES" is selected, it is determined that the size of the button figure is changed, and in a step S65, a figure size changing screen 130 as shown in FIG. 12 is displayed on the LCD 14.

Figure 12:
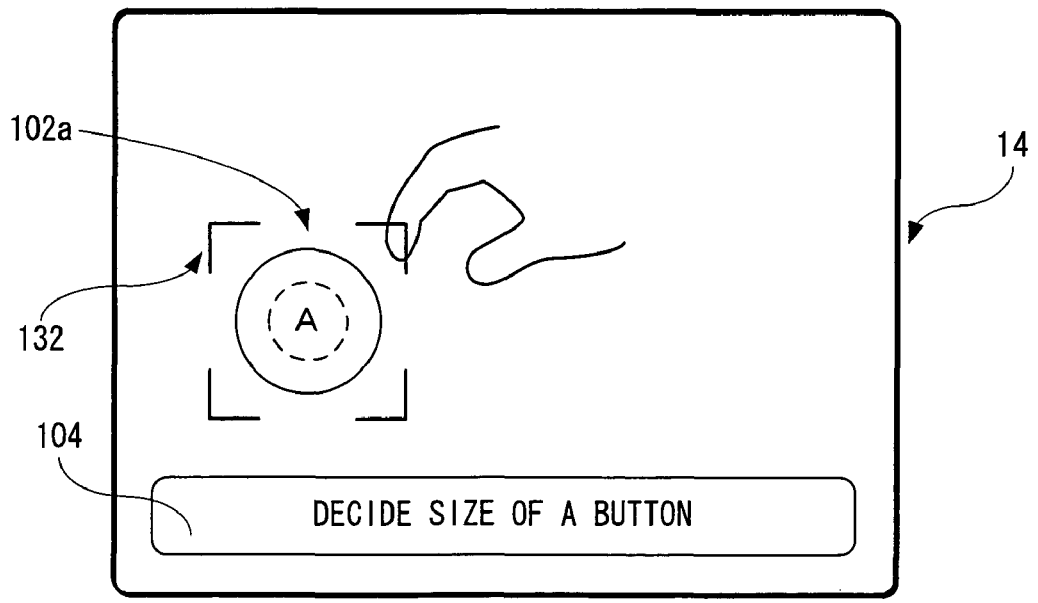
FIG. 12 is an illustrative view showing one example of a button figure size changing screen displayed on the second LCD of the game apparatus shown in FIG. 1.

Referring to FIG. 12, as to the figure size changing screen 130, a message displaying area 104 is provided at the lower part of the screen. Furthermore, on the figure size changing screen 130, the button figure 102a as to the A button is displayed at the left from the center of the screen (displayed by dotted lines in FIG. 12), and guide lines 132 for changing the size is displayed around it. In addition, in the message displaying area 104, a message prompting the player to determine the size of the button figure 102a is displayed.

For example, the player strokes the LCD 14 (touch panel 22) by moving any one of the guide lines 132 such that the button figure becomes a size desired to be changed. Thereupon, corresponding thereto, the size of the button figure 102a is changed. In this embodiment, in order to display a text (name and function of the button) in the button figure, a size of the button figure to be displayed as a default is rendered minimum, and the size of the button figure 102a can be changed (reduced or enlarged) within the minimum value. It is noted that a maximum value of the size of the button figure may be set in advance as described later.

It is noted that although the stick 24, etc. strokes the LCD 14 so as to move the guide lines 132 in this embodiment, the button figure may be enlarged depending on the number of times of designating (touching or depressing) the button figure (102a). In such a case, the button figure can be enlarged such that a distance from the center of the button figure to the apex (radius in the button figure 102a) is extended by a predetermined value (predetermined length) successively or every predetermined number of times.

Returning to FIG. 7, in a following step S67, it is determined whether or not the operation is started. That is, it is determined whether or not an operation of the stick 24, etc. is started so as to move the guide lines 132. If "NO" in the step S67, that is, if the operation is not started, it is determined whether or not to be canceled in a step S69. Here, if it is not canceled, "NO" is determined, and the process directly returns to the step S65 while if it is canceled, "YES" is determined, and the button figure size changing process (1) is directly returned.

On the other hand, if "YES" in the step S67, that is, if the operation is started, it is determined whether or not to be the maximum value in a step S71. That is, it is determined whether or not the size of the button figure (102a) becomes the maximum value set in advance. It is noted that the maximum value is arbitrarily set in advance with respect to each of the button figures 102a, 102b, 102c, 102d on the basis of the size, etc. of the LCD 14 by the programmer or the developer of the game.

If "YES" in the step S71, that is, if it is the maximum value, the button figure size changing process (1) is returned. In this case, the size of the button figure 102a is set to the maximum value, and the size data is written to the RAM 48 in correspondence to the player character. On the other hand, if "NO"

in the step S71, that is, if it is not the maximum value, the size of the button figure is changed on the basis of the operation by the player in a step S73. Here, the button figure is displayed in an enlarged or reduced manner such that a distance (radius in the button figure 102a) from the center of the button figure to the apex is extended by a moving length of the guide lines 132. It is noted that the button figure changed in size has similar figure to the button figure before change.

Then, in a step S75, it is determined whether or not the operation is completed. Here, it is determined whether or not the stick 24, etc. is released from the LCD 14 (touch panel 22), that is, whether or not the coordinates position data is not input from the touch panel 22. If "NO" in the step S75, that is, if the operation is not completed, the process directly returns to the step S71. On the other hand, if "YES" in the step S75, that is, if the operation is completed, the button figure size changing process (1) is returned. In this case, the size of the button figure 102a is set to the size directed (designated) by the player, and the size data is written to the RAM 48 in correspondence to the player character.

It is noted that if "NO" in the step S63, or if "YES" in the step S69, the size of the button figure 102a is set to the default value, and the size data is written to the RAM 48 in correspondence to the player character.

FIG. 8 shows a flowchart showing the button figure size changing process (2). Here, the size of the button figure is changed according to the time length during which the button figure displayed on the LCD 14 is designated by the player by use of the stick, 24 etc. Hereafter, although the description is made in detail, the same process and the same screen as the button figure size changing process (1) shown in FIG. 7 is briefly described.

Figure 13:
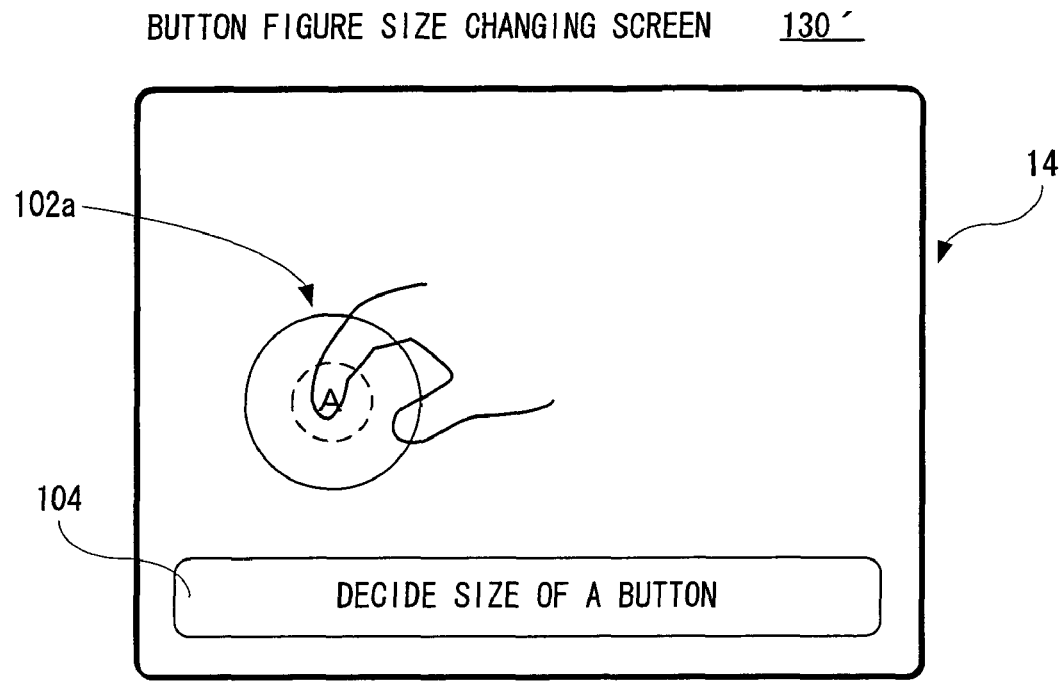
FIG. 13 is an illustrative view showing another example of the button figure size changing screen displayed on the second LCD of the game apparatus shown in FIG. 1.

As shown in FIG. 8, when the button figure size changing process (2) is started, the figure size change selecting screen 120 shown in FIG. 11 is displayed on the LCD 14 in a step S81. In a following step S83, it is determined whether or not the button size is changed. In a case the button size is not changed, "NO" is determined, and the button figure size changing process (2) is directly returned while in a case that the button size is changed, "YES" is determined, a button figure size changing screen 130' shown in FIG. 13 is displayed on the LCD 14 in a step S85. The button figure size changing screen 130' is the same as the button figure size changing screen 130 except that the guide lines 132 are not displayed, and therefore, a duplicated description is omitted.

In a step S87, it is determined whether or not the operation is started. Here, it is determined whether or not the player starts to point (designate) the button figure 102a by use of the stick 24, etc. If "NO" in the step S87, that is, if the operation is not started, it is determined whether or not to be canceled in a step S89. Here, if it is not canceled, "NO" is determined, and the process directly returns to the step S85 while if it is canceled, "YES" is determined, the button figure size changing process (2) is directly returned.

On the other hand, if "YES" in the step S87, that is, if the operation is started, an operation time period starts to be counted in a step S91. Although omitted in FIG. 2, an internal timer of the game apparatus 10 starts to be counted. It is noted that the internal timer counts a unit of time (three seconds, for example), and, when the time is up, is repeatedly reset and started until the button figure size changing process (2) is completed (returned). In a following step S93, it is determined whether or not the unit of time (three seconds, here) elapses. Here, if the unit of time does not elapse, "NO" is determined, and the process directly proceeds to a step S97. On the other hand, if the unit of time elapses, "YES" is determined, the button figure is enlarged by a predetermined value in a step S95, and the process proceeds to the step S97. In the step S95, an enlargement process is executed such that the length from the center of the button figure (design) is extended by a length set in advance. Thus, the button figure is set so as to be gradually enlarged. It is noted that it may be successively enlarged according to the elapse of time.

In the step S97, it is determined whether or not the operation is completed. If "YES" in the step S97, that is, if the operation is completed, the button figure size changing process (2) directly is returned. In this case, the size of the button figure is set to the size at a time that the player releases the stick 24, etc. from the LCD 14 (touch panel 22), and the size data is written to the RAM 48 in correspondence to the player character.

On the other hand, if "NO" in the step S97, that is, if the operation is not completed, it is determined whether or not the size of the button figure is the maximum value in a step S99. If "NO" in the step S99, that is, if the size of the button figure is not the maximum value, the process directly returns to the step S91. On the other hand, if "YES" in the step S99, that is, the size of the button figure is the maximum value, the button figure size changing process (2) is returned. In this case, the size of the button figure is set to the maximum value, and the size data is written to the RAM 48 in correspondence to the player character.

It is noted that if "NO" in the step S83, or if "YES" in the step S89, the size of the button figure is set to the initial value, the size data is written to the RAM 48 in correspondence to the player character.

Returning to FIG. 5, when the button figure size changing process is completed, an area on the touch panel 22 corresponding to the display area (closed region) of the button figure changed in a step S41 is set as an operation effective area. That is, a position coordinates data collection on the touch panel 22 corresponding to the display area of the operation button is written to the RAM 48 in correspondence to the player character.

It is noted that in a case that the size of the button figure is not changed in the button figure size changing process, the display area of the button figure of the default is set as the operation effective area.

Figure 14:
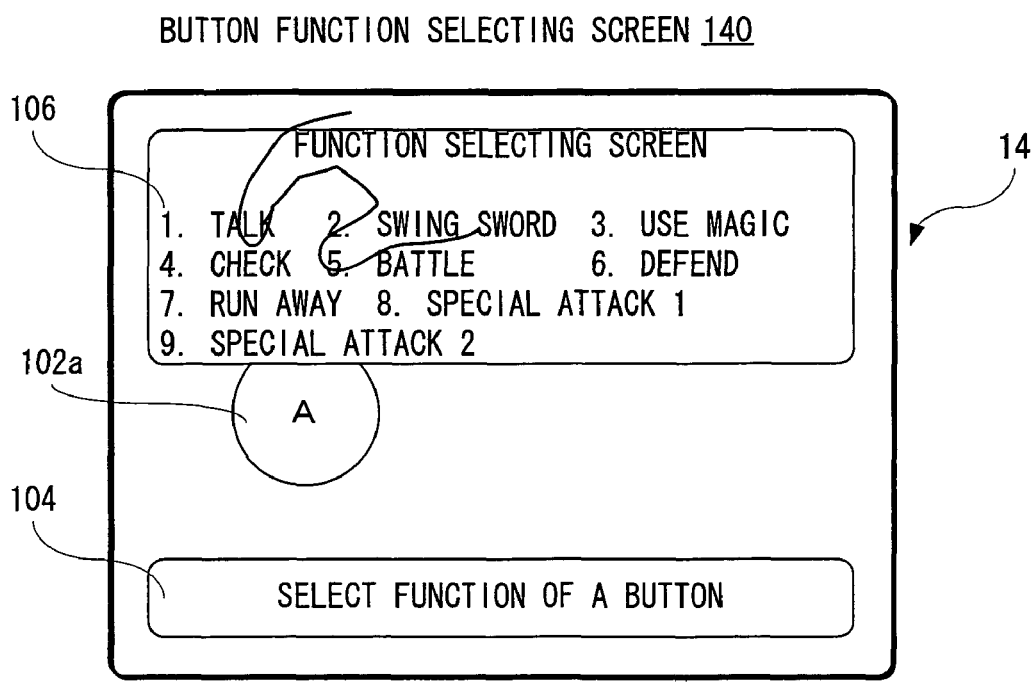
FIG. 14 is an illustrative view showing one example of a button function selecting screen displayed on the second LCD of the game apparatus shown in FIG. 1.

Succeedingly, in a step S43 shown in FIG. 6, a button function selecting screen 140 as shown in FIG. 14 is displayed on the LCD 14. As shown in FIG. 14, on the button function selecting screen 140, a function selecting menu displaying area 106 is provided at the upper part of the screen, and a message displaying area 104 is provided at the lower part of the screen. In the function selecting menu displaying area 106, a function (command) prepared as a default is text-displayed. It is noted that these functions are only examples, may be another function. Furthermore, a multiplicity of functions, if only two or more functions, may be displayed. In the message displaying area 104, a message prompting the player to select the function as to the set operation button (A button, here) is displayed. On the button function selecting screen 140, the button figure 102a whose arrangement position and size are determined (set) is displayed according to the arrangement position and the size. On the button function selecting screen 140, a function of the operation button (A button, here) to be set can be selected, and in selecting, merely touching (depressing) the LCD 14 (touch panel 22) with the use of the stick 24, etc. is appropriate.

Returning to FIG. 6, in a step S45, it is determined whether or not a button function is selected. The determining process in the step S45 is approximately the same as the process shown in the step S23 in FIG. 5, and therefore, a detailed description is omitted. It is noted that in a case that one operation button has to have a plurality of functions like an action RPG, it is determined whether or not a plurality of functions are selected. If "NO" in the step S45, that is, if the button function is not selected, the process directly returns to the same step S45. That is, a selection of the button function is waited. On the other hand, if "YES" in the step S45, that is, if the button function is selected, the button function is set in a step S47. That is, the function data is written to the RAM 48 in correspondence to the player character.

Figure 15:
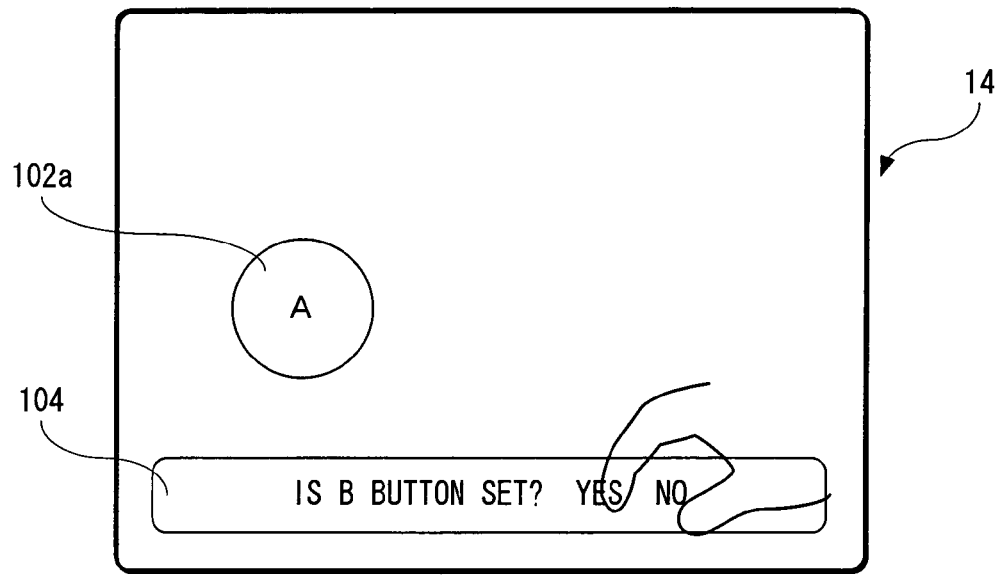
FIG. 15 is an illustrative view showing one example of a next button setting selecting screen displayed on the second LCD of the game apparatus shown in FIG. 1.

Then, in a step S49, a next button setting selecting screen 150 shown in FIG. 15 is displayed on the LCD 14. The next button setting selecting screen 150 is a screen for selecting whether or not a new button is set, and has the message displaying area 104 at a lower part of the screen. In the message displaying area 104, a message prompting the player to select whether or not a next operation button (B button, here) is to be set is displayed. Furthermore, the next button setting selecting screen 150 is displayed in the same arrangement position and the same size as the operation button (A button, here) already set.

It is noted that although illustration is omitted, the set function may be displayed inside the button figure 102a, or its periphery. Furthermore, a selecting operation on the next button setting selecting screen 150 is the same as the selecting operation of the button on the button figure size change selecting screen 120 shown in FIG. 11, and therefore, a detailed description will be omitted here.

Figure 16:
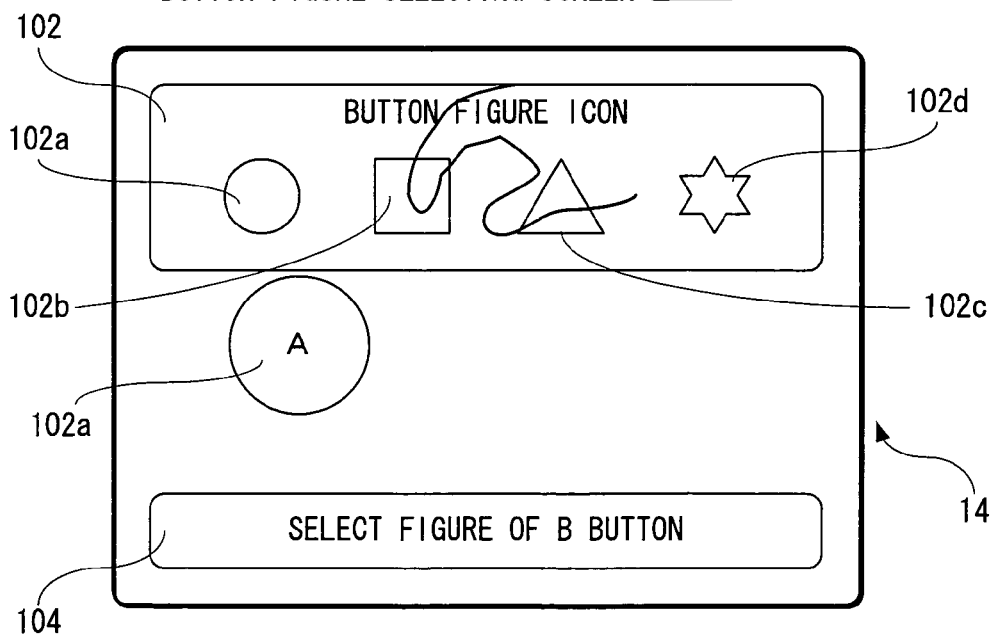
FIG. 16 is an illustrative view showing another example of the button figure selecting screen to be displayed on the second LCD of the game apparatus shown in FIG. 1.

Returning to FIG. 6, in a succeeding step S51, it is determined whether or not a next operation button is set. If "YES" in the step S51, that is, if the next operation button is set, the process returns to the step S21 shown in FIG. 5. In this case, a button figure selecting screen 100' as shown in FIG. 16 is displayed in the step S21. The button figure selecting screen 100' is the same as the button figure selecting screen 100 shown in FIG. 9 except that the operation button (A button, here) already set is displayed on the LCD 14, and therefore, a detailed description is omitted. On the other hand, if "NO" in the step S51, that is, if the next operation button is not set, the button setting process to the touch panel is directly returned.

Figure 17:
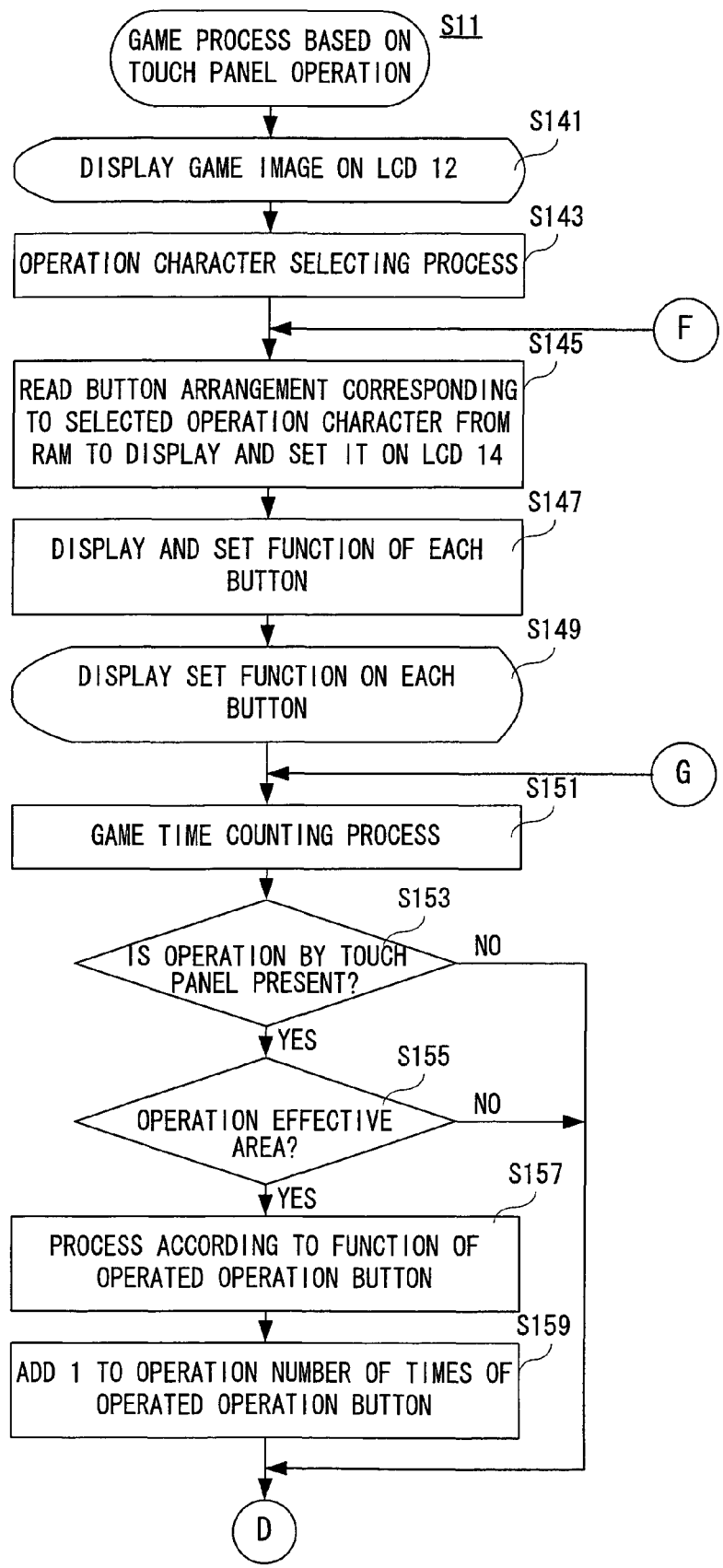
FIG. 17 is a flowchart showing a part of a game process on the basis of a touch panel by the CPU core shown in FIG. 2.
Figure 18:
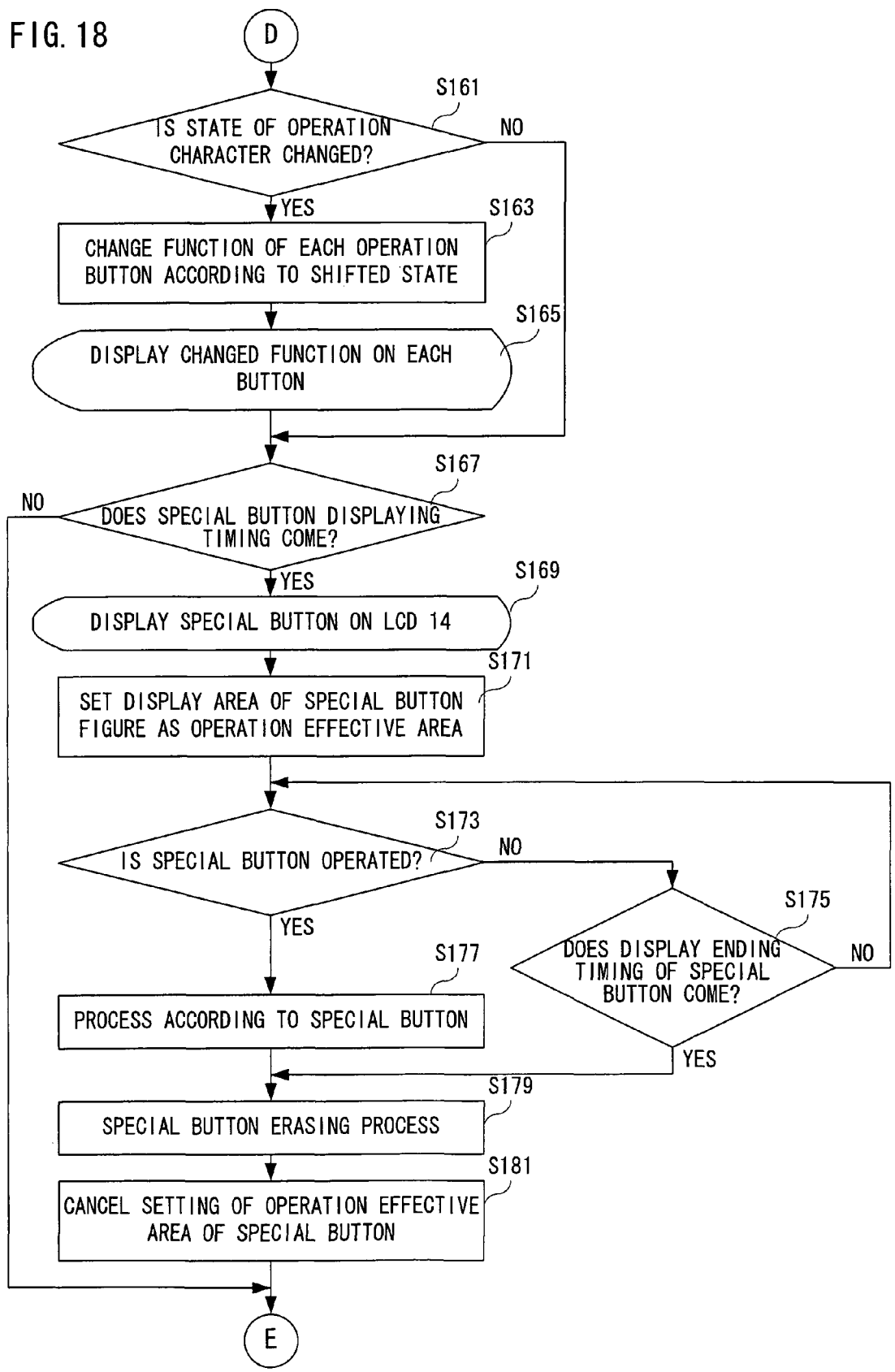
FIG. 18 is a flowchart showing another part of the game process on the basis of the touch panel by the CPU core shown in FIG. 2.
Figure 19:
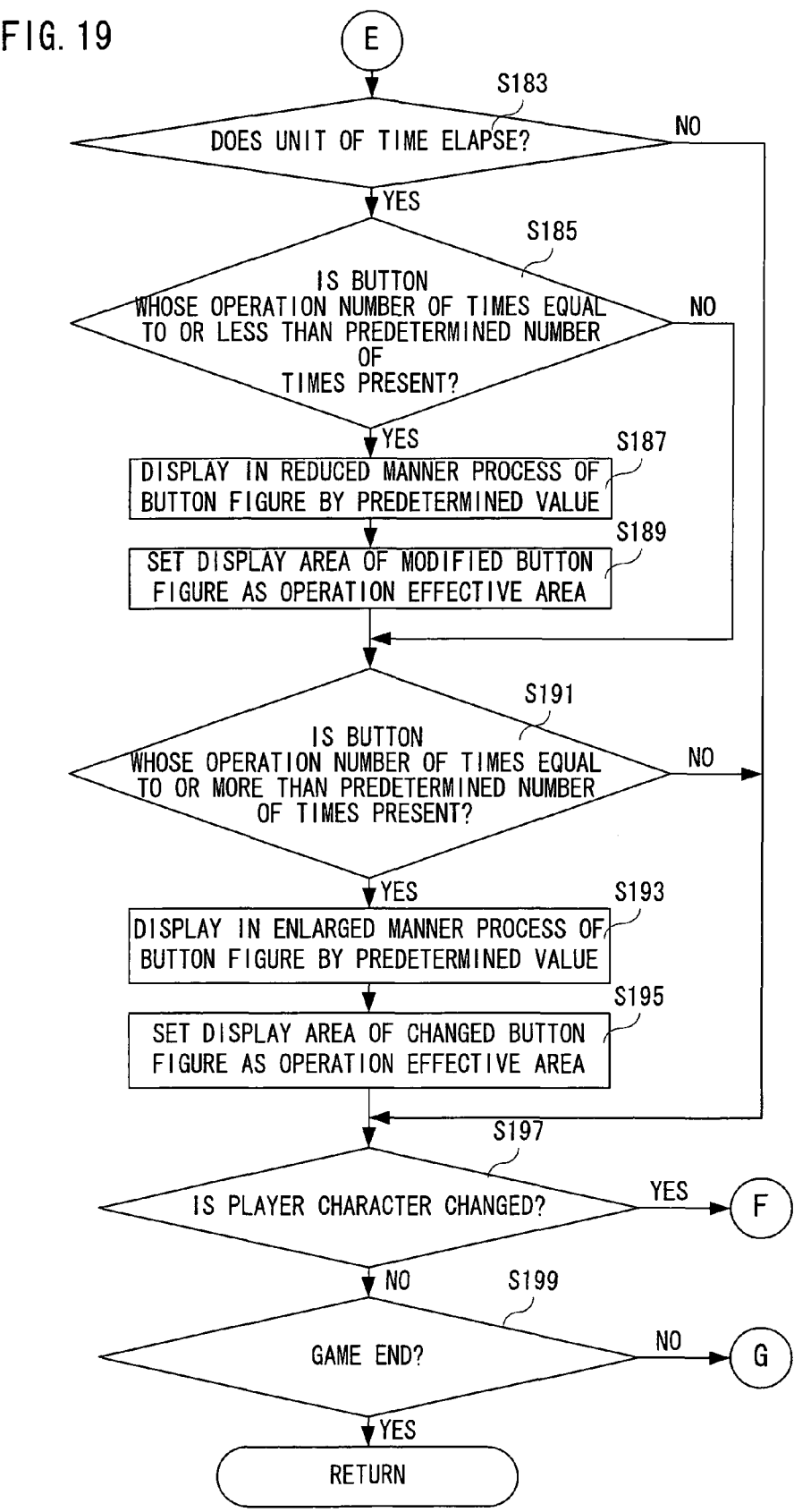
FIG. 19 is a flowchart showing the other part of the game process on the basis of the touch panel by the CPU core shown in FIG. 2.
Figure 20:
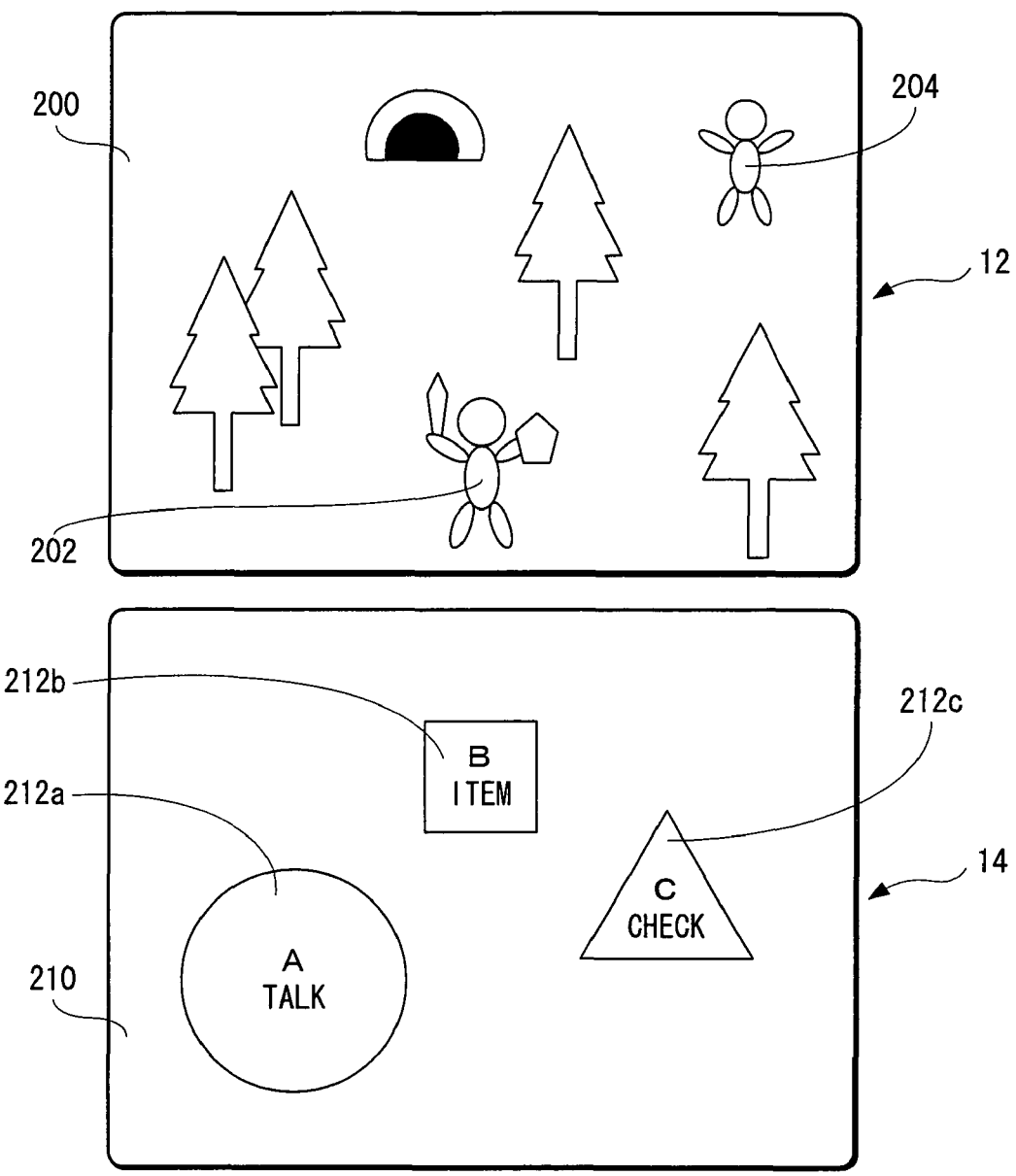
FIG. 20 is an illustrative view showing one example of a game screen displayed on the first LCD and an operation panel screen displayed on the second LCD in FIG. 1.

FIG. 17 to FIG. 19 are a flowchart showing a game process based on the operation of the touch panel in the step S11 shown in FIG. 4. When the game process is started, a game image (game screen) 200 shown in shown FIG. 20 is displayed on the LCD 12 in a step S141 shown in FIG. 17. On the game screen 200, a player character 202 and a non-player character 204 are displayed, and a background image is also displayed. For example, the player character 202 is a soldier character, and the non-player character 204 is a character such as an enemy or a villager. As a background image, an object such as a ground, a tree, a building, etc. is displayed.

It is noted that as the player character 202, a character first selected by the player is displayed on the screen.

Figure 25:
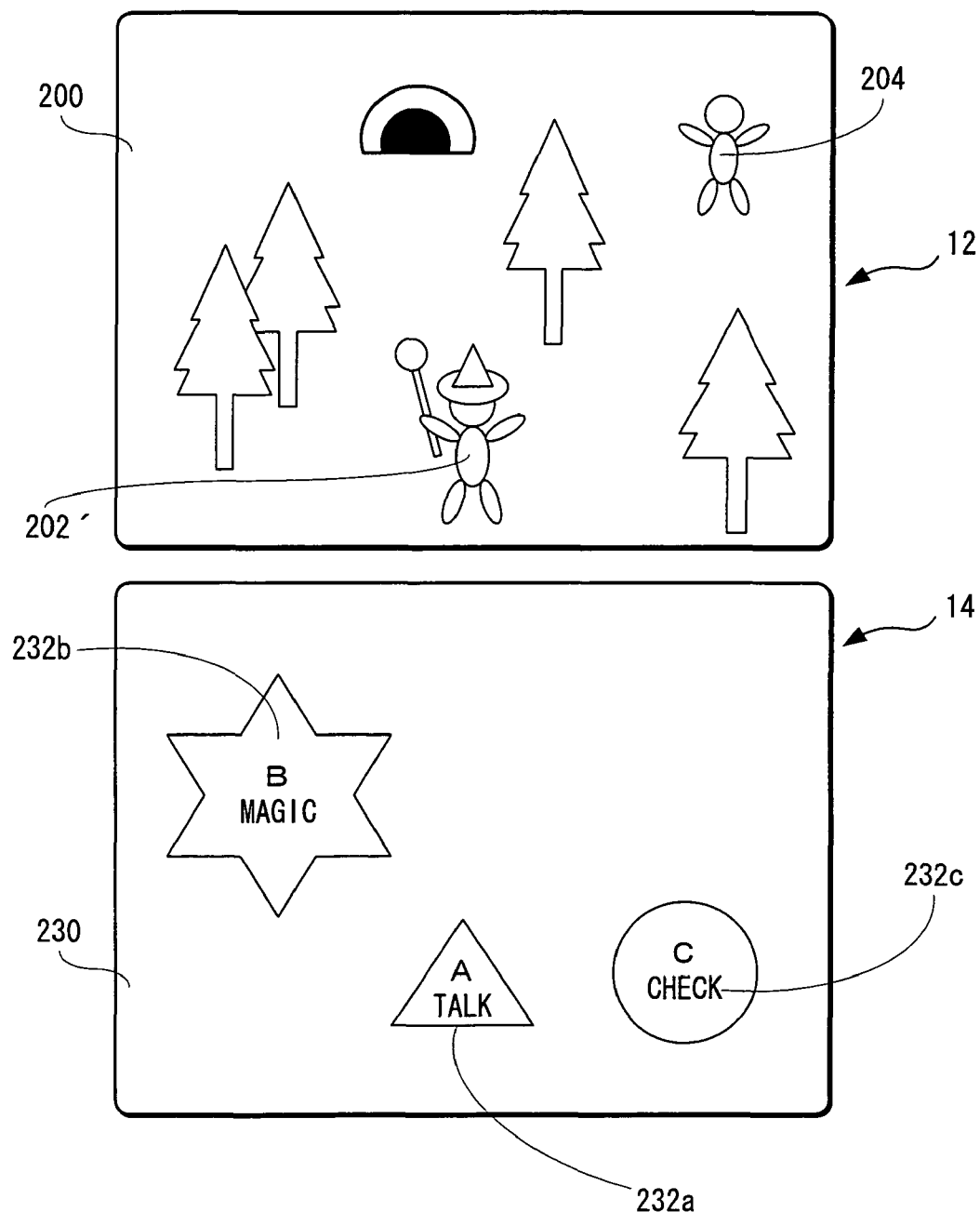
FIG. 25 is an illustrative view showing a further example of the game screen displayed on the first LCD and the operation panel screen displayed on the second LCD in FIG. 1.

In a next step S143, a selecting process of the operated character is executed. Although illustration is omitted, for example, a selection screen for allowing the player to select an arbitrary player character out of a plurality of kinds of player characters is displayed on the LCD 12 (LCD 14 is possible) to prompt the player to select. Here, in a case that another player character is selected, the display is changed to the selected player character (see FIG. 25). However, in a case that another player character is not selected, and canceled, the player character first selected is displayed as it is.

In a succeeding step S145, a button arrangement corresponding to the selected operated character (player character) 202 is read from the RAM 48 so as to be displayed and set on the LCD 14. Here, the GPU 52 reads from the RAM 48 button figure data stored in correspondence to the player character 202 in response to an instruction from the CPU core 42, and renders the button figure data in the VRAM 58. In a case that a plurality of operation buttons are set, button figure data in correspondence to all the operation buttons are rendered. At this time, coordinates position data and size data stored in correspondence to the button figure data are also read-out, and thus, the button figure data is rendered in a size at a coordinates position respectively indicated by the size data and the coordinates position data. Furthermore, in the RAM 48, operation effective area data is also stored in correspondence to the button figure data, and therefore, an area on the touch panel 22 corresponding to the display area on which the button figure (operation button) is to be displayed is set as an operation effective area.

Succeedingly, in a step S147, a function of each of the buttons is displayed and set. That is, the GPU 52 reads function data stored in correspondence to the button figure data in response to the instruction from the CPU core 42, and writes (overwrites) it to the VRAM 58 so as to display text data as to the function data inside the closed region of the button figure.

Then, in a step S149, an operation panel image (screen) 210 shown in FIG. 20 is displayed on the LCD 14. Here, the operation panel screen 210 developed in the VRAM 58, that is, the button figure data describing a name and a function of the operation button is displayed on the LCD 14 by the LCD controller 60 in response to an instruction from the CPU core 42. Accordingly, as shown in FIG. 20, in the game apparatus 10, a game screen 200 is displayed on the LCD 12, and the operation panel screen 210 corresponding to the player character 202 displayed on the game screen 202 is displayed on the LCD 14. Here, operation buttons 212a, 212b and 212c are displayed on the operation panel image 210 in correspondence to the player character 202.

Returning to FIG. 17, in a next step S151, a counting process of the game time is executed. It is noted that in a case of executing the process in the step S151 first, a timer for counting the game time (internal timer not shown in the game apparatus 10) starts to count a game time, and in a case of executing the process in the step S151 after that, the counting of the timer is continued. In a succeeding step S153, it is determined whether or not an operation by use of the touch panel 22 is present. If "NO" in the step S153, that is, if the operation by use of the touch panel 22 is not present, the process directly proceeds to a step S161 shown FIG. 18. On the other hand, if "YES" in the step S153, that is, if the operation by use of the touch panel 22 is present, an operation coordinates position is detected on the basis of the operation information detected by the touch panel 22, and it is determined whether or not a coordinates position from the touch panel 22 indicated by the coordinates position data is within the operation effective area in a step S155. That is, it is determined whether or not the operation position by the player is within the closed region of the button figure displayed on the LCD 14.

If "NO" in the step S155, that is, if the operation position by the player is not within the closed region of the button figure, it is determined that the operation is not effective, and the process directly proceeds to a step S161. However, if "YES" in the step S155, that is, if the operation position by the player is within the closed region of the button figure, it is determined the operation is effective, a process corresponding to the function of the operated operation button is executed in a step S157.

Figure 21:
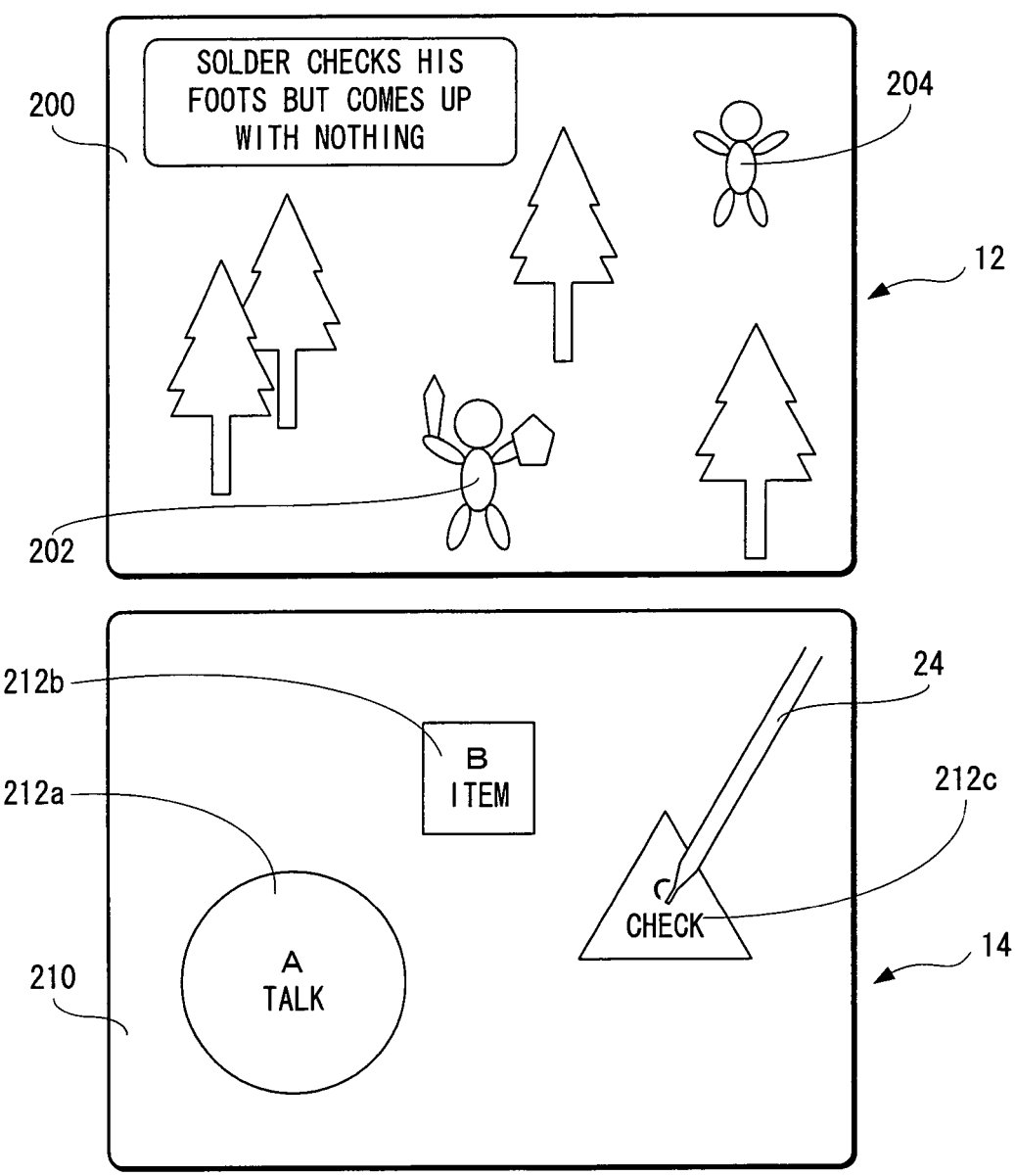
FIG. 21 is an illustrative view showing another example of the game screen displayed on the first LCD and the operation panel screen displayed on the second LCD in FIG. 1.

For example, in a case that an operation button 212c is operated on the operation panel screen 210 shown in FIG. 20, the player character 202 checks his foots, a cave, a tree, a drawer of a desk, etc. FIG. 21 shows the game screen 200 and the operation panel screen 210 in a case that the player character 202 checks his foots in response to an operation of the operation button 212c. Here, a message informing the player of coming up with nothing in a case of checking his foots is displayed at the upper left of the game screen 200. Although illustration is omitted, in a case of finding any item, etc., a message indicative of finding the item, etc is displayed.

It is noted that although illustration is omitted, in a case that the operation button 212a is operated, the player character 202 talks with the non-player character 204 such as a villager. Furthermore, in a case that the operation button 212b is operated, the player character 202 uses a predetermined item (arms, medicine, etc).

Returning to FIG. 17, in a succeeding step S159, the number of times of operations of the operation button is added by 1, and then, the process proceeds to the step S161. Although omitted in FIG. 3, it is appropriate that a counter for counting the number of times of operations consists of a register, and is set in the RAM 48 in correspondence to each operation button.

As shown in FIG. 18, in the step S161, it is determined whether or not a state of the operated character, that is, the player character 202a is changed. For example, it is determined whether or not the player character 202 encounters the enemy character, and it is shifted to a battle mode. It is noted that without applying only to a case of shifting to the battle mode, it is determined that the player character 202 is level-up, changed, or evolved.

If "NO" in the step S161, that is, if the state of the player character 202 is not changed, the process directly proceeds to a step S167. On the other hand, if "YES" in the step S161, that is, if the state of the player character 202 is changed, a function of each operation button is changed according to a shifted state in a step S163. More specifically, the text data is rewritten in the VRAM 58 by text data indicative of a function of each of the operation buttons in a case of being shifted to the battle mode. Then, in a step S165, the changed function is displayed on each button, and then, the process proceeds to the step S167.

It is noted that once that it is shifted to the battle mode, and then, shifted to a non-battle mode through a shift of the state, "YES" is determined in the step S161, and the function of each of the operation buttons is changed according to the shift of the state.

Figure 22:
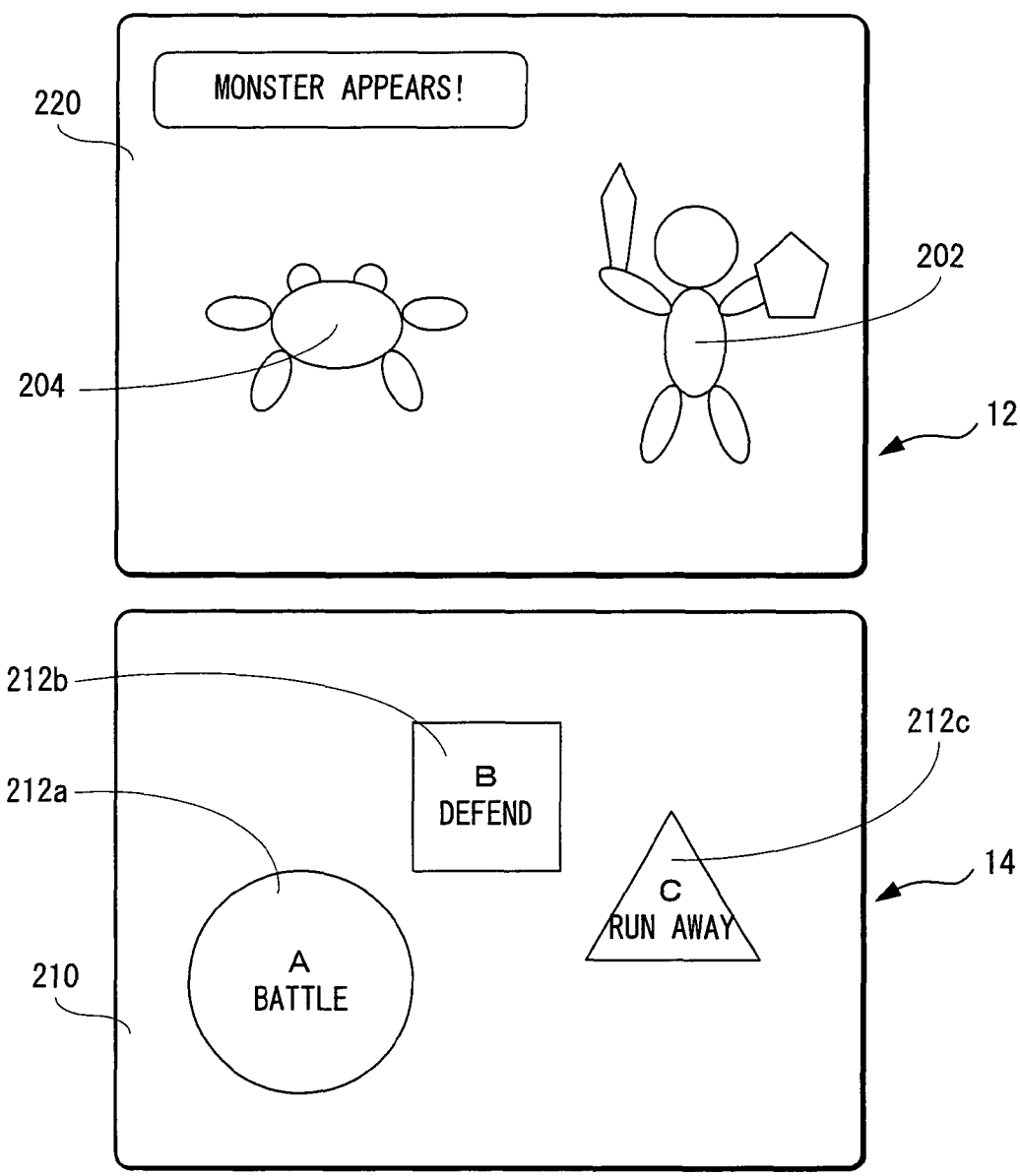
FIG. 22 is an illustrative view showing one example of a battle screen displayed on the first LCD and the operation panel screen displayed on the second LCD in FIG. 1.

For example, when "YES" is determined in the step S161, and it is shifted to the battle mode, a battle screen 220 is displayed on the LCD 12 as shown in FIG. 22. Correspondingly thereto, in the step S165, the operation panel screen 210 including the operation buttons 212a, 212b and 212c that is changed in function for battle mode is displayed on the LCD 14. It is noted that as can be seen from FIG. 22, a message informing the player of being shifted to the battle mode is displayed on the upper left of the battle screen 220.

Returning to FIG. 18, in the succeeding step S167, it is determined whether or not a displaying timing of a special button comes. Here, the special button means an operation button generally not displayed on the LCD 14, and is displayed on the LCD 14 according to the predetermined timing (event). For example, the special button is an operation button capable of instructing a command input of a special weapon, and therefore, in a case of executing the game process by use f the operating switch 20, even if a special weapon (function) required to be operated by a plurality of operating switches 20 is selected, it is possible to easily instruct an attack operation.

It is noted that the special button 214 may be set similarly to another operation buttons 212a to 212c by the player, and may be set in advance together with its displaying timing (progress of the game or predetermined event) by a programmer or a developer.

Figure 23:
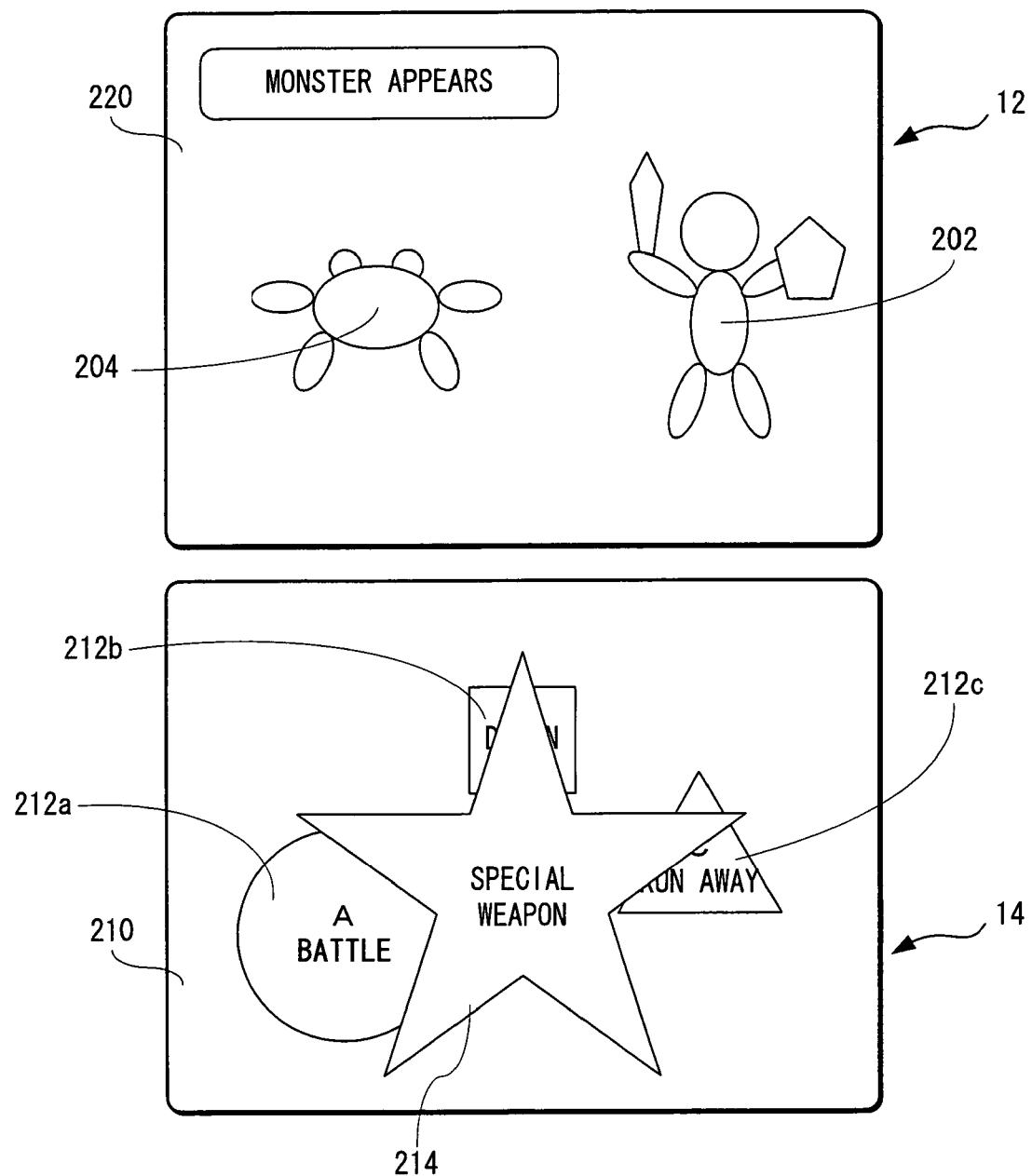
FIG. 23 is an illustrative view showing another example of the battle screen displayed on the first LCD and the operation panel screen displayed on the second LCD in FIG. 1.

If "NO" in the step S167, that is, if it is not the displaying timing of the special button, the process directly proceeds to a step S183 shown in FIG. 19. On the other hand, if "YES" in the step S167, that is, if it is the displaying timing of the special button, a special button 214 is displayed on the LCD 14 in a step S169 as shown in FIG. 23, and an area on the touch panel 22 corresponding to the display area (closed region) of the button figure of the special button 214 is set as an operation effective area in a step S171. As can be understood from FIG. 23, in a case that the special button 214 is overlapped by another operation buttons 212a, 212b and 212c, the operation of the special button 214 is handled with a priority. That is, in a case that the coordinates position data of the overlapped area is input from the touch panel 22, the CPU core 42 determines that the special button 214 is operated.

In a succeeding step S173, it is determined whether or not the special button 214 is operated. If "NO" in the step S173, that is, if the special button 214 is not operated, it is determined whether or not a display end timing of the special button 214 comes in a step S175. If it is not the display end timing of the special button 214, "NO" is determined in the step S175, and the process directly returns to the step S173. However, if it is the display end timing of the special button 214, "YES" is determined in the step S175, and the process proceeds to a step S179.

Furthermore, if "YES" in the step S173, that is, if the special button 214 is operated, a process corresponding to the function set to the special button 214 is executed in a step S177. For example, in a case that the special weapon is set, by attacking the enemy character 204 with the special weapon, its effect or staging is reflected on the battle screen 220, a life of the enemy character 204 is drastically reduced, the enemy character 204 is defeated at one blow, and so on.

Then, the special button 214 is erased from the LCD 14 in the step S179, a setting of the operation effective area of the special button 214 is canceled in a step S181, and then, the process proceeds to the step S183. As shown in FIG. 19, it is determined whether or not a unit of time (10 minutes in this embodiment) from the start of the game elapses in the step S183. If "NO" in the step S183, that is, if the unit of time does not elapse, the process directly proceeds to a step S197. On the other hand, if "YES" in the step S183, that is, if the unit of time elapses, it is determined whether or not an operation button whose operation number of times is equal to or less than a predetermined number of times (twenty times, for example) is present in a step S185.

If "NO" in the step S185, that is, if the operation button whose operation number of times is equal to or less than a predetermined number of times is not present, the process directly proceeds to a step S191. On the other hand, if "YES" in the step S185, that is, if the operation button whose operation number of times is equal to or less than a predetermined number of times is present, a button figure of the relevant operation button is displayed in a reduced manner by a predetermined value in a step S187, an area on the touch panel 22 corresponding to the display area of the changed (reduced) button figure is set as an operation effective area in a step S189, and then, the process proceeds to the step S191.

It is noted that although an illustration is omitted, in a case of displaying in a reduced manner, the size data as to the relevant operation button is changed. That is, the changed size data is written (set) to the RAM 48.

In the step S191, it is determined whether or not an operation button whose operation number of times is equal to or more than a predetermined number of times (fifty times, for example) is present. If "NO" in the step S191, that is, if the operation button whose operation number of times is equal to or more than a predetermined number of times is not present, the process directly proceeds to a step S197. On the other hand, if "YES" in the step S191, that is, if the operation button whose operation number of times is equal to or more than a predetermined number of times is present, a button figure of the relevant operation button is displayed in a enlarged manner by a predetermined value in a step S193, and an area on the touch panel 22 corresponding to the display area of the changed button figure is set as an operation effective area in a step S195, and then, the process proceeds to the step S197.

It is noted that although an illustration is omitted, in a case of displaying in an enlarged manner, the size data as to the relevant operation button is changed. That is, the changed size data is written (set) to the RAM 48.

Figure 24:
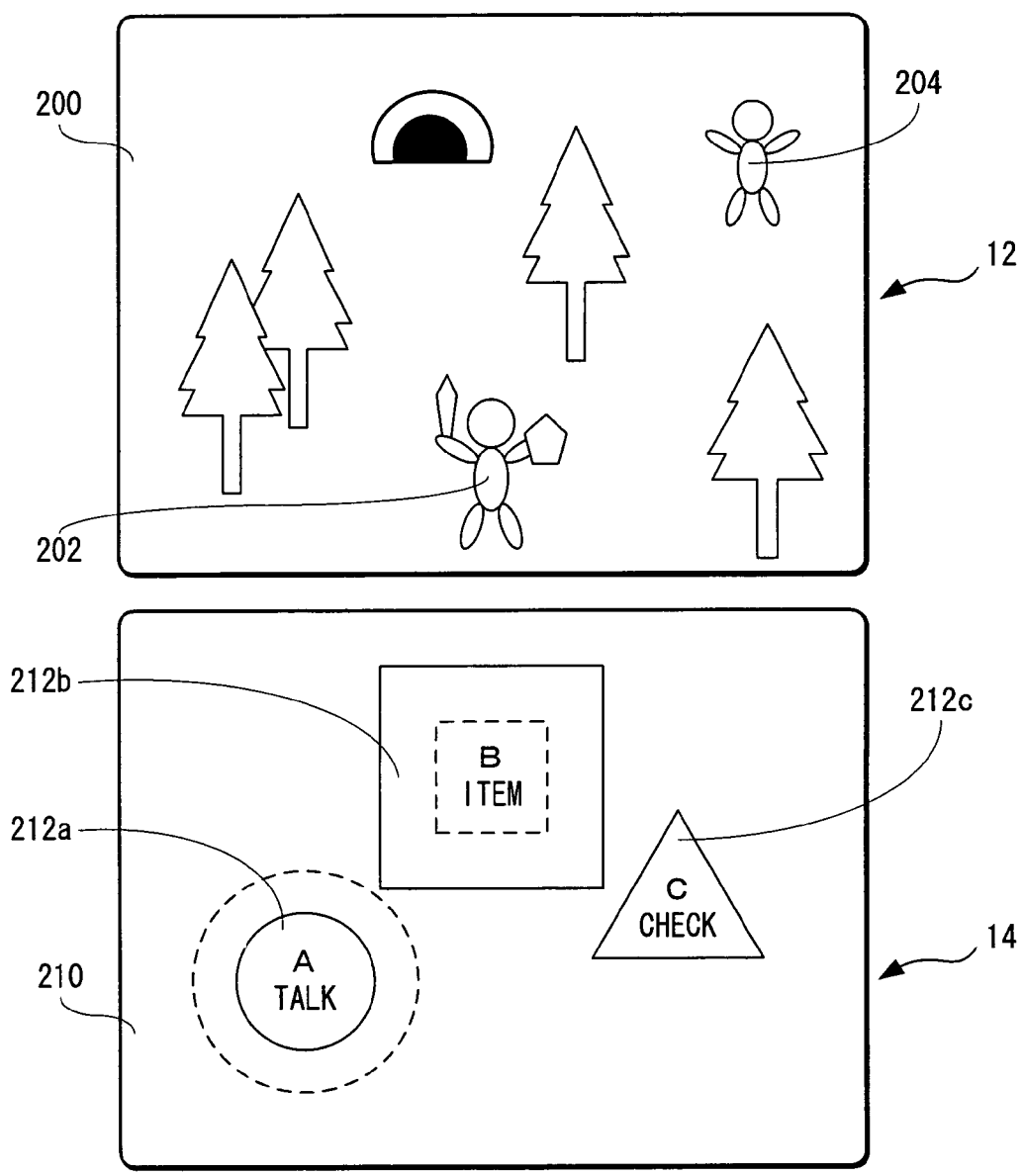
FIG. 24 is an illustrative view showing the other example of the game screen displayed on the first LCD and the operation panel screen displayed on the second LCD in FIG. 1.

Thus, when the process in the steps S183 to S195 is executed, the operation panel screen 210 on which the operation button is changed in size is displayed on the LCD 14 as shown in FIG. 24, for example. Here, a case where the operation button 212a is reduced, and the operation button 212b is enlarged is shown. It is noted that the display area enclosed by dotted lines is the button figure before change.

Accordingly, as to the operation button with high frequency of usage, its display area (operation effective area) is enlarged, and as to the operation button with low frequency of usage, its display area is reduced, and whereby, it is possible to improve operability.

It is noted that as to the operation button with high frequency of usage, its display area is reduced, and as to the operation button with low frequency of usage, its display area is enlarged, and whereby, it is possible to complicate operability. Thus, it is considered that it is possible to prevent even a skilled player from losing interest in the game.

Furthermore, although illustration is omitted, after completion of the reducing and enlarging process of the operation button, if the number of times of operations is reset, the operation button once enlarged or reduced can be enlarged or reduced thereafter, and the size of the display area of the operation button can be changed in size in correspondence to progress of the game.

Alternatively, if an operation button whose operation number of times is equal to or less than 0 or a predetermined number of times (five times, for example) per unit of time is present, a relevant operation button may be erased.

Furthermore, the "predetermined number of times" in the step S185 or step S191 may be set to a different value for each operation button.

Returning to FIG. 19, in the step S197, it is determined whether or not the player character is changed. If "YES" in the step S197, that is, if the player character is changed, the process returns to the step S145. For example, when the player character is changed to select a witch or wizard player character 202' shown in FIG. 25, an operation panel screen 230 including operation buttons 232a, 232b and 232c having a button figure and a function in a set arrangement position and size is displayed correspondingly thereto. That is, a display state of the operation button is changed. On the other hand, if "NO" in the step S197, that is, if the player character is not changed, it is determined whether or not to be the game end in a step S199. That is, it is determined whether or not the game end is instructed by the player, or whether or not to be game over.

If "NO" in the step S199, that is, if it is not the game end, the process returns to the step S151 shown in FIG. 17. On the other hand, if "YES" in the step S199, that is, if it is the game end, a game over flag, although illustration is omitted, is turned on, the game process based on the touch panel operation is returned.

According to the first embodiment, a display of the operation button arranged at the predetermined position on the touch panel is changed in correspondence to the progress of the game and according to a frequency of usage, and therefore, it is possible to improve operability.

Furthermore, the player can freely set the operation buttons on the touch panel, and executes the game by use of the set operation buttons, and therefore, it is possible to provide ease of operation for every player. Thus, it is possible to improve savor of the game.

It is noted that although the touch panel is provided in correspondence to the second LCD in this embodiment, the touch panel may be provided in correspondence to the first LCD, and the touch panel may be provided in correspondence to both of the LCDs. In the former, the operation button set by the player is displayed on the first LCD, and the game screen is displayed on the second LCD. In the latter, a selectively display is possible such that the operation button set by the player is displayed on one LCD, and the game screen is displayed on the other LCD.

In addition, although the first LCD and the second LCD are vertically arranged in this embodiment, under certain circumstances, these may be horizontally arranged.

Furthermore, although the first LCD and the second LCD are separately provided in this embodiment, dividing one display surface into two, the touch panel is provided in association with at least one display surface.

In addition, although a selected button figure is arranged in a pointed coordinates position in this embodiment, a position (area) pointed by a plurality of fingers, etc. is detected so as to be regarded as the display area of the operation button. Thus, an operation button fitted into a shape of fingers of the player is settable.

Furthermore, the display area of the operation button is changed depending on the number of times of operations in this embodiment. However, by counting an operation time period of the operated operation button as another operation state, for example, the display area of the operation button may be changed depending on whether or not the accumulated operation time period is equal to or more than a predetermined time period (or equal to or less than predetermined time period).

Second Embodiment

The game apparatus 10 of the second embodiment is the same as the game apparatus 10 in the first embodiment except for that the operation effective area and the display position as to the operation button set on the touch panel are changed on the basis of the operation state of the player during playing the game, and therefore, a duplicated description will be omitted. It is noted that in the second embodiment, positions of all the operation buttons displayed on the LCD 14 is changed on the basis of an operation state of one notable operation button.

FIG. 26 to FIG. 29 show a flowchart of the game process based on the operation of the touch panel in the second embodiment. The flowchart shown in FIG. 26 to FIG. 29 is a flowchart made by deleting the process (step) of changing the size of the operation button, and adding a process (step) of changing a display and an operation effective area of the operation button from and to the flowchart of the first embodiment shown in FIG. 17 to FIG. 19.

Briefly, the flowchart shown in FIG. 26 to FIG. 29 is a flowchart made by deleting the steps S151, S159 and S183 to S195 of the flowchart shown in FIG. 17 to FIG. 19, providing steps S211 and S213 between the step S149 and the step S153, and providing steps S215 and S217 between the step S157 and the step S161. The process except for the above description is the same, and therefore, the same reference numerals are applied. Thus, a description is made on only the different steps (S211, S213, S215, S217) here, and a description except for is omitted.

Figure 26:
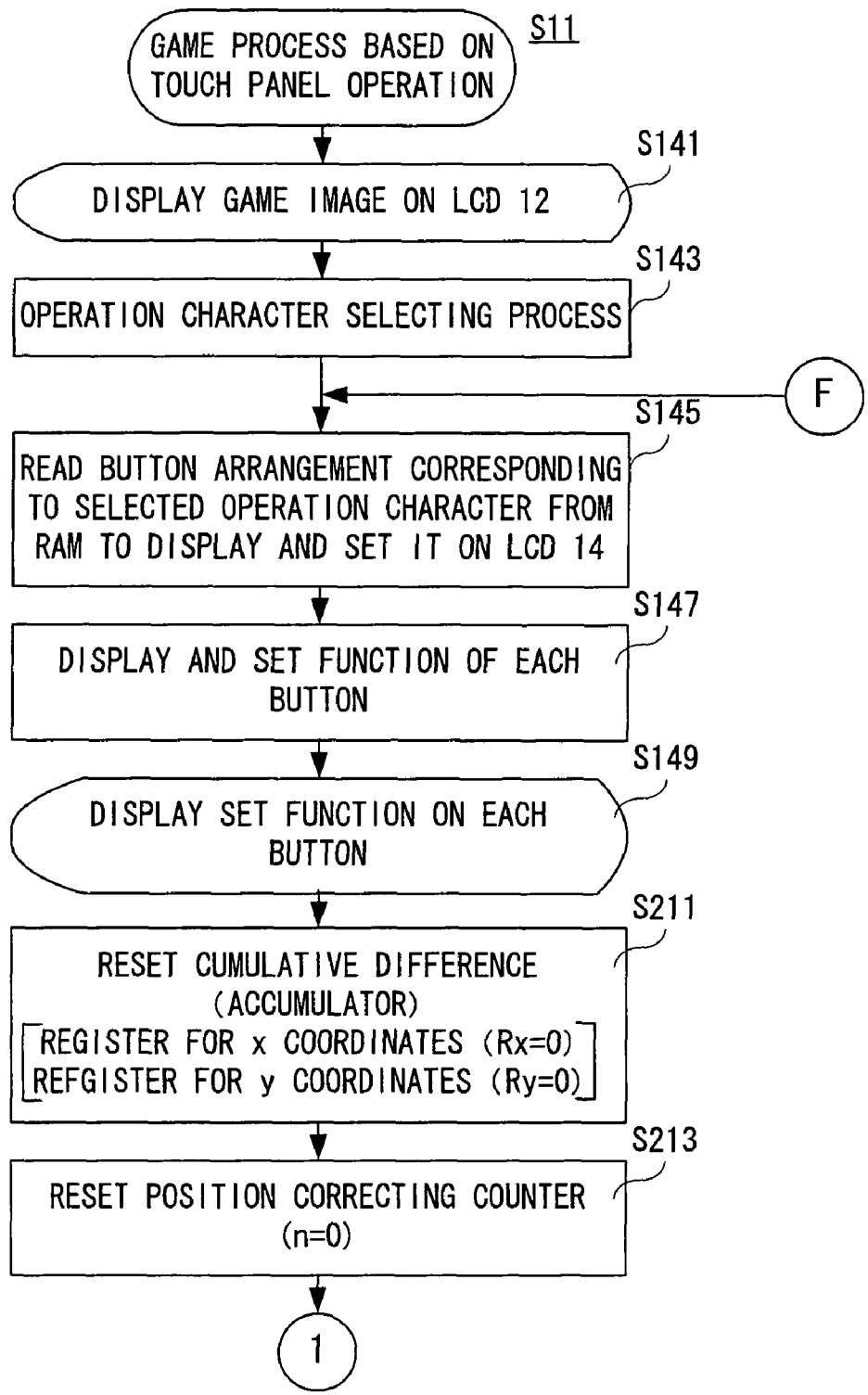
FIG. 26 is a flowchart showing a part of the game process based on the touch panel by the CPU core in a second embodiment of this invention.

As shown in FIG. 26, in the step S149, when the operation panel image (screen) 210 shown in FIG. 20 is displayed on the LCD 14, a cumulative difference (cumulative value of difference) R is reset in the step S211. That is, an accumulator (not illustrated) is reset. The accumulator is for accumulating a difference between a central coordinates (the central position of the operation effective area) of the display position of the current operation button and an operation position coordinates in response to the operation to the touch panel 22 by the player for each operation by the player, and has a register for x coordinate and a register for y coordinate. Accordingly, in the step S211, the register for x coordinate and the register for y coordinate are reset. That is, the data value "0" is set to each of the registers.

It is noted that the accumulator may be for general purpose use, and may be mounted on the electronic circuit card 40 inside the game apparatus 10, although not shown in the above-described first embodiment, so as to be accessible by the CPU core 42.

In a next step S213, a position correcting counter is reset. That is, a count value n of the position correcting counter is set to "0". The position correcting counter is, although not illustrated in the above-described first embodiment, a register provided in the RAM 48 of the game apparatus 10.

Figure 27:
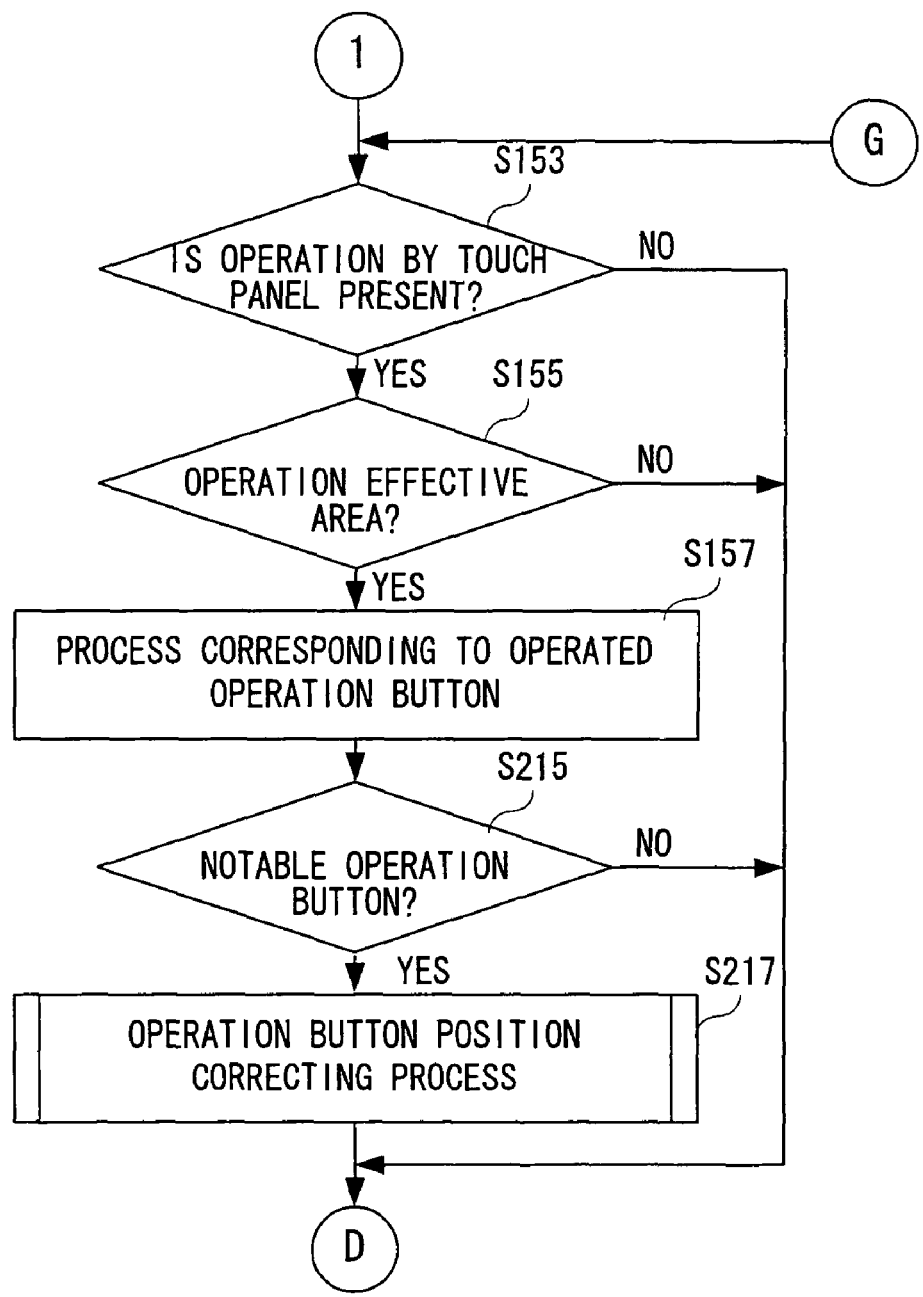
FIG. 27 is a flowchart showing another part of the game process based on the touch panel by the CPU core in the second embodiment of this invention.

When a process corresponding to the function of the operated operation button is executed in the step S157 as shown in FIG. 27, it is determined whether or not the operated operation button is a notable operation button (A button, for example) in the step S215. If "NO" in the step S215, that is, if the operated operation button is not the notable operation button, the process directly proceeds to the step 161 shown in FIG. 28. On the other hand, if "YES" in the step S215, that is, if the operated operation button is the notable operation button, an operation button position correcting process (see FIG. 30 and FIG. 31) described later is executed in the step S217, and then, the process proceeds to the step S161.

Figure 28:
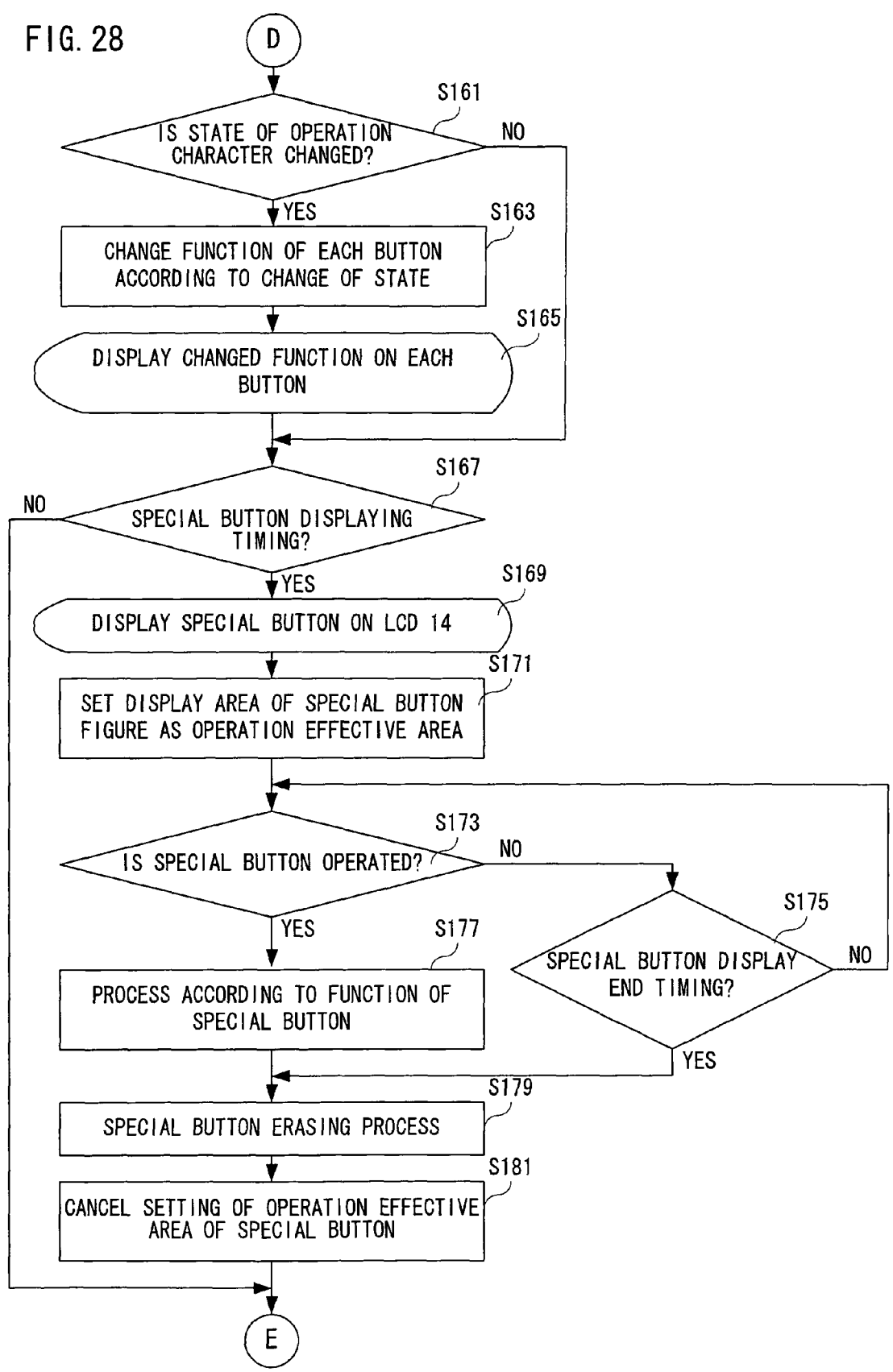
FIG. 28 is a flowchart showing the other part of the game process based on the touch panel by the CPU core in the second embodiment of this invention.
Figure 29:
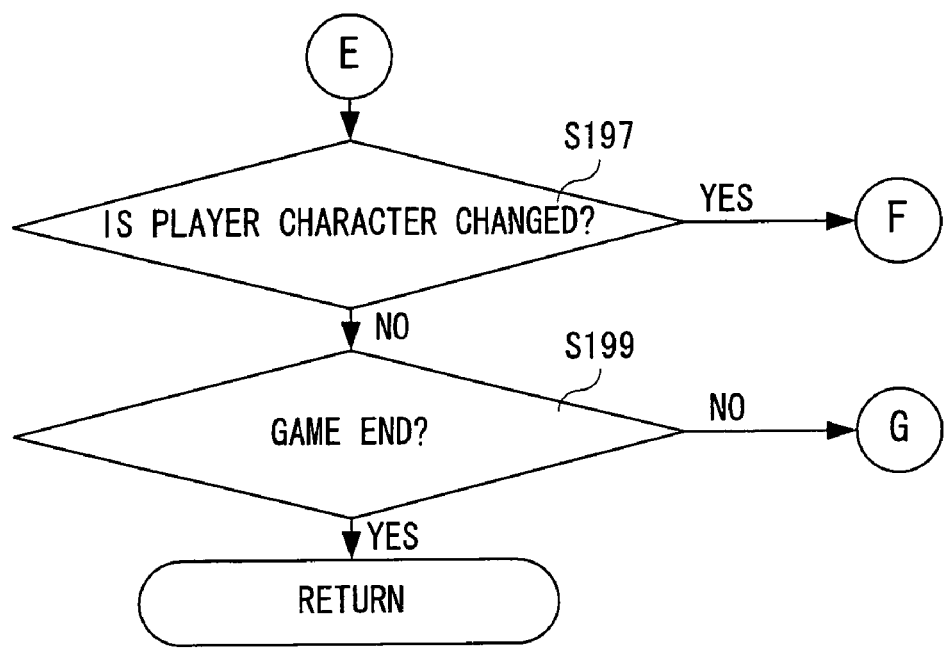
FIG. 29 is a flowchart showing a further part of the game process based on the touch panel by the CPU core in the second embodiment of this invention.

In FIG. 28, as described in the first embodiment, the process in the steps S161 to S181 is executed, and then, the process proceeds to a step S197 shown in FIG. 29. That is, the size changing process (step S183 to S195) as to the operation button (and operation effective area) shown in FIG. 19 in the first embodiment is not executed.

Figure 30:
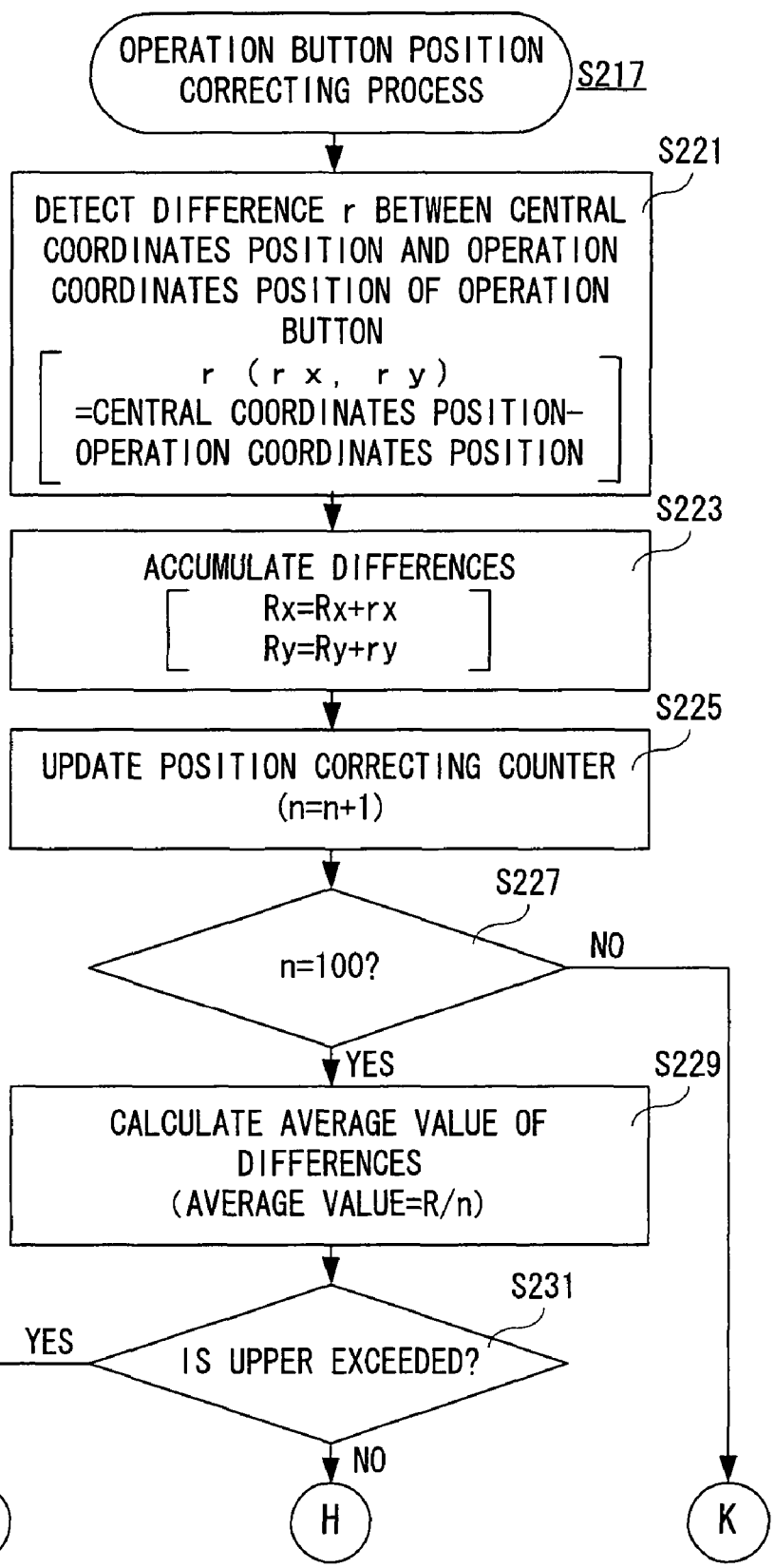
FIG. 30 is a flowchart showing a part of an operation button position correcting process by the CPU core in the second embodiment.
Figure 31:
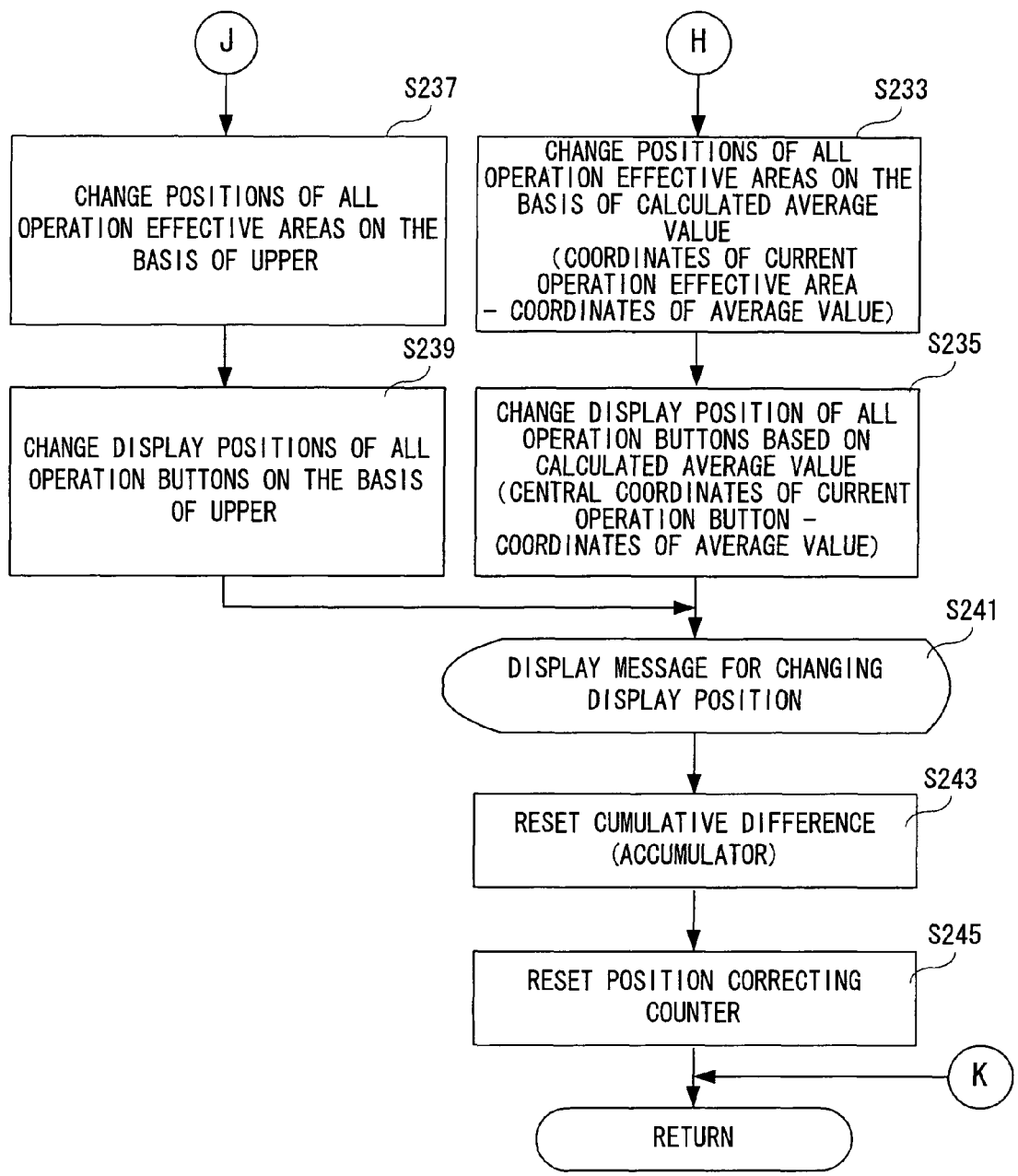
FIG. 31 is a flowchart showing another part of the operation button position correcting process by the CPU core in the second embodiment.

FIG. 30 and FIG. 31 are a flowchart showing the operation button position correcting process in the step S217 shown in FIG. 27. When the CPU core 42 starts the operation button position correcting process, a difference r between the central coordinates position of the operation button and the operation coordinates position is detected in a step S221. More specifically, the coordinates is divided into an x component and a y component, and the difference (rx, ry) for each of them is detected (calculated).

Here, in this embodiment, in the display area of the LCD 14 (this is true for the LCD 12), an upper left apex of the screen is set to an original point (0, 0), and a right direction of the display area is rendered a positive direction of the X axis, and a lower direction of the display area is rendered a positive direction of the Y axis. Furthermore, within the display area, coordinates is assigned to each of dots. On the other hand, detection accuracy of the detection surface of the touch panel 22 is the same as a resolution of the display surface of the LCD 14 as described above, and coordinates data of the operation position coordinates as to a position (dot) subjected to a touch operation is input in response to the touch operation (touching, stroking, depressing) by the player. Furthermore, in this embodiment, on the touch panel 22, an upper left apex of the operable area is set to an original point (0, 0), and a right direction of the operable area is rendered a positive direction of the X axis, and a lower direction of the operable area is rendered a positive direction of the Y axis. That is, a coordinates system of the display area of the LCD 14 and a coordinates system of the operable area of the touch panel 22 are coincident with each other, and therefore, the operation position coordinates indicated by the position coordinates data fetched from the touch panel 22 is used as the position coordinates on the LCD 14 as it is.

Accordingly, in the step S221, the x component and the y component of the difference r is evaluated by a simple arithmetic operation (subtraction). More specifically, according to an equation 1, the difference r (rx, ry) is evaluated. It is noted that the central coordinates position of the operation button is rendered (X1, Y1), and the operation coordinates position is rendered (X2, Y2).

$$r(rx, ry) = (X1, Y1) - (X2, Y2) = (X1 - X2, Y1 - Y2) \quad \text{[Equation 1]}$$

In a next step S223, differences r is accumulated by use of the differences calculated in the step S221. That is, the cumulative difference R is updated. More specifically, each of data value Rx of the register for x coordinate of the accumulator and data value Ry of the register for y coordinate is updated according to an equation 2.

$$Rx = Rx + rx \quad \text{[Equation 2]}$$

$$Ry = Ry + ry$$

Succeedingly, in a step S225, the position correcting counter is updated. That is, the position correcting counter is incremented (count value n=n+1). Then, in a step S227, it is determined whether or not the count value n of the position correcting counter is "100". If the count value of the position correcting counter is less than "100", "NO" in the step S227, the operation button position correcting process is directly returned as shown in FIG. 31. However, if the count value of the position correcting counter is equal to "100", "YES" in the step S227, and an average value of the differences r is calculated according to the equation 3 in a next step S229.

$$\text{average value} = R/n = (Rx/n, Ry/n) \quad \text{[Equation 3]}$$

In a succeeding step S231, if a notable operation button is moved on the basis of the calculated average value, it is determined whether or not the central position coordinates of the operation button exceeds an upper. In this embodiment, the upper is a central position coordinates of the figure of the operation button (and operation effective area) so as to prevent the figure of the operation button (and operation effective area) from running off the LCD 14, and set by a different value corresponding to the figure of the notable operation button. In this embodiment, the upper is set on the basis of the size of the operation button. For example, if the notable operation button is an A button, the upper is set on the basis of the size (La). More specifically, as shown in FIG. 32 (A), each of the uppers in the x axis direction is defined by La (x=La) and a maximum value in the x direction of the display area on the LCD 14−La (x=maximum value−La), and each of the uppers in the y axis direction is defined by La (y=La) and a maximum value in the y direction of the display area on the LCD 14−La (y=maximum value−La). Although illustration is omitted, the uppers are similarly set for another operation button.

It is noted that the upper may arbitrarily be set by the programmer or the developer of the game.

Furthermore, whether or not the central position coordinates of the operation button exceeds the upper depends on, in a case the average value of the calculated differences r is subtracted from the central position coordinates of the operation button to correct the position, whether or not the corrected central position coordinates is out of the range defined by the uppers in the x axis direction and the uppers in the y axis direction.

If "NO" in the step S231, that is, if an operation button exceeding the uppers is not present, positions as to all the operation buttons in the operation effective area are changed on the basis of the calculated average value in a step S233 shown in FIG. 31, the display positions of all the operation buttons (figure) are changed on the basis of the calculated average value in a step S235, and then, the process proceeds to a step S241. That is, in the step S233, the average value of the calculated differences r is subtracted from each of the coordinates position data as to the data of the operation effective area correspondingly stored in each of the operation buttons displayed on the LCD 14. In the step S235, the average value of the calculated differences r is subtracted from the coordinates position data correspondingly stored in each of the operation buttons displayed on the LCD 14.

On the other hand, if "YES" in the step S231, that is, if the operation button exceeds the uppers, the positions of all the operation effective areas are changed on the basis of the upper in a step S237 shown in FIG. 31, and the display positions of all the operation buttons (figures) are changed on the basis of the upper in a step S239, and then, the process proceeds to a step S241.

For example, as shown in FIG. 32 (B), assuming that the central position coordinates of the operation button (notable operation button) moved on the basis of the average value exceeds the upper (x=La, for example). In this embodiment, in such a case, a point of intersection of a line segment connecting the central position coordinates of the current operation button to be moved and the central position coordinates of the operation button moved based on the average value, and a line defined as the upper (x=La, here) is defined as the central position coordinates of the moved operation button. This is the central coordinates of the operation button (operation effective area and display position) moved on the basis of the upper.

Furthermore, the changed operation effective area and the changed display position as to the operation button except for the notable operation button is evaluated by subtracting a difference between the central position coordinates of the current notable operation button and the central coordinates position of the moved notable operation button.

It is noted that in a case that the notable operation button is moved on the basis of the average value, when it exceeds the upper, the operation effective areas and the display positions of all the operation buttons are changed on the basis of the upper in this embodiment. However, by determining whether or not the upper is exceeded for each operation button, the operation effective area and the display position is separately changed on the basis of the average value or the upper.

Figure 33:
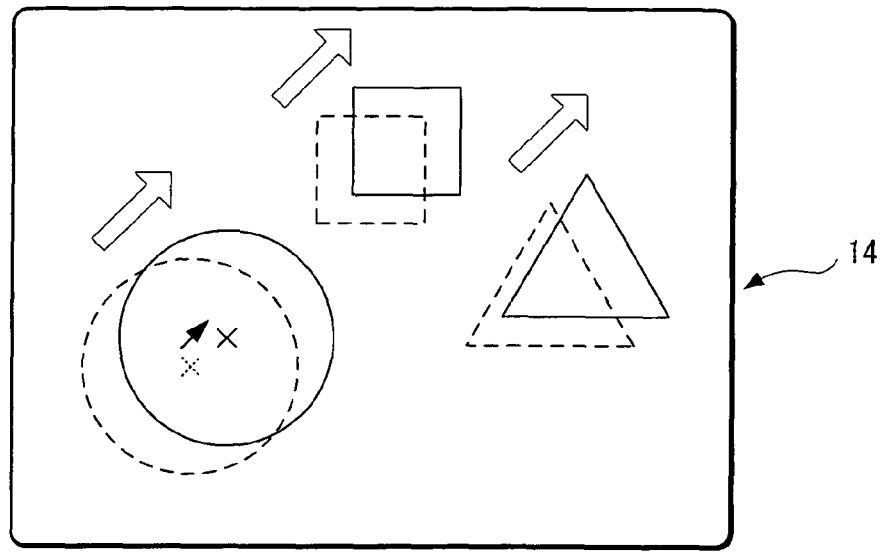
FIG. 33 is an illustrative view showing one example a state in which the operation effective area and the display position of the operation button are corrected in the operation button position correcting process in the second embodiment.

According to the above-described process in the steps S233 and the step S235, or the steps S237 and the S239, as shown in FIG. 33, the operation effective area and the display position as to the operation button on the LCD 14 are moved. In FIG. 33, the operation effective area and the display position of the operation button to be moved is represented by dotted lines, and the operation effective area and the display position of the moved operation button is represented by a solid line.

Figure 34:
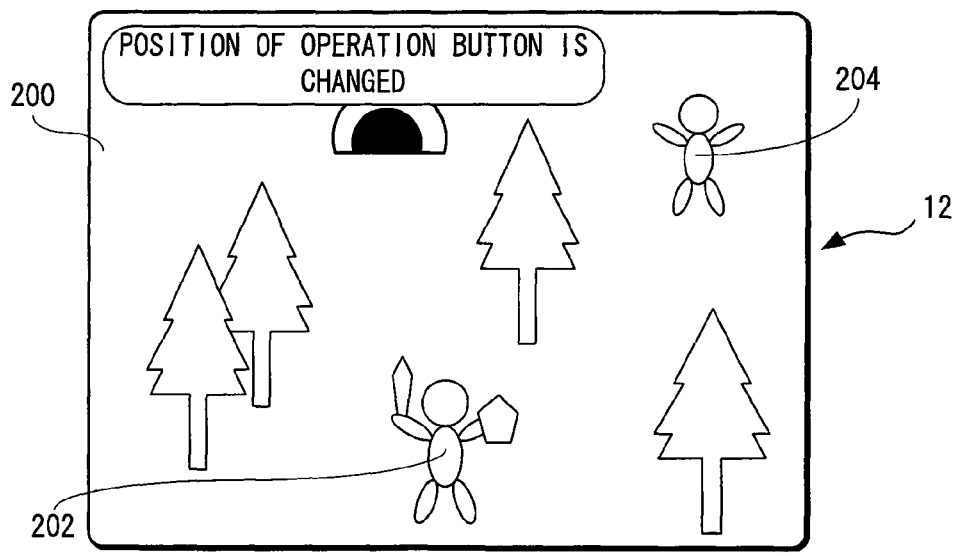
FIG. 34 is an illustrative view showing one example the game screen displaying a message informing that the operation button position is corrected in the operation button position correcting process in the second embodiment.

Returning to FIG. 31, in the step S241, a message for changing the display position is displayed. That is, as described above, a message informing that the operation effective area and the display position of the operation button on the LCD 14 are moved is displayed on the LCD 12 (game screen 200) as shown in FIG. 34. It is noted that in place of the message display, a message by a notification sound or a voice may be output, or both of the message display and the message output by the notification sound or the voice may be executed.

In a succeeding step S243, the cumulative difference accumulator is reset, in a step S245, the position correcting counter is reset, and then, the operation button position correcting process is returned.

According to the second embodiment, the operation effective area and the display position as to the operation button provided on the LCD is moved on the basis of the operation state of the player during the play, and therefore, a button arrangement according to a size of fingers and the hands of the player, an operation pattern, a habit of operation is possible. That is, it is possible to improve operability. Furthermore, the display area of the operation button is also changed, and therefore, it is possible to easily inform that the operation effective area is changed.

It is noted that in the second embodiment, the operation effective area and the display position of the operation button is changed on the basis of the cumulative value of differences by a predetermined number of times. However, every time that the difference is detected (each time), the operation effective area and the display position may be changed on the basis of the difference.

Furthermore, although a message informing that the display position of the operation button is changed is displayed in the second embodiment, to what extent the change is made may be displayed by a message, numerical value, etc. Thus, it is possible for the player to easily know his own operation pattern, habit, etc.

Third Embodiment

The game apparatus 10 in the third embodiment is the same as the game apparatus 10 in the first embodiment except for that on the basis of the operation state of the player during the game, the size of the button figure and the operation effective area as to the operation button provided on the LCD are changed, and the operation effective area and the display position as to the operation button are moved and therefore, a duplicated description will be omitted.

Briefly, the game apparatus 10 in the third embodiment is an embodiment made by adding to the game apparatus 10 in the first embodiment the process of moving the operation effective area and the display position as to the operation button in the game apparatus 10 in the second embodiment. That is, a process (S211, S213, S215, S217) of moving the operation effective area and the display position as to the operation button is added to a process of the game process based on the touch panel operation in the first embodiment shown in FIG. 17.

Figure 35:
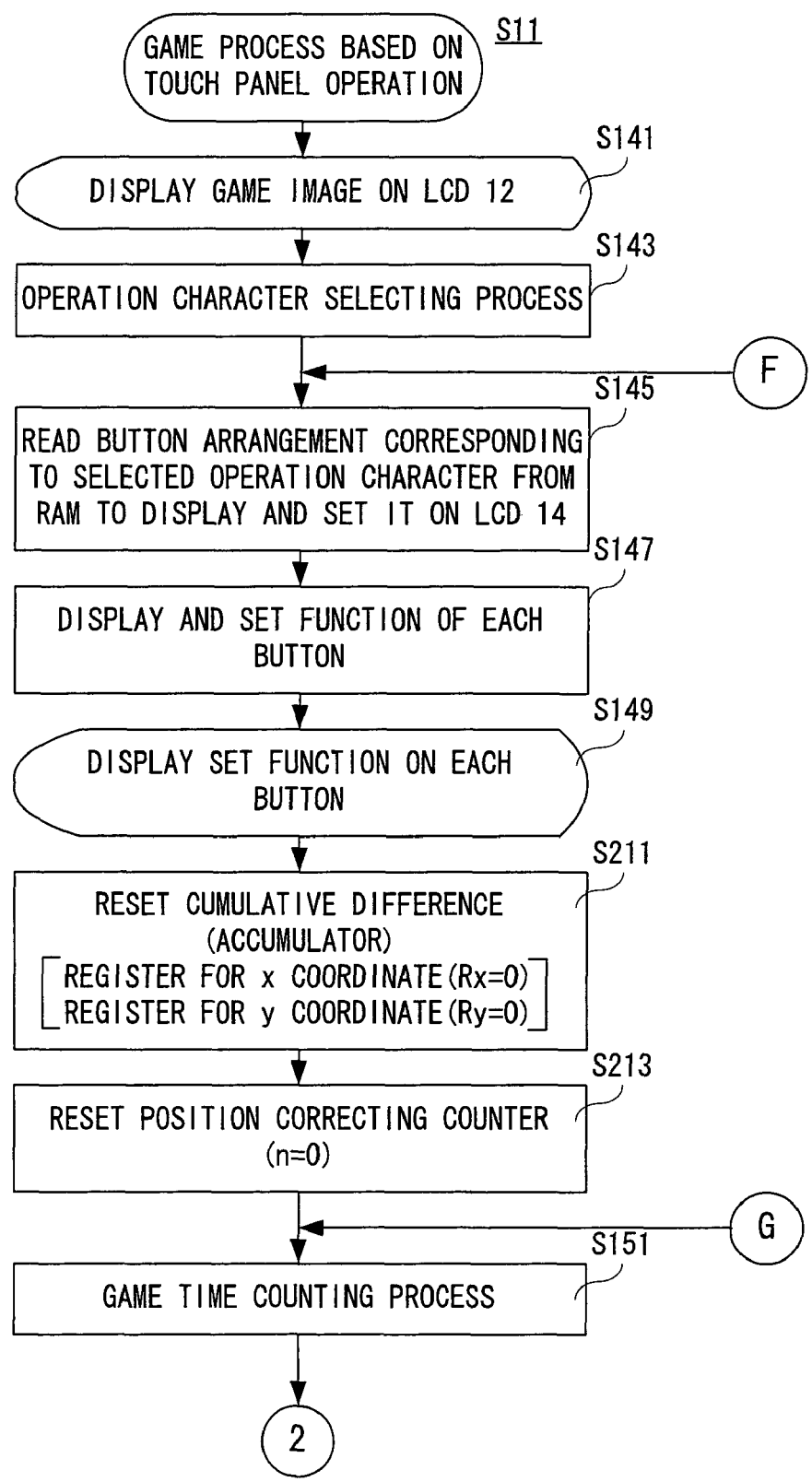
FIG. 35 is a flowchart showing a part of the game process based on the touch panel operation by the CPU core in a third embodiment of this invention.
Figure 36:
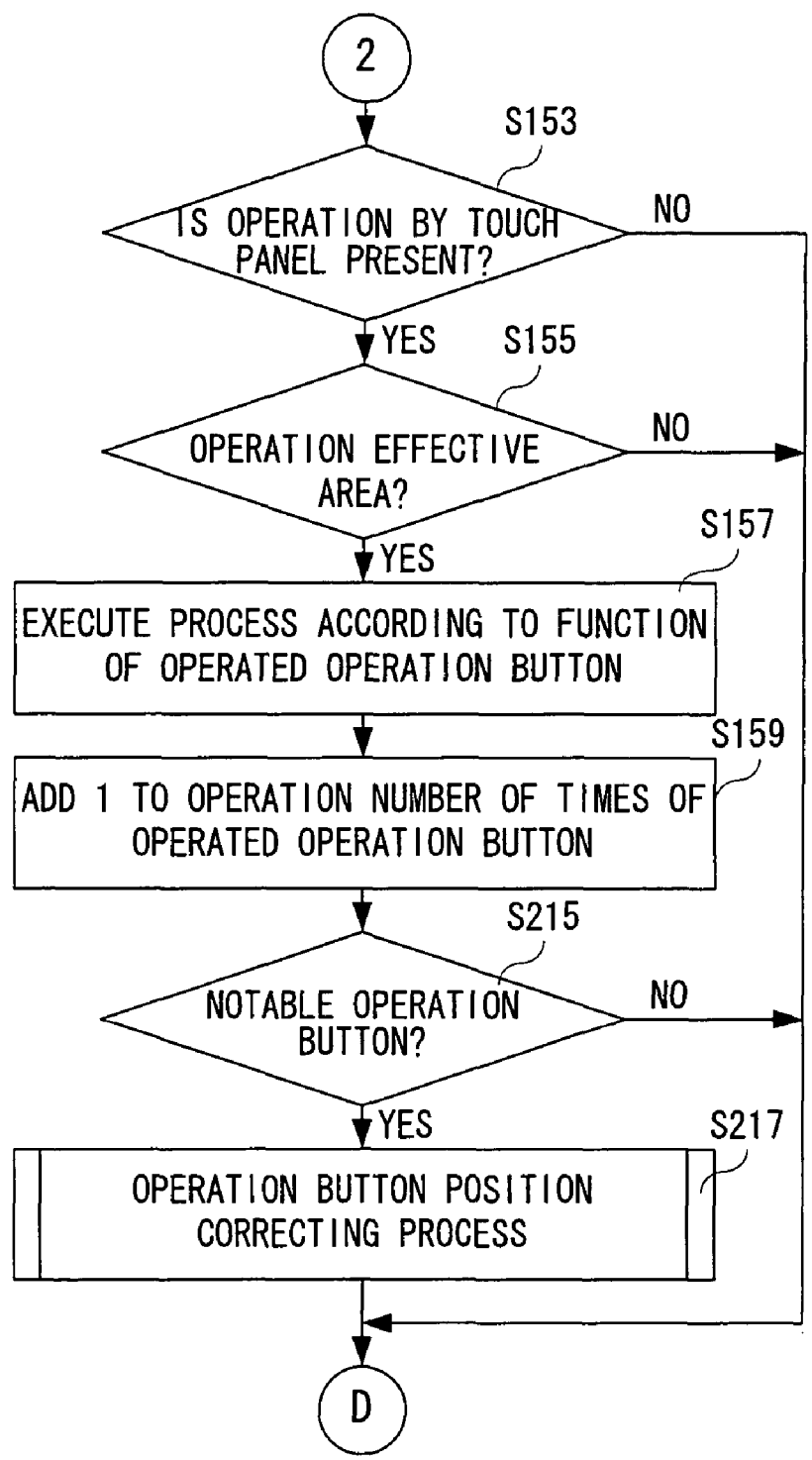
FIG. 36 is a flowchart showing another part of the game process based on the touch panel operation by the CPU core in the third embodiment of this invention.

More specifically, a part of the game process based on the touch panel operation in the third embodiment is shown in FIG. 35 and FIG. 36. Although illustration is omitted, another part of the game process based on the touch panel operation is the same as the flowchart shown in FIG. 17 and FIG. 18. As shown in FIG. 35, the steps S211 and S213 are provided between the step S149 and the step S151. Furthermore, as shown in FIG. 36, after the step S159, the steps S215 and S217 are provided. A description as to each of the processes in the steps S211, S213, S215 and S217 is made in detail in the second embodiment, and therefore, this is omitted here.

According to the third embodiment, the size of the figure and the operation effective area as to the operation button is changed, and the operation effective area and the display position as to the operation button are changed, thus, it is possible to further improve operability.

Fourth Embodiment

The game apparatus 10 in the fourth embodiment is the same as the game apparatus 10 in the above-described second embodiment or third embodiment except for that only the operation effective area of the operation button provided on the LCD 14 is changed on the basis of the operation state of the player during the game, and therefore, a duplicated description is omitted.

Briefly, in the operation button position correcting process, only the operation effective area of the operation button provided on the LCD 14 is moved on the basis of the operation state of the player. Accordingly, in the operation button position correcting process shown in the second embodiment, a changing process (steps S235, S239) of the display position as to the operation button is deleted. Furthermore, the display position of the operation button is not changed, and therefore, a process of displaying a message of changing the display position of the operation button is also deleted (step S241).

Figure 37:
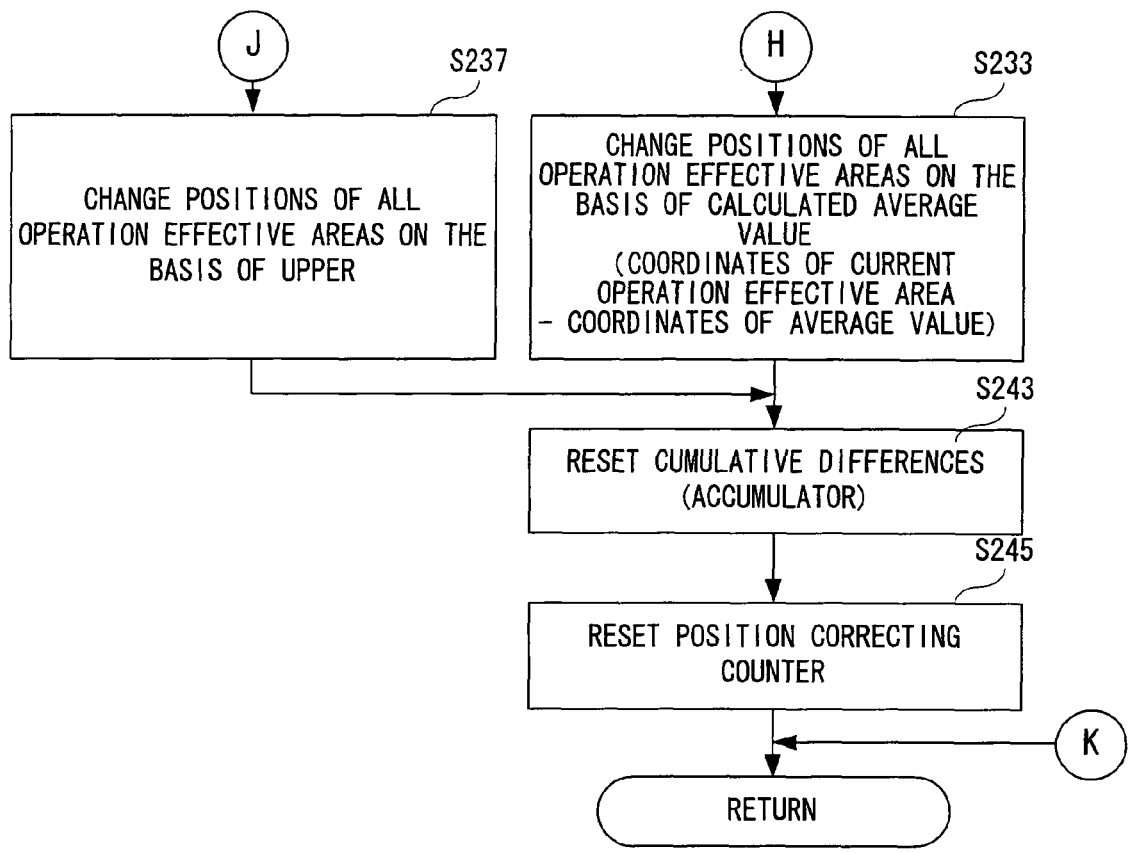
FIG. 37 is a flowchart showing a part of the operation button position correcting process by the CPU core in a fourth embodiment of this invention.

FIG. 37 shows a flowchart showing a part of the operation button position correcting process in the fourth embodiment. As described above, the process in the steps S235, S239 and S241 is deleted. It is noted that another part of the operation button position correcting process is the same as the flowchart of the second embodiment shown in FIG. 30, and therefore, the illustration is omitted.

Accordingly, in the fourth embodiment, when a notable operation button is operated predetermined number of times (one hundred times, for example), only the position of the operation effective area is corrected as shown in FIG. 38.

According to the fourth embodiment, the operation effective area is corrected according to a game operation, and therefore, a button setting according to a habit, etc. of operation by the player can be performed.

It is noted that although only the operation effective area is changed in the fourth embodiment, and a message, etc. about that is not output, due to a case of accepting an operation except for the figure of the operation button, a message, etc. indicative of changing only the operation effective area may be output so as to prevent the player from taking for a breakdown of the game apparatus.

Furthermore, although the operation effective area of the operation button is changed on the basis of the cumulative value of the differences by the predetermined number of times in the fourth embodiment, the operation effective area may be changed every time that a difference is detected and on the basis of the difference.

Fifth Embodiment

The game apparatus 10 of the fifth embodiment is the same as the second embodiment or the third embodiment except for that the operation button position correcting process is executed as to each operation button, and therefore, a duplicated description is omitted.

Briefly, the operation button position correcting process is executed for each of the operation buttons set on the LCD 14 on the basis of an operation state of the player. Accordingly, in the operation button position correcting process in the second embodiment shown in FIG. 30 and FIG. 31, a changing process of the operation effective area and the display position of the operation button (S233, S235, S237, S239) is executed on only one notable operation button.

Figure 39:
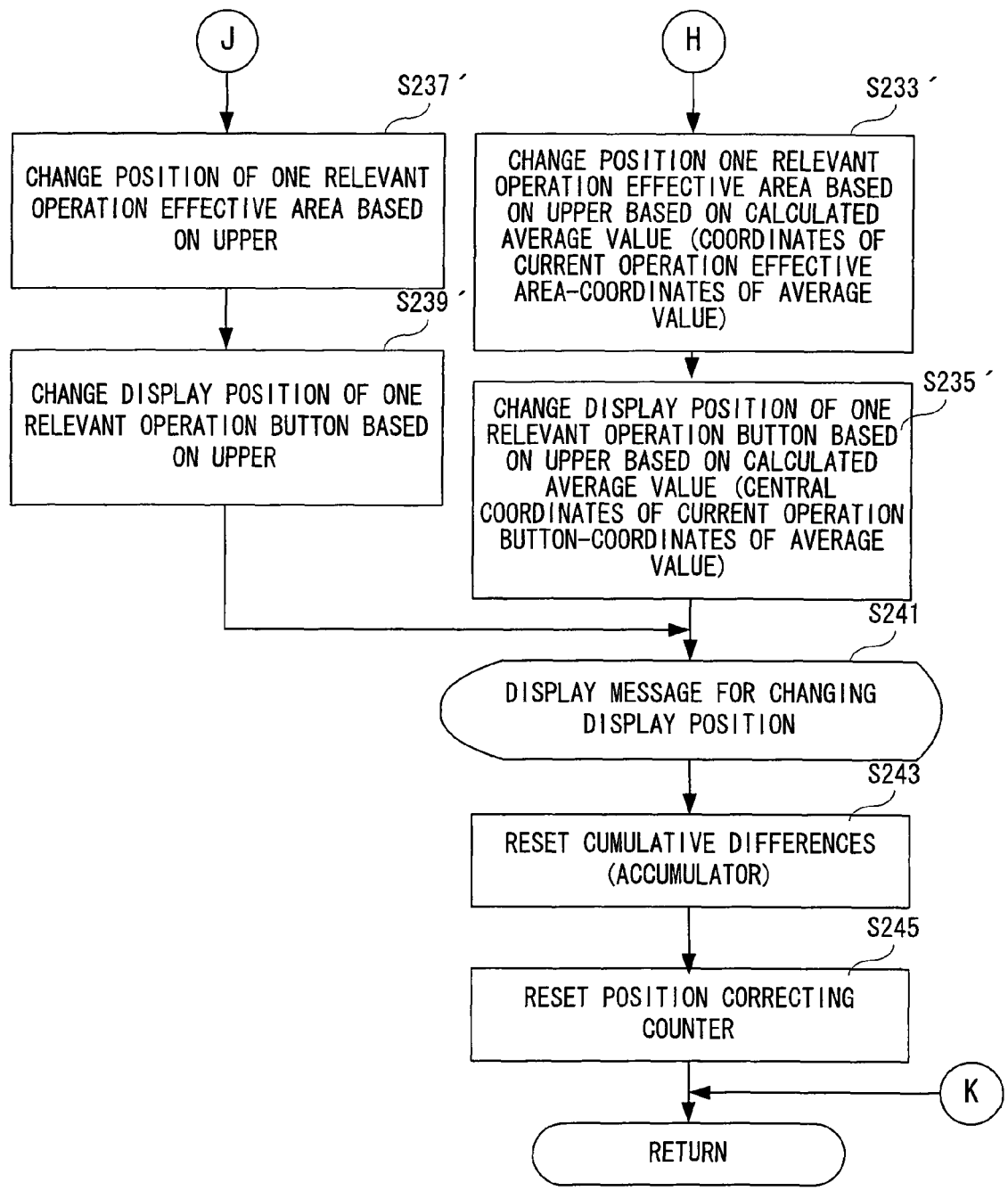
FIG. 39 is a flowchart showing a part of the operation button position correcting process by the CPU core in a fifth embodiment of this invention.

That is, a part of the operation button position correcting process is shown in a flowchart in FIG. 39. It is noted that another part of the operation button position correcting process is the same as the flowchart shown in FIG. 30, and therefore, the illustration is omitted. In the operation button position correcting process of the fifth embodiment shown in FIG. 39, the operation effective area and the display position of the operation button as to one notable (relevant) operation button is changed on the basis of the calculated average value or the upper. (steps S233', S235', S237', S239').

Figure 40:
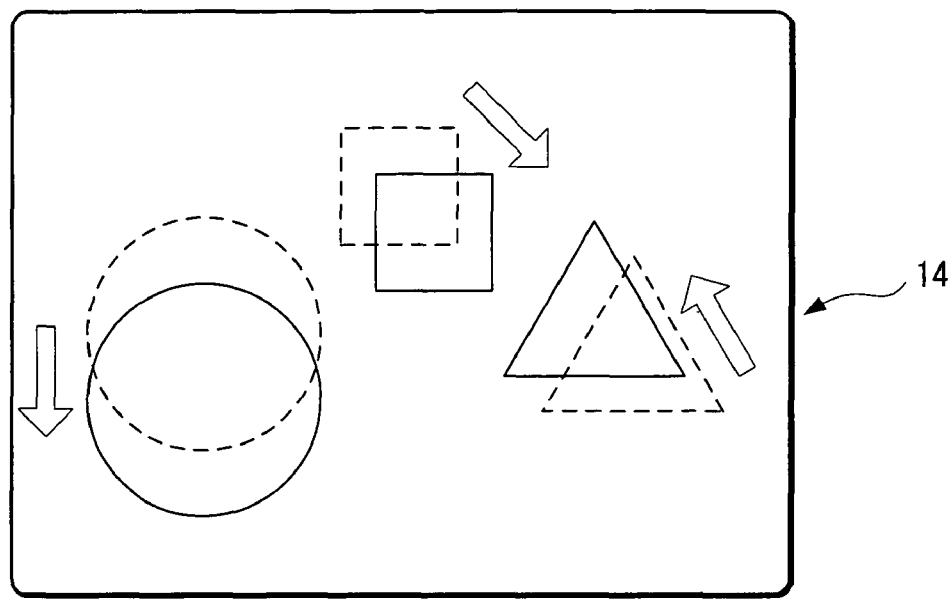
FIG. 40 is an illustrative view showing one example of a state in which an operation effective area and a display position of each operation button is corrected by the operation button position correcting process in the fifth embodiment.

Accordingly, when the operation button position correcting process is executed for each operation button, it is changed to a different position for each operation button as shown in FIG. 40. Thus, it may be possible that the operation button can be arranged according to a position of the finger of the player and a habit of operation.

According to the fifth embodiment, the operation effective area and the display position of the operation button are modified for each operation button, and therefore, it is possible to further improve operability.

Sixth Embodiment

The game apparatus 10 in the sixth embodiment is the same as the second embodiment except for that the operation position coordinates is recorded every time that a notable operation button is operated, and the operation effective areas and the display positions of all the operation buttons are moved such that the notable operation button is moved to the operation position coordinates being the highest frequency of the operation, and therefore, a duplicated description is omitted.

Figure 41:
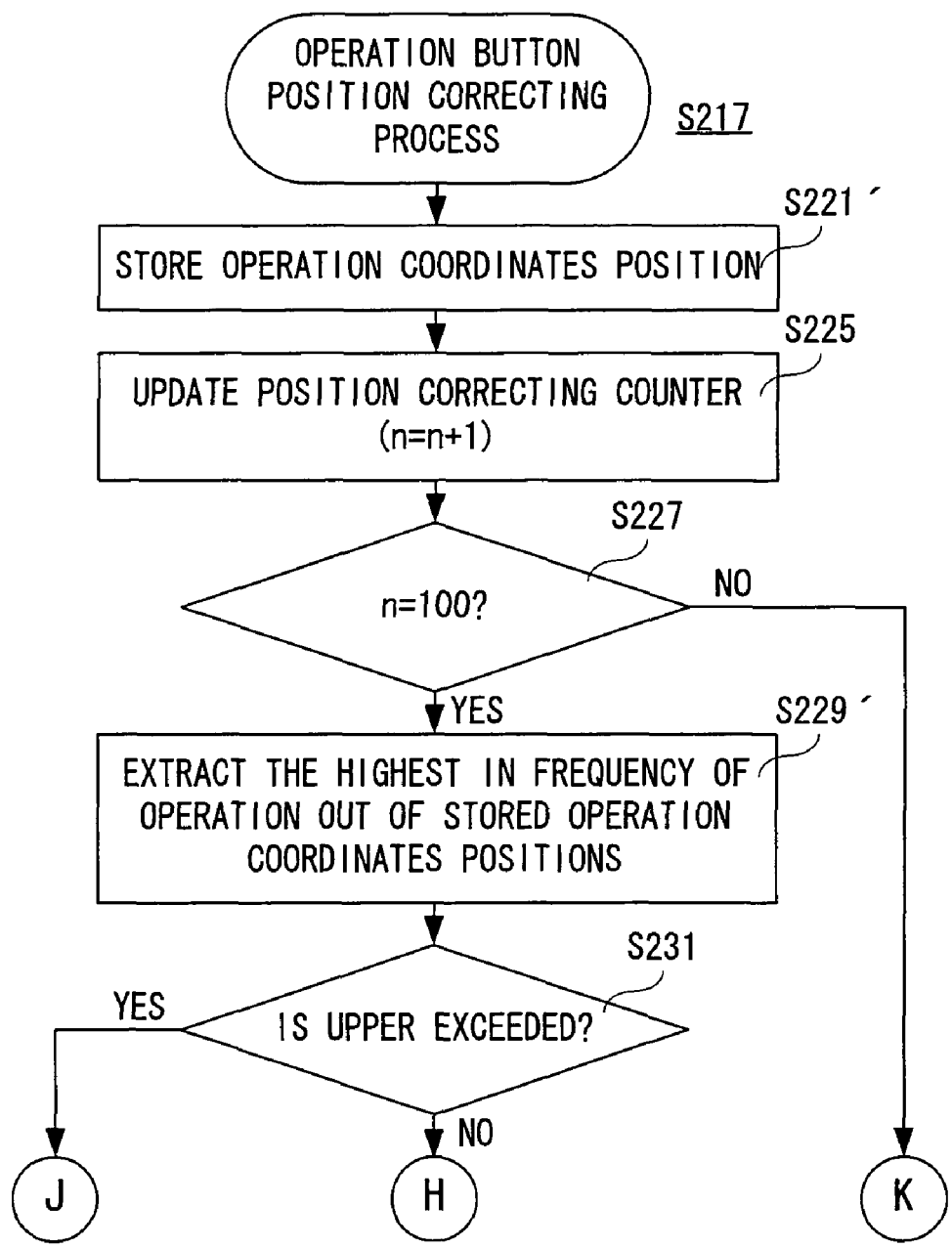
FIG. 41 is a flowchart showing a part of the operation button position correcting process by the CPU core in a sixth embodiment of this invention.
Figure 42:
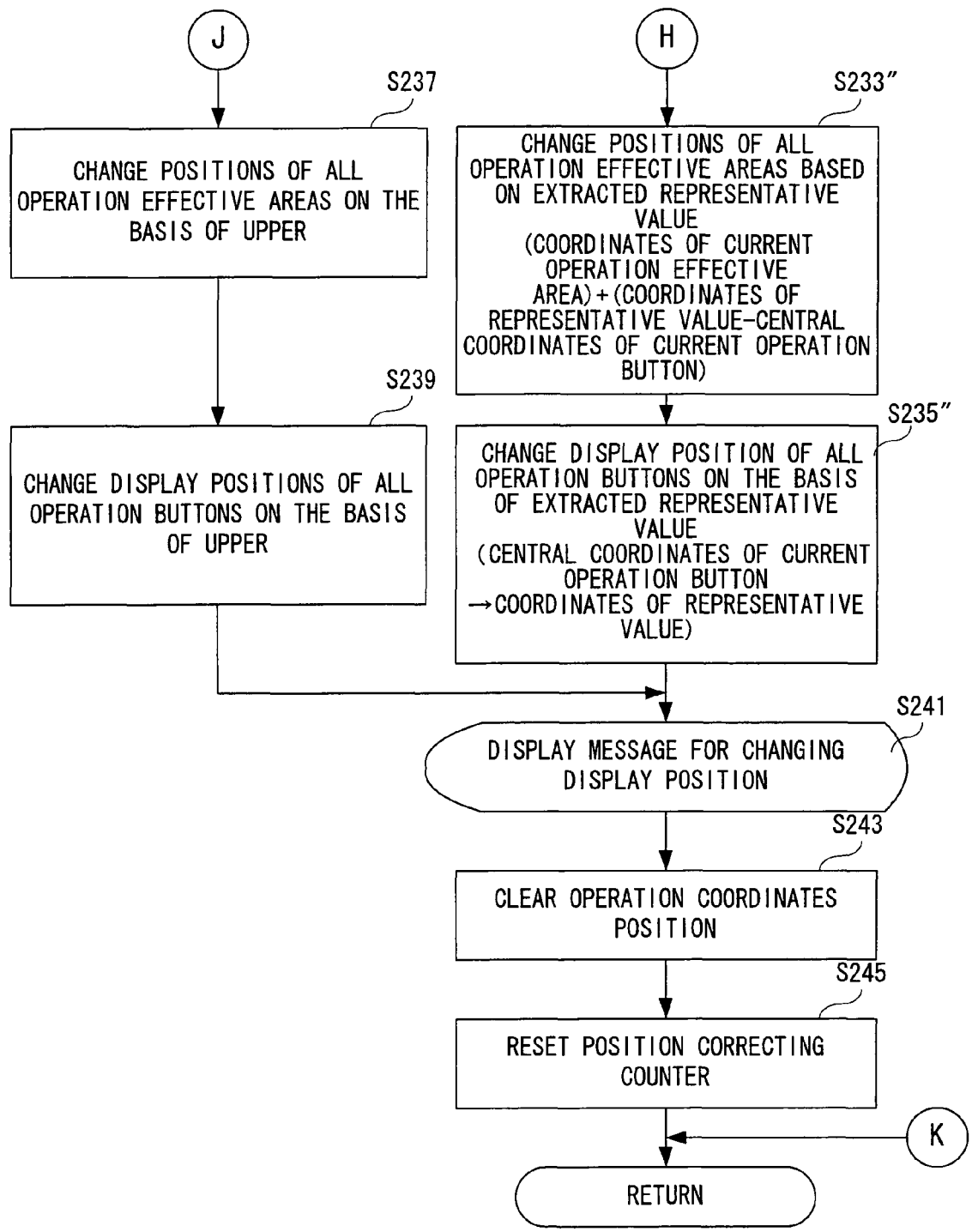
FIG. 42 is a flowchart showing another part of the operation button position correcting process by the CPU core in the sixth embodiment of this invention.

Specifically, the operation button position correcting process is shown in FIG. 41 and FIG. 42. Hereafter, the content thereof is described, but the content the same as the above-described content is briefly described. Referring to FIG. 41, when the CPU core 42 starts the operation button position correcting process, in a step S221', the operation coordinates position is stored in the other storing area 72 of the RAM 48, that is, the buffer area. In a succeeding step S225, the position correcting counter is updated.

Then, in a step S227, it is determined whether or not the count value n of the position correcting counter is "100". If "NO" here, the operation button position correcting process is directly returned as shown in FIG. 42. However, If "YES", an operation coordinates position being the highest frequency of operation (the greatest in number) out of the operation coordinates positions stored in the buffer area is extracted in a step S229'.

It is noted that if a plurality of operation coordinates positions having the highest frequency of the operation exist, an average value thereof is calculated, or any one of them is selected at random.

In a succeeding step S231, it is determined whether or not the upper is exceeded. If the upper is not exceeded, "NO" in the step S231, and the process proceeds to a step S233" shown in FIG. 42. However, if the upper is exceeded, "YES" in the step S231, and the process proceeds to a step S237 shown in FIG. 42.

As shown in FIG. 42, in the step S233", the data constellation is moved such that the operation effective area of the notable operation button is moved to the extracted operation coordinates position, and similarly, as to another operation button, the data constellation is moved in parallel. Then, in a step S235", the display position of each operation button is changed on the basis of the extracted operation coordinates position similarly to the operation effective area, and the process proceeds to a step S241.

Furthermore, in the step S237, the operation effective areas of all the operation buttons are changed on the basis of the upper, and in the step S239, similarly, the display positions of all the operation buttons are changed on the basis of the upper, and the process proceeds to the step S241.

In the step S241, a message for changing the display position is displayed on the game screen 200, and in a step S243', all the operation coordinates positions stored in the buffer area are cleared (erased). Then, the position correcting counter is reset, and then, the operation button position correcting process is returned.

According to the sixth embodiment, the operation button position is corrected to a position having the highest frequency of operation, and therefore, similairy to the above-described embodiment, the button setting according to a habit of operation by the user, etc. can be performed, capable of improving operability.

It is noted that in the sixth embodiment, the operation button position is corrected to the position being the highest frequency of the operation. However, an average value of the detected all of the operation coordinates positions is calculated to correct the operation effective area and the display position of the operation button to a position indicated by the calculated average value.

Furthermore, although an illustration, etc. is omitted, the operation button position correcting process in the sixth embodiment can be applied to the third embodiment and the fourth embodiment. In addition, as shown in the fifth embodiment, the operation button position correcting process shown in the sixth embodiment can also be executed for each operation button.

Seventh Embodiment

The game apparatus 10 in the seventh embodiment is the same as the game apparatus 10 in the above-described second embodiment or the third embodiment except for that only the display position of the operation buttons provided on the LCD 14 is moved on the basis of an operation state of the player during the game, and therefore, a duplicated description is omitted.

Briefly, in the operation button position correcting process, only the display position of the operation button set on the LCD 14 is moved according to an operation state of the player. Accordingly, in the operation button position correcting process in the second embodiment shown in FIG. 31, the process for changing the operation effective area as to the operation button (step S233, S237) is deleted. Furthermore, a process for changing the display position of the operation button (step S235, S239) is inversely moved (subjected to an adding process) on the basis of the average value.

Figure 43:
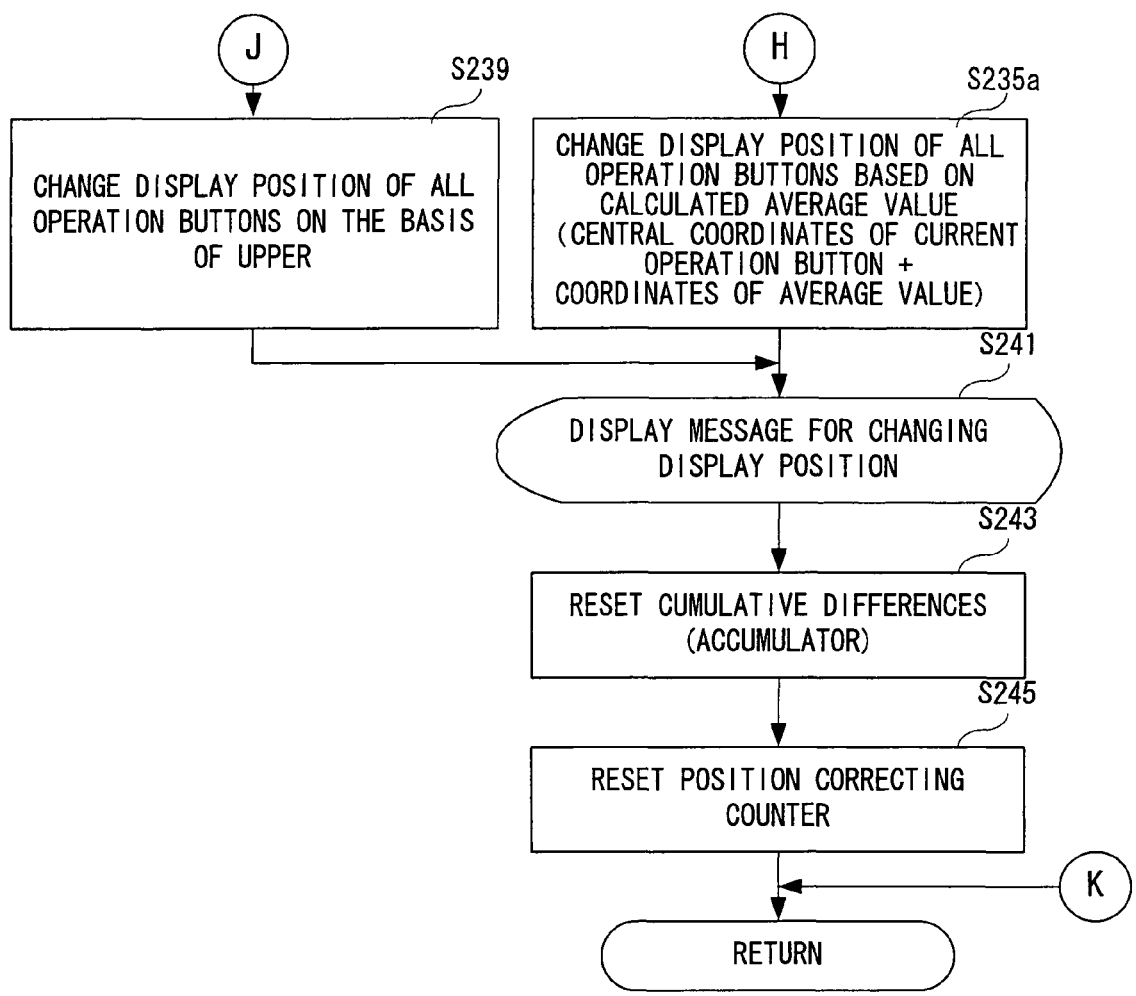
FIG. 43 is a flowchart showing a part of the operation button position correcting process by the CPU core in a seventh embodiment of this invention.

That is, a part of the operation button position correcting process in the seventh embodiment is shown in a flowchart in FIG. 43. It is noted that another part of the operation button position correcting process is the same as the flowchart of the second embodiment shown in FIG. 30, and therefore, the illustration is omitted. As shown in FIG. 43, in the operation button position correcting process of the seventh embodiment, if the operation button that exceeds the upper is not present in the step S231 shown in FIG. 30, (that is, an average value of the calculated differences r is added to the central position coordinates of the operation button to correct the position, the corrected central position coordinates is within a range defined by the uppers in the x axis direction and the uppers in the y axis direction), the display positions of all the operation buttons (figures) are changed on the basis of the calculated average value in a step S235a, and then, the process proceeds to the step S241. That is, in the step S235a, the calculated average value of the differences r is added to the coordinates position data correspondingly stored for each of the operation buttons displayed on the LCD 14.

Figure 44:
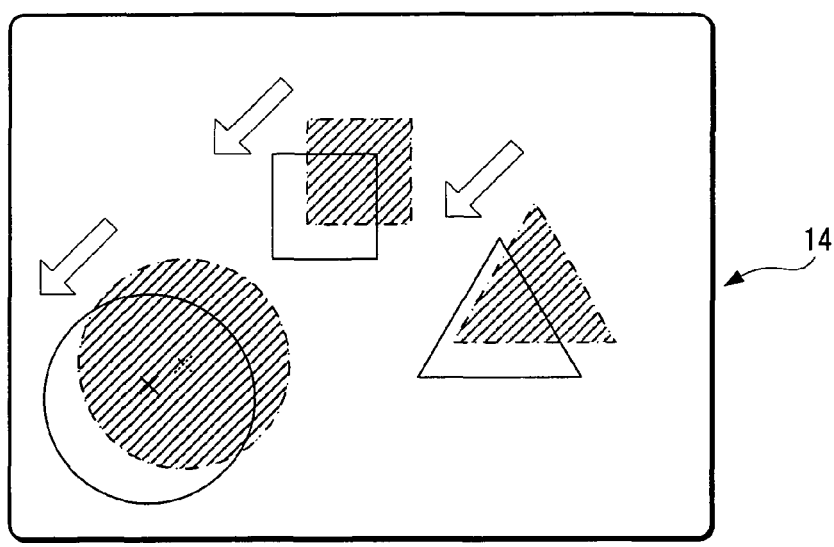
FIG. 44 is an illustrative view showing one example of a state in which only the display position of each operation button is corrected by the operation button position correcting process in the seventh embodiment.

Accordingly, in the seventh embodiment, when the notable operation button is operated predetermined number of times (one hundred, for example), only the display position of the operation button is corrected as shown in FIG. 44.

According to the seventh embodiment, since only the display position of the button figure is corrected according to the game operation leaving the operation effective area of the button figure as it is, by changing the display position of the button figure according to a habit of operation, etc. by the player, the operation position of the player can be lead to the neighbor of the center of the operation effective area.

It is noted that although the display position of the operation button is changed on the basis of the cumulative value by the predetermined number of times in the seventh embodiment, every time that the difference is detected (every time), the display position may be changed on the basis of the difference.

In addition, in these embodiments, an example of the operation button as a figure is described, but it is not limited thereto, and another figure, if being an object to be operated by the player, is applicable. For example, a character of a target of a shooting game, etc. is applicable.

Eighth Embodiment

The game apparatus 10 of the eighth embodiment is the same as the first embodiment except for that in a case that the button is set on the touch panel 22, the button figure is freely rendered by the player, and the operation effective area is set to the button figure rendered by the player, and therefore, a duplicated description is omitted.

Figure 45:
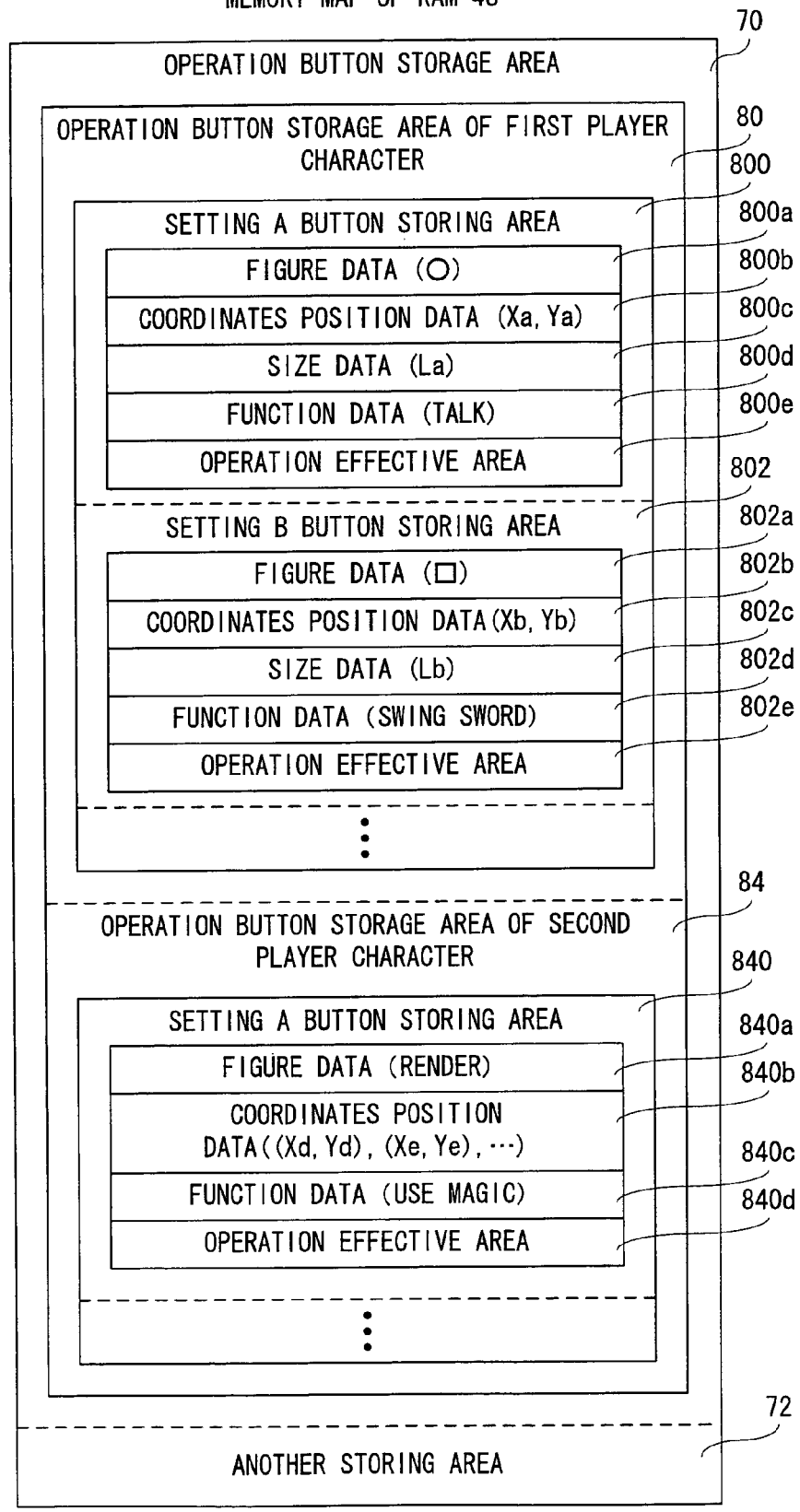
FIG. 45 is an illustrative view showing a memory map of a RAM of a game apparatus in a eighth embodiment.

FIG. 45 is an illustrative view showing a memory map of the RAM 48 of the game apparatus 10 in the eighth embodiment. The memory map in FIG. 45 is approximately the same as the memory map shown in FIG. 3, and therefore, a duplicated description is omitted. As understood from FIG. 45, in the memory map of the RAM 48 in the eighth embodiment, in place of the operation button storing area 82 of the second player character shown in FIG. 3, the operation button storing area 84 of the second player character is provided.

In the operation button storing area 84 of the second player character, a setting A button storing area 840, etc. is provided. The setting A button storing area 840 stores attribute information as to the A button set in correspondence to the second player character by the player. Here, the "A button" is a name applied in order to distinguish the operation button set in correspondence to the second player character by the player as a matter of convenience, and does not mean that it has the same function as that of the A button 20d and the B button 20e. Furthermore, this does not mean that it has the same figure, position, size, function, and operation effective area as the A button, etc. set in correspondence to the first player character. It is noted that it can be set so as to have the same function as the A button 20d and the B button 20e, and set so as to have the same figure, etc. as the A button set in correspondence to the first player character, etc.

The setting A button storing area 840 stores figure data 840*a*, coordinates position data 840*b*, function data 840*c*, and operation effective area data 840*d*. For example, the figure data 840*a* is data (referred as "rendering" in the drawing as a matter of convenience) obtained by rendering freely the figure (pattern) by the player. It is noted that the image data of the figure (pattern) actually rendered may be stored. The coordinates position data 840*b* is data as to a plurality of coordinates positions ((Xd, Yd), (Xe, Ye), . . . ) for specifying (defining) a position, a shape (appearance) and a size of the figure (pattern) freely rendered by the player. The function data 840*c* is data indicative of a command input of "use a magic" or a label indicative of the command. Then, the operation effective area data 840*d* is a coordinates position data collection for determining whether or not an operation of the operation button (A button, here) freely rendered by the player is effective.

It is noted that in a case that the player freely renders the figure (pattern) of the button, the plurality of coordinates data for specifying the position, the shape (appearance) and the size of the figure are stored as the coordinates position data, and therefore, dissimilar to the case where the figure prepared (as default) in advance is stored in the first embodiment, the size data is not present.

Furthermore, as understood from FIG. 45, it seems that the player sets the A button and the B button with respect to the first player character by use of the button figure of the default.

That is, there are cases of executing the button setting process by use of the button figure as the default and of executing the button setting process by freely rendering the button figure by the player in the eighth embodiment. Accordingly, although an illustration is omitted in FIG. 4, before shifting to the process in the step S5, which button setting process is to be executed is selected by the player.

Figure 46:
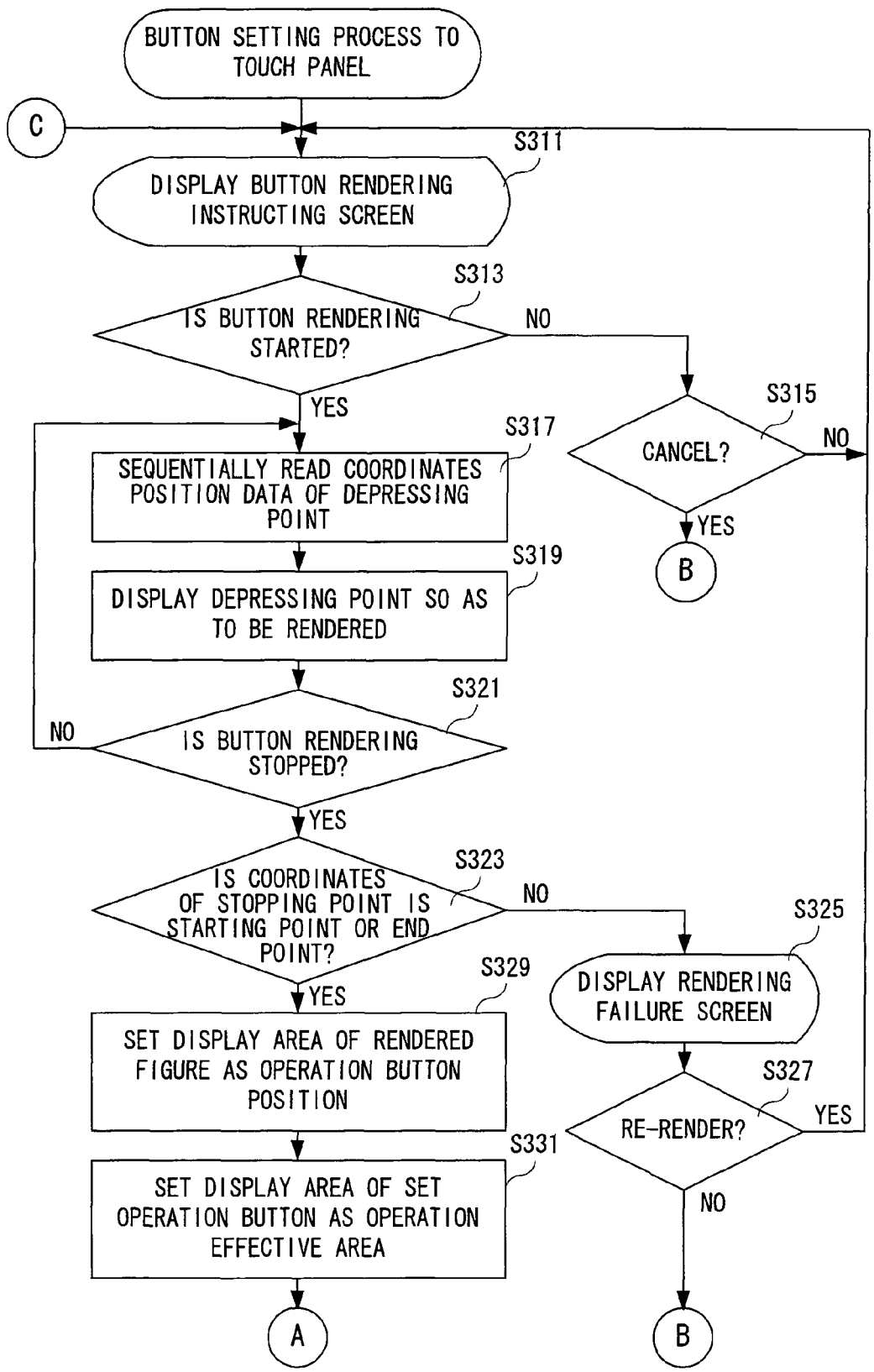
FIG. 46 is a flowchart showing a part of a button setting process to the touch panel in the eighth embodiment.

FIG. 46 shows a part of the flowchart of a button setting process to the touch panel in the eighth embodiment. Here, as described above, the button figure is freely rendered by the player. Accordingly, when the button is rendered, the size of the button is also determined, and therefore, the size changing process of the button figure as described in the first embodiment is not executed. In addition, another part of the button setting process with respect to touch panel in the eighth embodiment is the same as the flowchart in FIG. 6, and therefore, drawings and a detailed description as to another part is omitted. Furthermore, the button setting process to the touch panel described in the first embodiment and the duplicated content are simply described.

Figure 47:
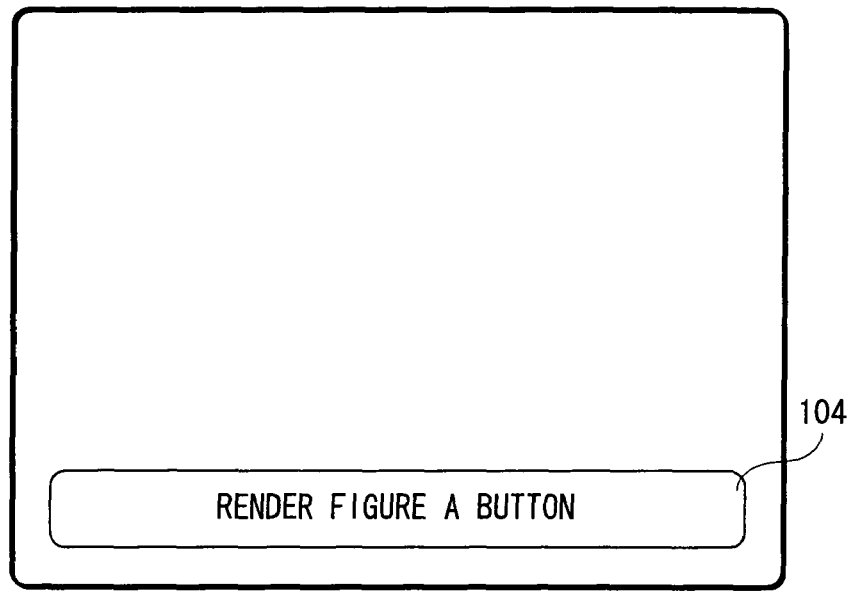
FIG. 47 is an illustrative view showing one example of a button rendering instructing screen displayed on the second LCD shown in FIG. 1.

Referring to FIG. 46, when the button setting process to the touch panel in the eighth embodiment is started, a button rendering instructing screen 160 as shown in FIG. 47 is displayed on the LCD 14 in a step S311. On button rendering instructing screen 160, a message displaying area 104 is provided at a lower part of the screen. At a start of displaying the button rendering instructing image 160, no screen display is performed except for the message displaying area 104. In the message displaying area 104, a message for prompting for a rendering of the button figure as to the operation button (A button, here) to be set is displayed. Accordingly, the player can render the button figure by stroking the surface of the LCD 14 (touch panel 22) by use of the stick 24, etc. to be described later. It is noted that in a case of rendering it with a finger, a surface to be contacted to the LCD 14 (touch panel 22) is larger than that of the stick 24, it may be impossible to render a precise line (button figure), and therefore, it is considered good to perform rendering by use of the stick 24. Accordingly, in the button setting process to the touch panel, a description is made on a case where an operation is made by use of the stick 24.

In a next step S313, it is determined whether or not rendering of the button figure is started. More specifically, it is determined whether or not the stick 24 touches (depresses) the LCD 14 (touch panel 22), that is, whether or not the coordinates position data is input from the touch panel 22. If "NO" in the step S313, that is, if the rendering of the button figure is not started, it is determined whether or not to be canceled in a step S315. Here, if it is not canceled, "NO" is determined, and the process directly returns to the step S311 while if it is canceled, "YES" is determined, and the process proceeds to a step S49 shown in FIG. 6.

On the other hand, if "YES" in the step S313, that is, if the rendering of the button figure is started, the coordinates position data of a depressing point or a contacted point is sequentially read out in a step S317. At this time, read coordinates position data is temporarily written to not the operation button storing area 70 but another area 72. Here, the reason why the coordinates position data is sequentially read is that it is necessary to display the button figure freely rendered by the player or to set the operation effective area.

It is noted that a time interval for reading the coordinates position data, that is, a scan time (a time period for taking one circle of a closed loop consisting of S317, S319, S321) can be set to a speed equal to or less than the reading speed of the coordinates position data in the touch panel 22. However, the shorter the scan time is set, the larger the coordinates position data (coordinates position data to be set) to be read is while the longer the scan time is set, the rougher the image at a time of displaying the button figure becomes. Therefore, the scan time has to be set to an adequate value by an examination, etc.

In a step S319, the depressing point or the contacted point is displayed so as to be rendered. Here, a display of the LCD 14 is controlled such that a dot is plotted (rendered) at the coordinates position indicated by the coordinates position data fetched from the touch panel 22. In a following step S321, it is determined whether or not the rendering of the button figure is stopped (completed). That is, it is determined whether or not in response to a release of the stick 24 from the LCD 14 (touch panel 22) by the player, there is no input of the coordinates position data from the touch panel 22.

If "NO" in the step S321, that is, if the rendering of the button figure is not stopped, the process directly returns to the step S317. On the other hand, if "YES" in the step S321, that is, if the rendering of the button figure is stopped, it is determined whether or not the coordinates of a stopping point is a starting point or an end point in a step S323. That is, it is determined whether or not the rendered button figure becomes a closed region. This is because that the closed region (display area) of the rendered button figure is set as an operation effective area. In a case that the button figure is rendered within the display area of the LCD 14, the starting point and the stopping point need to be coincident with each other, and in a case of starting to render from the end point defining a range of the display area on the LCD 14 (forming a circumference of the display area), the stopping point needs to be coincident with the starting point or becomes another end point. In a case that the starting point is an end point (referred to as "first end point" for the sake of convenience of description), the stopping point is another end point (referred to as "second end point" for the sake of convenience of description), the closed region of the button figure is formed by a line connecting the first end point and the second end point rendered by the player and a line connecting the first end point and the second end point in the circumference of the display area of the LCD 14 (see FIG. 51).

Figure 48:
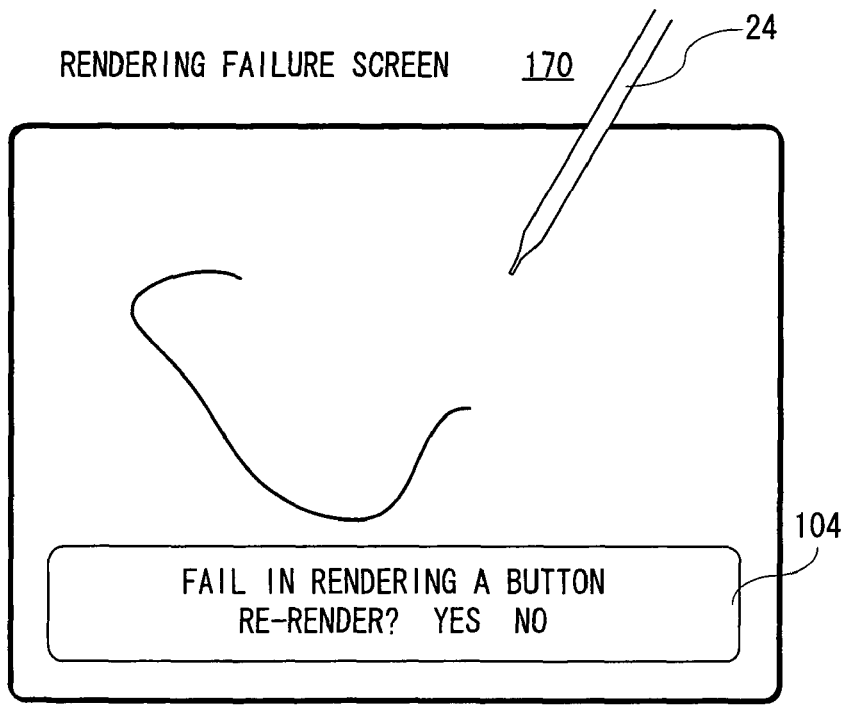
FIG. 48 is an illustrative view showing one example of a rendering failure screen displayed on the second LCD shown in FIG. 1.

If "NO" in the step S323, that is, if the coordinates of the stopping point is not the starting point or the end point, it is determined that an adequate button figure is not rendered, and a rendering failure screen 170 as shown in FIG. 48 is displayed in a step S325. On the rendering failure screen 170, a message displaying area 104 is provided at a lower part of the screen. In the message displaying area 104, a message indicative of failing in rendering the operation button (A button, here) and a message prompting a determination (selection) whether or not the button figure as to the operation button is re-rendered are displayed.

Returning to FIG. 46, in a succeeding step S327, it is determined whether or not the button figure of the button is re-rendered. That is, it is determined whether or not "YES" is selected on the rendering failure screen 170. If "YES" is determined here, that is, if it is re-rendered, the process directly returns to the step S311. However, if "NO" is determined, that is, if it is not re-rendered, the process proceeds to the step S49 shown in FIG. 6.

Furthermore, if "YES" in the step S323, that is, if the coordinates of the stopping point is the starting point or the end point, and the rendered button figure forms the closed region, the display area (closed region) of the rendered figure (button figure) is set to an operation button position, that is, the coordinates position data written to the another area 72 is written to the RAM 48 as the coordinates position data in correspondence to the player character selected in the step S3 in a step S329. Then, in a step S331, an area on the touch panel 22 corresponding to the display area of the set operation button is set as an operation effective area. The setting is the same as the button setting process to the touch panel described in the first embodiment. Thereafter, the process proceeds to the step S43 shown in FIG. 6 to set a function of the operation button, and execute a next operation button setting, etc.

Figure 49:
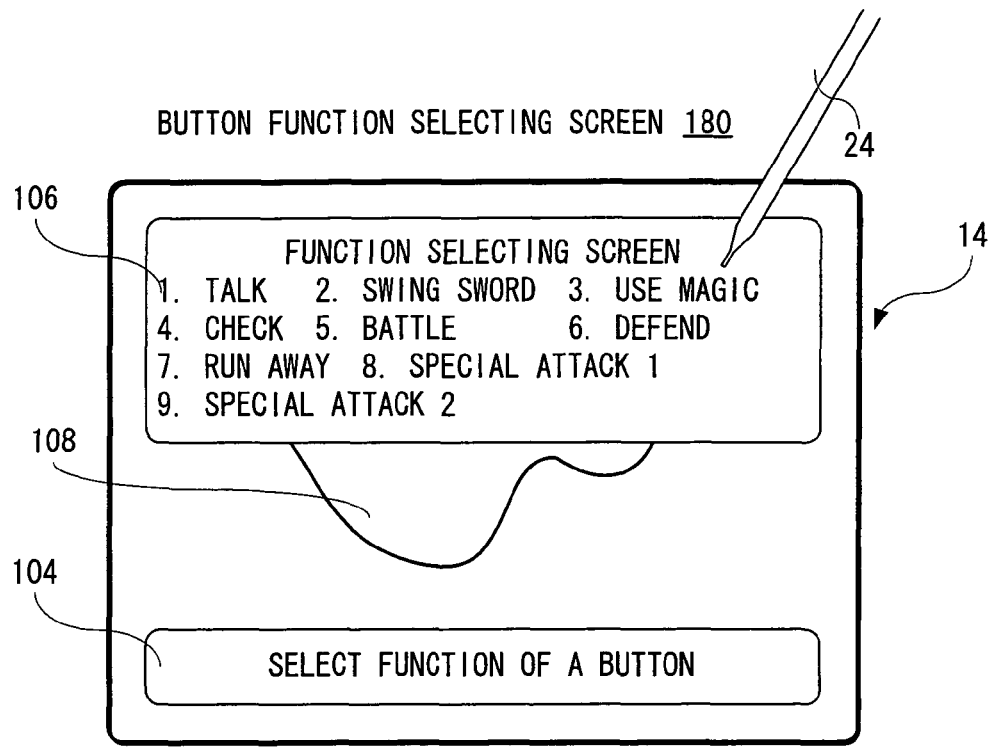
FIG. 49 is an illustrative view showing one example of a button function selecting screen displayed on the second LCD shown in FIG. 1.
Figure 50:
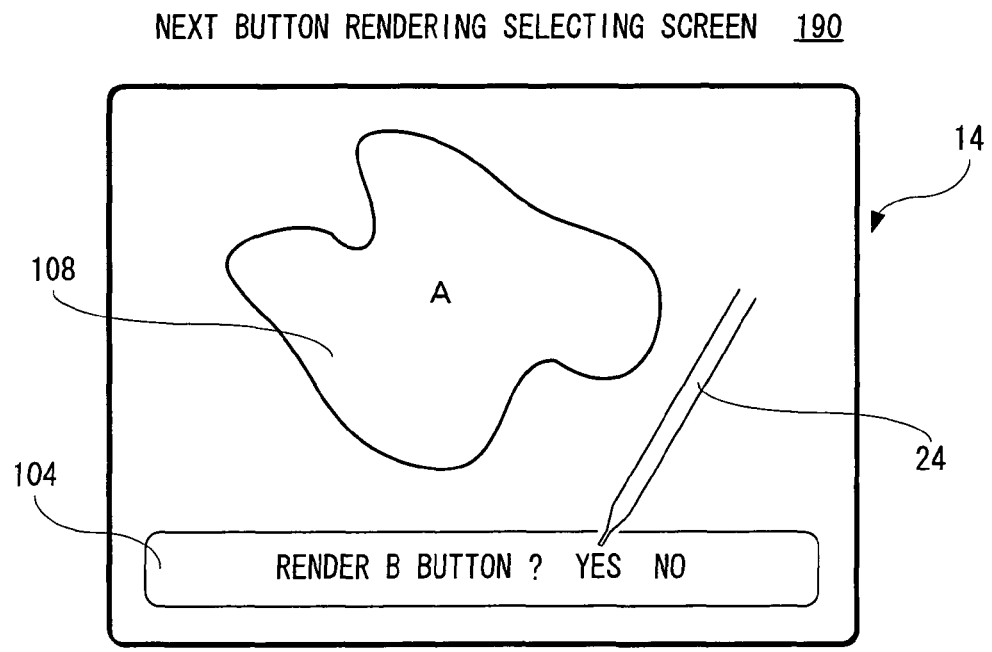
FIG. 50 is an illustrative view showing one example of a next button rendering selecting screen displayed on the second LCD shown in FIG. 1.
Figure 51:
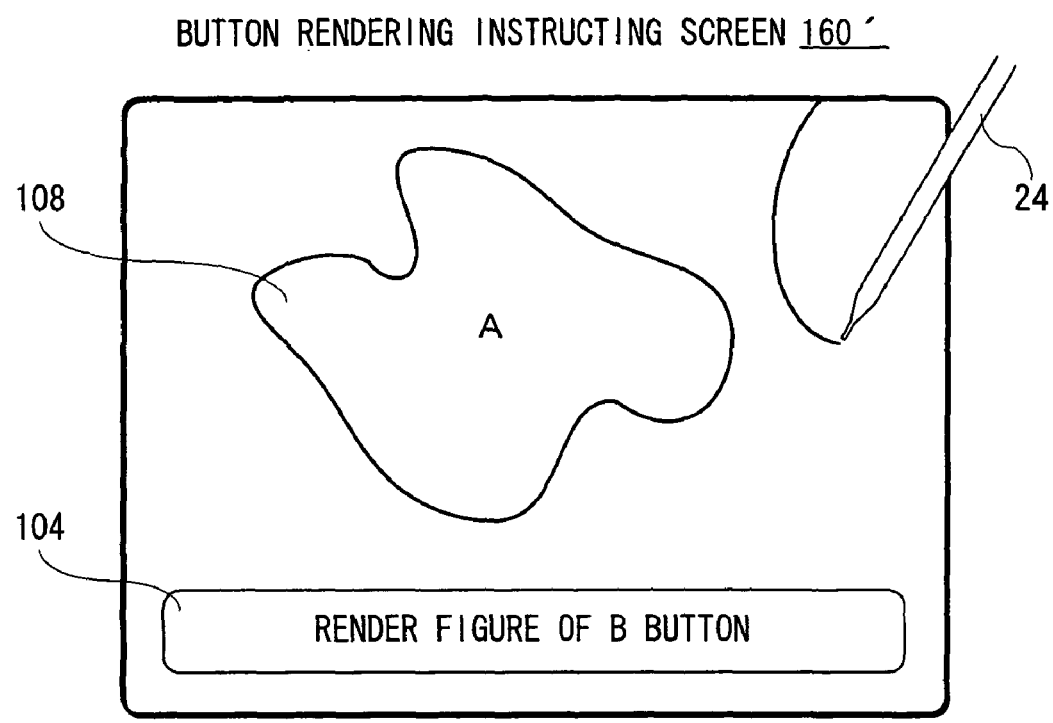
FIG. 51 is an illustrative view showing another example of the button rendering instructing screen displayed on the second LCD shown in FIG. 1.

It is noted that a button function selecting screen and a next button setting selecting screen displayed in the button setting process to the touch panel in the eighth embodiment are the same as the respective screens (140, 150) described in the button setting process to the touch panel in the first embodiment except for that the button figure freely rendered by the player is displayed on the LCD 14. Briefly, as shown in FIG. 49, on the button function selecting screen 180, a function selecting menu displaying area 106 is provided at an upper part of the screen, and the message displaying area 104 is provided at a lower part of the screen. Furthermore, the button figure 108 rendered by the player is displayed. In addition, as shown in FIG. 50, on the next button rendering selecting screen 190, the message displaying area 104 is provided at a lower part of the screen, and the button figure 108 rendered by the player is displayed. Also, as shown in FIG. 51, on a button rendering instructing screen 160' for rendering the button figure of the next operation button, the message displaying area 104 is provided at a lower part of the screen, and the button figure 108 that has already been written by the player is displayed. On the button rendering instructing screen 160', a state in which the button figure as to the next operation button (B button, here) is rendered is shown. However, at a start of displaying the screen 160', only the button figure of the operation button (button A, here) that has already been rendered and the message area are displayed.

According to the eighth embodiment, the player can freely render the figure of the operation button, and sets the operation effective area with respect to the rendered figure, and therefore, it is possible for all the players to operate with ease similarly to the first embodiment.

Furthermore, in the eighth embodiment, the size of the button figure and the operation effective area cannot be changed, but the position thereof is changeable. That is, according to an operation state in the above-described game process based on the touch panel operation, a position of any one of the button figure and the operation effective area can be changed (moved). As a method of changing the position, any one of methods shown in the second embodiment to the seventh embodiment can be adopted. It is noted that in the eighth embodiment, the plurality of coordinates corresponding to the button figure and the operation effective area of the operation button are stored, and therefore, in a case that the position of the button figure and the operation effective area are changed (moved), the plurality of coordinates are moved (in parallel).

It is noted that although in each of the above-described embodiment, the touch panel provided on the display is used as one example of a pointing device, another pointing device is useable. Here, the pointing device is for designating an input position and coordinates on the screen, and is applicable to a case where a directing operation within the display area of the figure or the operation effective area by use of, for example, a mouse, a track pad, a track ball, etc. is performed. It is noted that in this case, an image of a cursor, a mouse pointer, etc. for directing an input position (directing position) by the player is displayed on the screen.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus utilizing a pointing device, comprising:
   a display portion for displaying one or more figures operated by a player;
   figure position setting programmed logic circuitry for setting at least one of said one or more figures at an arbitrary position of said display portion on the basis of an instruction from the player;
   operation effective area setting programmed logic circuitry for setting a display area of said figure set by said figure position setting programmed logic circuitry as an operation effective area;
   operation coordinates position detecting programmed logic circuitry for detecting an operation coordinates position on the basis of operation information detected by an operation of said pointing device;
   operation coordinates position determining programmed logic circuitry for determining whether or not the operation coordinates position detected by said operation coordinates position detecting programmed logic circuitry is within said operation effective area;
   operation state detecting programmed logic circuitry for detecting an operation state of said figure, wherein said operation state detecting programmed logic circuitry makes a determination about an alteration of a characteristic of said figure, when the operation coordinates are determined to be within the operation effective area by said operation coordinates position determining programmed logic circuitry, based at least in part on a positional relationship of where the detected position of the operation coordinates is located within the operation effective area in relation to the operation effective area; and
   game processing programmed logic circuitry for executing a game process corresponding to the operation of said figure also when the operation coordinates are determined to be within said operation effective area by said operation coordinates position determining programmed logic circuitry.

2. The game apparatus according to claim 1, further comprising figure selecting programmed logic circuitry for selecting a figure to be displayed on said display portion out of a plurality of kinds of figures, wherein said figure position setting programmed logic circuitry sets the figure selected by said figure selecting programmed logic circuitry to an arbitrary position of said display portion.

3. The game apparatus according to claim 1, wherein said figure position setting programmed logic circuitry sets the display area of the figure rendered on said display portion according to the operation of said pointing device by said player as a figure position.

4. The game apparatus according to claim 3, further comprising
display position changing programmed logic circuitry for changing the display position of said figure on the basis of the operation state detected by said operation state detecting programmed logic circuitry.

5. The game apparatus according to claim 4, wherein said operation effective area setting programmed logic circuitry sets the display area of the figure changed by said display position changing programmed logic circuitry as an operation effective area.

6. The game apparatus according to claim 3, further comprising
operation effective area changing programmed logic circuitry for changing the operation effective area of said figure on the basis of the operation state detected by said operation state detecting programmed logic circuitry.

7. The game apparatus according to claim 1, further comprising figure size changing programmed logic circuitry for changing a size of the figure displayed on said display portion; wherein said operation effective area setting programmed logic circuitry sets a display area of the figure changed by said figure size changing programmed logic circuitry as an operation effective area.

8. A game apparatus according to claim 7, wherein said figure size changing programmed logic circuitry changes the size of said figure according to an operation time of said pointing device by said player.

9. A game apparatus according to claim 1, further comprising
a figure display area changing programmed logic circuitry for changing the display area of said figure on the basis of the operation state detected by said operation state detecting programmed logic circuitry; wherein
said operation effective area setting programmed logic circuitry sets the display area of the figure changed by said figure display area changing programmed logic circuitry as an operation effective area.

10. A game apparatus according to claim 1, further comprising
game proceeding detecting programmed logic circuitry for detecting a game proceeding; and
figure display state changing programmed logic circuitry for changing a display state of the figure displayed on said display portion when it is detected that said game proceeding is shifted to a predetermined state by said game proceeding detecting programmed logic circuitry, wherein
said operation effective area setting programmed logic circuitry sets the display area of the figure changed by said figure display state changing programmed logic circuitry as an operation effective area.

11. A game apparatus according to claim 10, further comprising
figure function setting programmed logic circuitry for setting a function of said figure;
figure function displaying programmed logic circuitry for displaying in association with said figure the function set by said figure function setting programmed logic circuitry; and
figure function changing programmed logic circuitry for changing the function set by said figure function setting programmed logic circuitry when said game proceeding is shifted to a predetermined state by said game proceeding detecting programmed logic circuitry; wherein
said figure display state changing programmed logic circuitry changes in a displaying manner from the function displayed by said figure function displaying programmed logic circuitry to the function changed by said figure function changing programmed logic circuitry.

12. A game apparatus according to claim 10, wherein
said figure display state changing programmed logic circuitry displays a new figure on said display portion when said game proceeding is shifted to a predetermined state by said game proceeding detecting programmed logic circuitry, and said operation effective area setting programmed logic circuitry sets a display area of said figure newly displayed as an operation effective area.

13. A game apparatus according to claim 10, further comprising character selecting programmed logic circuitry for selecting an arbitrary character out of a plurality of kinds of characters; wherein
said figure position setting programmed logic circuitry sets said figure at an arbitrary position of said display portion for each character selected by said character selecting programmed logic circuitry,
said game proceeding detecting programmed logic circuitry detects whether or not the character selected by said character selecting programmed logic circuitry is changed,
said figure display state detecting programmed logic circuitry, when the character is changed by said game proceeding detecting programmed logic circuitry, changes the position of
said figure to the figure position set to the changed character, and said operation effective area setting programmed logic circuitry sets the display area of the figure changed by said figure display state changing programmed logic circuitry as an operation effective area.

14. A game apparatus according to claim 1, wherein said pointing device is a touch panel provided in association with said display portion, and said operation effective area setting programmed logic circuitry sets an area of said touch panel corresponding to the display area of said figure as an operation effective area.

15. A game apparatus utilizing a pointing device, comprising:
a first display portion for displaying a game image;
a second display portion arranged in proximity to said first display portion for displaying one or more figures to be operated by the player;
figure position setting programmed logic circuitry for setting at least one of said one or more figures at an arbitrary position of said display portion on the basis of an instruction from the player;

operation effective area setting programmed logic circuitry for setting a display area of said figure set by said figure position setting programmed logic circuitry as an operation effective area;

operation coordinates position detecting programmed logic circuitry for detecting an operation coordinates position on the basis of operation information detected by an operation of said pointing device;

operation coordinates position determining programmed logic circuitry for determining whether or not the operation coordinates position detected by said operation coordinates position detecting programmed logic circuitry is within said operation effective area; and operation state detecting programmed logic circuitry for detecting an operation state of said figure, wherein said operation state detecting programmed logic circuitry makes a determination about an alteration of a characteristic of said figure, when the operation coordinates are determined to be within the operation effective area by said operation coordinates position determining programmed logic circuitry, based at least in part on a positional relationship of where the detected position of the operation coordinates is located within the operation effective area in relation to the operation effective area; and a game processing programmed logic circuitry for changing a game image displayed on at least said first display portion in response to the operation of said figure also when the operation coordinates are determined to be within said operation effective area by said operation coordinates position determining programmed logic circuitry.

16. A game apparatus utilizing a pointing device, comprising:

display portion for displaying one or more figures to be operated by a player;

figure position setting programmed logic circuitry for setting said figure at a predetermined position of said display portion;

operation effective area setting programmed logic circuitry for setting a display area of said figure set by said figure position setting programmed logic circuitry as an operation effective area;

operation coordinates position detecting programmed logic circuitry for detecting an operation coordinates position on the basis of operation information detected by an operation of said pointing device;

operation coordinates position determining programmed logic circuitry for determining whether or not the operation coordinates position detected by said operation coordinates position detecting programmed logic circuitry is within said operation effective area;

game processing programmed logic circuitry for executing a game process corresponding to said figure when the operation coordinates are determined to be within said operation effective area by said operation coordinates position determining programmed logic circuitry;

operation state detecting programmed logic circuitry for detecting an operation state of said figure by the player, wherein said operation state detecting programmed logic circuitry makes a determination about an alteration of a characteristic of said figure, when the operation coordinates are determined to be within the operation effective area by said operation coordinates position determining programmed logic circuitry, based at least in part on a positional relationship of where the detected position of the operation coordinates is located within the operation effective area in relation to the operation effective area; and operation effective area changing programmed logic circuitry for changing at least the operation effective area of said figure on the basis of the determination made by said operation state detecting programmed logic circuitry.

17. A game apparatus according to claim 16, further comprising figure display area changing programmed logic circuitry for changing the display area of said figure on the basis of the operation state detected by said operation state detecting programmed logic circuitry.

18. A game apparatus according to claim 16, further comprising representative coordinates position extracting programmed logic circuitry for extracting a representative coordinates position out of a plurality of operation coordinates positions detected by said operation coordinates position detecting programmed logic circuitry; wherein said operation effective area changing programmed logic circuitry changes a position of the operation effective area of said figure on the basis of the representative coordinates position extracted by said representative coordinates position extracting programmed logic circuitry.

19. A game apparatus utilizing a pointing device, comprising:

display portion for displaying one or more figures to be operated by a player;

figure position setting programmed logic circuitry for setting said figure at a predetermined position of said display portion;

operation effective area setting programmed logic circuitry for setting a display area of said figure set by said figure position setting programmed logic circuitry as an operation effective area;

operation coordinates position detecting programmed logic circuitry for detecting an operation coordinates position on the basis of operation information detected by an operation of said pointing device;

operation coordinates position determining programmed logic circuitry for determining whether or not the operation coordinates position detected by said operation coordinates position detecting programmed logic circuitry is within said operation effective area;

game processing programmed logic circuitry for executing a game process corresponding to said figure when it is determined to be within said operation effective area by said operation coordinates position determining programmed logic circuitry;

operation state detecting programmed logic circuitry for detecting an operation state of said figure by the player;

operation effective area changing programmed logic circuitry for changing at least the operation effective area of said figure on the basis of the operation state detected by said operation state detecting programmed logic circuitry; and representative coordinates position extracting programmed logic circuitry for extracting a representative coordinates position out of a plurality of operation coordinates positions detected by said operation coordinates position detecting programmed logic circuitry; wherein said operation effective area changing programmed logic circuitry changes a position of the operation effective area of said figure on the basis of the representative coordinates position extracted by said representative coordinates position extracting programmed logic circuitry, and said representative coordinates position extracting programmed logic circuitry extracts an operation coordinates position being the greatest in number out of said plurality of operation coordinates positions as said representative coordinates position.

20. A game apparatus utilizing a pointing device, comprising:

display portion for displaying one or more figures to be operated by a player;

figure position setting programmed logic circuitry for setting said figure at a predetermined position of said display portion;

operation effective area setting programmed logic circuitry for setting a display area of said figure set by said figure position setting programmed logic circuitry as an operation effective area;

operation coordinates position detecting programmed logic circuitry for detecting an operation coordinates position on the basis of operation information detected by an operation of said pointing device;

operation coordinates position determining programmed logic circuitry for determining whether or not the operation coordinates position detected by said operation coordinates position detecting programmed logic circuitry is within said operation effective area;

game processing programmed logic circuitry for executing a game process corresponding to said figure when it is determined to be within said operation effective area by said operation coordinates position determining programmed logic circuitry;

operation state detecting programmed logic circuitry for detecting an operation state of said figure by the player; and operation effective area changing programmed logic circuitry for changing at least the operation effective area of said figure on the basis of the operation state detected by said operation state detecting programmed logic circuitry, wherein said operation state detecting programmed logic circuitry detects a difference between a central coordinates position of said figure and the operation coordinates position detected by said operation coordinates position detecting programmed logic circuitry, and said operation effective area changing programmed logic circuitry changes a position of the operation effective area of said figure on the basis of said difference.

21. A game apparatus according to claim 20, wherein said operation effective area changing programmed logic circuitry changes the positions of the operation effective areas as to all figures displayed on said display portion on the basis of said difference.

22. A game apparatus according to claim 20, further comprising average value calculating programmed logic circuitry for calculating an average value of differences detected by said operation state detecting programmed logic circuitry every operation of said figure; wherein said operation effective area changing programmed logic circuitry changes the position of the operation effective area of said figure on the basis of the average value calculated by said average value calculating programmed logic circuitry.

23. A game apparatus utilizing a pointing device, comprising:

display portion for displaying one or more figures to be operated by a player;

figure position setting programmed logic circuitry for setting said figure at a predetermined position of said display portion;

operation effective area setting programmed logic circuitry for setting a display area of said figure set by said figure position setting programmed logic circuitry as an operation effective area;

operation coordinates position detecting programmed logic circuitry for detecting an operation coordinates position on the basis of operation information detected by an operation of said pointing device;

operation coordinates position determining programmed logic circuitry for determining whether or not the operation coordinates position detected by said operation coordinates position detecting programmed logic circuitry is within said operation effective area;

game processing programmed logic circuitry for executing a game process corresponding to said figure when it is determined to be within said operation effective area by said operation coordinates position determining programmed logic circuitry;

operation state detecting programmed logic circuitry for detecting an operation state of said figure by the player; and operation effective area changing programmed logic circuitry for changing at least the operation effective area of said figure on the basis of the operation state detected by said operation state detecting programmed logic circuitry, wherein said operation state detecting programmed logic circuitry detects the number of times of operations of said figure, and said operation effective area changing programmed logic circuitry changes a size of the operation effective area of said figure on the basis of said number of times of operations.

24. A game apparatus utilizing a pointing device, comprising:

a display portion for displaying at least one or more figures to be operated by a player;

figure position setting programmed logic circuitry for setting at least one of said one or more figures at a predetermined position of said display portion;

operation effective area setting programmed logic circuitry for setting a display area of said figure set by said figure position setting programmed logic circuitry as an operation effective area;

operation coordinates position detecting programmed logic circuitry for detecting an operation coordinates position on the basis of operation information detected by an operation of said pointing device;

operation coordinates position determining programmed logic circuitry for determining whether or not the operation coordinates position detected by said operation coordinates position detecting programmed logic circuitry is within said operation effective area;

game processing programmed logic circuitry for executing a game process corresponding to said figure when the operation coordinates are determined to be within said operation effective area by said operation coordinates position determining programmed logic circuitry;

operation state detecting programmed logic circuitry for detecting an operation state of said figure by the player, wherein said operation state detecting programmed logic circuitry makes a determination about an alteration of a characteristic of said figure, when the operation coordinates are determined to be within the operation effective area by said operation coordinates position determining programmed logic circuitry, based at least in part on a positional relationship of where the detected position of the operation coordinates are located within the operation effective area in relation to the operation effective area; and figure display area changing programmed logic circuitry for changing the display area of said figure on the basis of the determination made by said operation state detecting programmed logic circuitry.

25. A game apparatus according to claim 24, further comprising an operation effective area changing programmed logic circuitry for changing the operation effective area of said figure in correspondence to the display area of the figure changed by said figure display area changing programmed logic circuitry.

26. A game apparatus utilizing a pointing device, comprising a display portion for displaying at least one or more figures to be operated by a player;

figure position setting programmed logic circuitry for setting at least one of said one or more figures at a predetermined position of said display portion;

operation effective area setting programmed logic circuitry for setting a display area of said figure set by said figure position setting programmed logic circuitry as an operation effective area;

operation coordinates position detecting programmed logic circuitry for detecting an operation coordinates position on the basis of operation information detected by an operation of said pointing device;

operation coordinates position determining programmed logic circuitry for determining whether or not the operation coordinates position detected by said operation coordinates position detecting programmed logic circuitry is within said operation effective area;

game processing programmed logic circuitry for executing a game process corresponding to said figure when it is determined to be within said operation effective area by said operation coordinates position determining programmed logic circuitry;

operation state detecting programmed logic circuitry for detecting an operation state of said figure by the player; and figure display area changing programmed logic circuitry for changing the display area of said figure on the basis of the operation state detected by said operation state detecting programmed logic circuitry, wherein said operation state detecting programmed logic circuitry detects a difference between a central coordinates position of said figure and the operation coordinates position detected by said operation coordinates position detecting programmed logic circuitry, and said figure display area changing programmed logic circuitry changes a position of the display area of said figure on the basis of said difference.

27. A game apparatus utilizing a pointing device, comprising a display portion for displaying at least one or more figures to be operated by a player;

figure position setting programmed logic circuitry for setting at least one of said one or more figures at a predetermined position of said display portion;

operation effective area setting programmed logic circuitry for setting a display area of said figure set by said figure position setting programmed logic circuitry as an operation effective area;

operation coordinates position detecting programmed logic circuitry for detecting an operation coordinates position on the basis of operation information detected by an operation of said pointing device;

operation coordinates position determining programmed logic circuitry for determining whether or not the operation coordinates position detected by said operation coordinates position detecting programmed logic circuitry is within said operation effective area;

game processing programmed logic circuitry for executing a game process corresponding to said figure when it is determined to be within said operation effective area by said operation coordinates position determining programmed logic circuitry;

operation state detecting programmed logic circuitry for detecting an operation state of said figure by the player; and figure display area changing programmed logic circuitry for changing the display area of said figure on the basis of the operation state detected by said operation state detecting programmed logic circuitry, wherein said operation state detecting programmed logic circuitry detects the number of times of operations of said figure, and said figure display area changing programmed logic circuitry changes a size of the display area of said figure on the basis of said number of times of operations.

28. A game apparatus according to claim 27, wherein said figure display area changing programmed logic circuitry reduces the display area of said figure when said number of times of operations is equal to or less than a first setting number of times, and enlarges the display area of said figure when said number of times of operations is equal to or more than a second setting number of times.

29. A game apparatus according to claim 27, wherein said figure display area changing programmed logic circuitry enlarges the display area of said figure when said number of times of operations is equal to or less than a first setting number of times, and reduces the display area of said figure when said number of times of operations is equal to or more than a second setting number of times.

30. A game apparatus according to claim 27, wherein said figure display area changing programmed logic circuitry erases the display area of said figure when said the number of times of operations is equal to or less than a third setting number of times.

31. A non-transitive storage medium storing a game program to be executed by a game apparatus that utilizes a pointing device, and is provided with a display portion for displaying at least one or more figures to be operated by a player, said game program causes a processor of said game apparatus to execute a following steps of:

setting at least one of said one or more figures at an arbitrary position of said display portion on the basis of an instruction from the player;

setting a display area of said figure set by said setting one or more figures as an operation effective area;

detecting an operation coordinates position on the basis of operation information detected by an operation of said pointing device;

determining whether or not the operation coordinates position detected by said detecting a coordinates position is within said operation effective area;

detecting an operation state of said figure by the player, wherein said detecting the operation state includes making a determination about an alteration of a characteristic of said figure, when the operation coordinates are determined to be within the operation effective area, based at least in part on a positional relationship of where the detected position of the operation coordinates are located within the operation effective area in relation to the operation effective area; and executing a game process corresponding to the operation of said figure also when the operation coordinates are determined to be within said operation effective area by said determining.

32. A non-transitive storage medium storing a game program according to claim 31, wherein said game program further executes selecting a figure to be displayed on said display portion out of a plurality of kinds of figures, and said setting one or more figures sets the figure selected by said selecting to an arbitrary position of said display portion.

33. A non-transitive storage medium storing a game program according to claim 31, wherein said setting sets the display area of the figure rendered in said display portion according to an operating of said pointing device by said player as a figure position.

34. A non-transitive storage medium storing a game program according to claim 31, wherein changing a size of the figure displayed on said display portion is further executed based at least in part on the determination made by said detecting an operation state, and said setting a display area sets a display area of the figure changed by said changing as an operation effective area.

35. A non-transitive storage medium storing a game program according to claim 31, wherein said game program further executes detecting a game proceeding, and changing a display state of the figure displayed on said display portion when it is detected that said game proceeding is shifted to a predetermined state by said detecting a game proceeding, and said setting a display sets the display area of the figure changed by said changing as an operation effective area.

36. A non-transitive storage medium storing a game program to be executed by a game apparatus utilizing a pointing device that is provided with a first display portion for displaying a game image and a second display portion that is arranged in proximity to said first display portion and displays at least one or more figures to be operated by a player, said game program causes a processor of said game apparatus to execute a following steps of:

setting at least one of said one or more figures at an arbitrary position of said display portion on the basis of an instruction from the player;

setting a display area of said figure set by said setting at least one or more figures as an operation effective area;

detecting an operation coordinates position on the basis of operation information detected by an operation of said pointing device;

determining whether or not the operation coordinates position detected by said detecting an operation coordinates position is within said operation effective area;

detecting an operation state of said figure by the player, wherein said detecting the operation state of said figure includes making a determination about an alteration of a characteristic of said figure, when the operation coordinates are determined to be within the operation effective area, based at least in part on a positional relationship of where the detected position of the operation coordinates are located within the operation effective area in relation to the operation effective area; and changing a game image displayed on at least said first display portion in response to an operation of said figure also when the operation coordinates are determined to be within said operation effective area by said determining the operation coordinates and based at least in part on the determination made by said detecting an operation state.

37. A non-transitive storage medium storing a game program of a game apparatus utilizing a pointing device that is provided with a display portion for displaying one or more figures to be operated by a player, said game program causes a processor of said game apparatus to execute following steps of:

setting at least one of said one or more figures at a predetermined position of said display portion;

setting a display area of said figure set by said setting one or more figures as an operation effective area;

detecting an operation coordinates position on the basis of operation information detected by an operation of said pointing device;

determining whether or not the operation coordinates position detected by said detecting is within said operation effective area;

executing a game process corresponding to said figure when the operation coordinates are determined to be within said operation effective area by said operation coordinates position determining step;

detecting an operation state of said figure by the player, wherein said detecting an operation state includes making a determination about an alteration of a characteristic of said figure, when the operation coordinates are determined to be within the operation effective area, based at least in part on a positional relationship of where the detected position of the operation coordinates is located within the operation effective area in relation to the operation effective area; and changing at least the operation effective area of said figure also on the basis of the operation state detected by said detecting an operation state when the operation coordinates are determined to be within the operation effective area.

38. A non-transitive storage medium storing a game program according to claim 37, wherein said game program further executes changing the display area of said figure on the basis of the operation state detected by said detecting an operation state.

39. A non-transitive storage medium storing a game program according to claim 37, wherein said game program further executes extracting a representative coordinates position out of a plurality of operation coordinates positions detected by said detecting operation coordinates, and said changing for changing a position of the operation effective area of said figure on the basis of the representative coordinates position extracted by said extracting.

40. A non-transitive storage medium storing a game program of a game apparatus utilizing a pointing device that is provided with a display portion for displaying one or more figures to be operated by a player, said game program causes a processor of said game apparatus to execute following steps of:

setting at least one of said one or more figures at a predetermined position of said display portion;

setting a display area of said figure set by said setting one or more figures as an operation effective area;

detecting an operation coordinates position on the basis of operation information detected by an operation of said pointing device;

determining whether or not the operation coordinates position detected by said detecting is within said operation effective area;

executing a game process corresponding to said figure when it is determined to be within said operation effective area by said operation coordinates position determining step;

detecting an operation state of said figure by the player;

changing at least the operation effective area of said figure on the basis of the operation state detected by said detecting an operation state; and extracting a representative coordinates position out of a plurality of operation coordinates positions detected by said detecting operation coordinates, wherein said changing changes a position of the operation effective area of said figure on the basis of the representative coordinates position extracted by said extracting, wherein said extracting extracts an operation coordinates position being the greatest in number out of said plurality of operation coordinates positions as said representative coordinates position.

41. A non-transitive storage medium storing a game program of a game apparatus utilizing a pointing device that is provided with a display portion for displaying one or more figures to be operated by a player, said game program causes a processor of said game apparatus to execute following steps of:

setting at least one of said one or more figures at a predetermined position of said display portion;

setting a display area of said figure set by said setting one or more figures as an operation effective area;

detecting an operation coordinates position on the basis of operation information detected by an operation of said pointing device;

determining whether or not the operation coordinates position detected by said detecting is within said operation effective area;

executing a game process corresponding to said figure when it is determined to be within said operation effective area by said operation coordinates position determining step;

detecting an operation state of said figure by the player; and changing at least the operation effective area of said figure on the basis of the operation state detected by said detecting an operation state, wherein said detecting an operation state detects a difference between a central coordinates position of said figure and the operation coordinates position detected by said detecting operation coordinates, and said changing changes a position of the operation effective area of said figure on the basis of said difference.

42. A non-transitive storage medium storing a game program according to claim 41, wherein said changing changes the positions of the operation effective areas as to all figures displayed on said display portion on the basis of said difference.

43. A non-transitive storage medium storing a game program according to claim 41, wherein said game program executes calculating an average value of differences detected by said detecting an operation state every operation of said figure, and said changing changes a position of the operation effective area of said figure on the basis of the average value calculated by said calculating.

44. A non-transitive storage medium storing a game program of a game apparatus utilizing a pointing device that is provided with a display portion for displaying one or more figures to be operated by a player, said game program causes a processor of said game apparatus to execute following steps of:

setting at least one of said one or more figures at a predetermined position of said display portion;

setting a display area of said figure set by said setting one or more figures as an operation effective area;

detecting an operation coordinates position on the basis of operation information detected by an operation of said pointing device;

determining whether or not the operation coordinates position detected by said detecting is within said operation effective area;

executing a game process corresponding to said figure when it is determined to be within said operation effective area by said operation coordinates position determining step;

detecting an operation state of said figure by the player; and changing at least the operation effective area of said figure on the basis of the operation state detected by said detecting an operation state, wherein said detecting an operation state detects the number of times of operations of said figure, and said changing changes a size of the operation effective area of said figure on the basis of said number of times of operations.

45. A non-transitive storage medium storing a game program of a game apparatus utilizing a pointing device that is provided with a display portion for displaying one or more figures operated by a player, said game program causes a processor of said game apparatus to execute following steps of:

setting at least one of said one or more figures at a predetermined position of said display portion;

setting a display area of said figure set by said figure position setting step as an operation effective area;

detecting an operation coordinates position on the basis of operation information detected by an operation of said pointing device;

determining whether or not the operation coordinates position detected by said detecting is within said operation effective area;

executing a game process corresponding to said figure when the operation coordinates are determined to be within said operation effective area by said determining;

detecting an operation state of said figure by the player, wherein said detecting the operation state includes making a determination about an alteration of a characteristic of said figure, when the operation coordinates are determined to be within the operation effective area, based at least in part on a positional relationship of where the location of the operation coordinates is within the operation effective area in relation to the operation effective area; and changing the display area of said figure on the basis of the operation state detected by detecting an operation state.

46. A non-transitive storage medium storing a game program according to claim 45, wherein said game program further executes changing the operation effective area of said figure in correspondence to the display area of the figure changed by said changing the display area.

47. A non-transitive storage medium storing a game program of a game apparatus utilizing a pointing device that is provided with a display portion for displaying one or more figures operated by a player, said game program causes a processor of said game apparatus to execute following steps of:

setting at least one of said one or more figures at a predetermined position of said display portion;

setting a display area of said figure set by said figure position setting step as an operation effective area;

detecting an operation coordinates position on the basis of operation information detected by an operation of said pointing device;

determining whether or not the operation coordinates position detected by said detecting is within said operation effective area;

executing a game process corresponding to said figure when it is determined to be within said operation effective area by said determining;

detecting an operation state of said figure by the player; and changing the display area of said figure on the basis of the operation state detected by detecting an operation state, wherein said detecting an operation state detects a difference between a central coordinates position of said figure and the operation coordinates position detected by said detecting operation coordinates, and said changing the display area changes a position of the display area of said figure on the basis of said difference.

48. A non-transitive storage medium storing a game program of a game apparatus utilizing a pointing device that is provided with a display portion for displaying one or more figures operated by a player, said game program causes a processor of said game apparatus to execute following steps of:

setting at least one of said one or more figures at a predetermined position of said display portion;

setting a display area of said figure set by said figure position setting step as an operation effective area;

detecting an operation coordinates position on the basis of operation information detected by an operation of said pointing device;

determining whether or not the operation coordinates position detected by said detecting is within said operation effective area;

executing a game process corresponding to said figure when it is determined to be within said operation effective area by said determining;

detecting an operation state of said figure by the player; and changing the display area of said figure on the basis of the operation state detected by detecting an operation state, wherein said detecting an operation state detects the number of times of operations of said figure, and said changing the display area changes a size of the display area of said figure on the basis of said number of times of operations.

49. A non-transitive storage medium storing a game program according to claim 48, wherein said changing the display area reduces the display area of said figure when said number of times of operations is equal to or less than a first setting number of times, and enlarges the display area of said figure when said number of times of operations is equal to or more than a second setting number of times.

50. A non-transitive storage medium storing a game program according to claim 48, wherein said changing the display area enlarges the display area of said figure when said number of times of operations is equal to or less than a first setting number of times, and reduces the display area of said figure when said number of times of operations is equal to or more than a second setting number of times.

51. A non-transitive storage medium storing a game program according to claim 48, wherein said changing the display area erases the display area of said figure when said number of times of operation is equal to or less than a third setting number of times.

\* \* \* \* \*